US012297016B2

(12) United States Patent
Sollie et al.

(10) Patent No.: US 12,297,016 B2
(45) **Date of Patent: *May 13, 2025**

(54) INSULATED BOX ASSEMBLY WITH OVERLAPPING PANELS

(71) Applicant: Pratt Retail Specialties, LLC, Brookhaven, GA (US)

(72) Inventors: Greg Sollie, Sharpsburg, GA (US); Jamie Waltermire, Peachtree City, GA (US); Shifeng Chen, Newport News, VA (US)

(73) Assignee: Pratt Retail Specialties, LLC, Brookhaven, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,641

(22) Filed: Apr. 28, 2023

(65) Prior Publication Data

US 2023/0257157 A1 Aug. 17, 2023

Related U.S. Application Data

(63) Continuation of application No. 17/492,285, filed on Oct. 1, 2021, now Pat. No. 11,724,851, which is a
(Continued)

(51) Int. Cl.
*B65D 5/22* (2006.01)
*B31B 50/26* (2017.01)
(Continued)

(52) U.S. Cl.
CPC .............. *B65D 5/22* (2013.01); *B31B 50/262* (2017.08); *B65D 5/2057* (2013.01); *B65D 5/64* (2013.01);
(Continued)

(58) Field of Classification Search
CPC ......... B32B 2307/304; F25D 2323/061; F25D 2331/804; B65D 81/3825; B65D 81/38;
(Continued)

(56) References Cited

U.S. PATENT DOCUMENTS 265,985 A 10/1882 Seabury
1,061,531 A 5/1913 Emmons
(Continued)

FOREIGN PATENT DOCUMENTS

AU 2021204424 7/2023
AU 2021245201 4/2024
(Continued)

OTHER PUBLICATIONS

US 10,562,676 B2, 02/2020, Waltermire et al. (withdrawn)
(Continued)

*Primary Examiner* — Christopher R Demeree
(74) *Attorney, Agent, or Firm* — Taylor English Duma LLP

(57) ABSTRACT

A box assembly can include an exterior piece including a first middle portion, a second middle portion, a third middle portion, and a fourth middle portion; the first middle portion and the third middle portion positioned perpendicular to the second middle portion and the fourth middle portion; a plurality of insulator pads including a first side insulator pad, a second side insulator pad, and a third side insulator pad; the first side insulator pad contacting the first middle portion; the second side insulator pad contacting the first middle portion, the second middle portion, and the third middle portion; the third side insulator pad contacting the third middle portion; and an interior piece positioned within the exterior piece, the interior piece including a first side panel
(Continued)

and a second side panel; the first side insulator pad positioned between the first side panel and the first middle portion.

16 Claims, 25 Drawing Sheets

Related U.S. Application Data continuation of application No. 16/879,811, filed on May 21, 2020, now Pat. No. 11,203,458, which is a continuation of application No. 16/382,710, filed on Apr. 12, 2019, now Pat. No. 10,858,141.

(60) Provisional application No. 62/760,672, filed on Nov. 13, 2018.

(51) Int. Cl.
*B31B 110/35* (2017.01)
*B65D 5/20* (2006.01)
*B65D 5/64* (2006.01)
*B65D 25/02* (2006.01)
*B65D 81/38* (2006.01)

(52) U.S. Cl.
CPC ......... *B65D 25/02* (2013.01); *B65D 81/3858* (2013.01); *B65D 81/386* (2013.01); *B31B 2110/35* (2017.08)

(58) Field of Classification Search
CPC . B65D 5/56; B65D 21/00; B65D 1/22; B65D 77/042; B65D 5/566; B65D 81/3813; B65D 81/3823; B65D 81/3862; B65D 81/3858; B65D 5/64; B65D 5/2057; B65D 5/22
USPC ..... 229/103.11, 122.32, 122.34; 220/592.25, 220/592.2, 592.26, 4.29, 592.23; 206/594, 545; 312/259; 62/60
See application file for complete search history.

(56) References Cited

U.S. PATENT DOCUMENTS 1,150,105 A 8/1915 Emmons
1,527,167 A 2/1925 Birdseye
1,601,547 A 9/1926 Wofford
1,677,565 A 7/1928 Oppenheim
1,682,410 A 8/1928 Oppenheim
1,747,980 A 2/1930 Kondolf
1,753,813 A 4/1930 Washburn
1,792,627 A 2/1931 Bowersock
1,868,996 A 7/1932 Sharp
1,896,393 A 2/1933 Devine
1,899,892 A 2/1933 D'Este et al.
1,930,680 A 10/1933 Hinton
1,935,923 A 11/1933 Thoke
1,937,263 A 11/1933 Bubb
1,942,917 A 1/1934 D'Este et al.
1,954,013 A 4/1934 Lilienfield
2,018,519 A 10/1935 Hall
2,070,747 A 2/1937 Ostrom
2,116,513 A 5/1938 Frankenstein
2,148,454 A 2/1939 Gerard
2,165,327 A 7/1939 Zalkind
2,289,060 A 7/1942 Merkle
2,293,361 A 8/1942 Roberts
2,326,817 A 8/1943 Zalkind
2,360,806 A 10/1944 Van Rosen
2,386,905 A 10/1945 Meitzen
2,389,601 A 11/1945 De Witt
2,485,643 A 10/1949 Norquist
2,554,004 A 5/1951 Bergstein
2,632,311 A 3/1953 Sullivan
2,650,016 A 8/1953 McMillan
2,717,114 A 9/1955 Parham, Jr.
2,753,102 A 7/1956 Paige
2,761,610 A 9/1956 Welshenbach
2,867,035 A 1/1959 Patterson, Jr.
2,899,103 A 8/1959 Ebert
2,927,720 A 3/1960 Adams
2,950,225 A 8/1960 Losse
2,954,913 A 10/1960 Rossman
2,979,246 A 4/1961 Liebeskind
2,986,324 A 5/1961 Anderson, Jr.
2,987,239 A 6/1961 Atwood
3,003,622 A 10/1961 Hardigg
3,003,680 A 10/1961 Wilcox, Jr. et al.
3,024,935 A 3/1962 Vinick
3,029,008 A 4/1962 Membrino
3,031,121 A 4/1962 Chase
3,065,514 A 11/1962 Henning et al.
3,065,895 A 11/1962 Lipschutz
3,096,879 A 7/1963 Schumacher
3,097,782 A 7/1963 Koropatkin et al.
3,182,913 A 5/1965 Brian
3,193,176 A 7/1965 Gullickson et al.
3,194,471 A 7/1965 Murphy
3,206,103 A 9/1965 Bixler
3,222,843 A 12/1965 Schneider
3,236,206 A 2/1966 Willinger
3,282,411 A 11/1966 Jardine
3,286,825 A 11/1966 Laas
3,335,941 A 8/1967 Gatward
3,349,984 A 10/1967 Halko, Jr.
3,371,462 A 3/1968 Nordkvist et al.
3,375,934 A 4/1968 Bates
3,399,818 A 9/1968 Stegner
3,420,363 A 1/1969 Blickensderfer
3,435,736 A 4/1969 Reiche
3,465,948 A 9/1969 Boyer
3,503,550 A 3/1970 Main et al.
3,551,945 A 1/1971 Eyberg et al.
3,670,948 A 6/1972 Berg
3,703,383 A 11/1972 Kuchenbecker
3,734,336 A 5/1973 Rankow et al.
3,736,221 A 5/1973 Evers et al.
3,747,743 A 7/1973 Hoffman, Jr.
3,749,299 A 7/1973 Ingle
3,836,044 A 9/1974 Tilp et al.
3,843,038 A 10/1974 Sax
3,850,362 A 11/1974 Stollberg et al.
3,880,341 A 4/1975 Bamburg et al.
3,883,065 A 5/1975 Presnick
3,887,743 A 6/1975 Lane
3,890,762 A 6/1975 Ernst et al.
3,919,372 A 11/1975 Vogele
3,945,561 A 3/1976 Strebelle
3,976,605 A 8/1976 Matsunaga et al.
3,980,005 A 9/1976 Buonaiuto
4,030,227 A 6/1977 Oftedahl
4,050,264 A 9/1977 Tanaka
4,068,779 A 1/1978 Canfield
4,091,852 A 5/1978 Jordan et al.
4,146,660 A 3/1979 Hall et al.
4,169,540 A 10/1979 Larsson et al.
4,170,304 A 10/1979 Huke
4,211,267 A 7/1980 Skovgaard
4,213,310 A 7/1980 Buss
4,335,844 A 6/1982 Egli
4,339,039 A 7/1982 Mykleby
4,342,416 A 8/1982 Philips
4,351,165 A 9/1982 Gottsegen et al.
4,380,314 A 4/1983 Langston, Jr. et al.
D270,041 S 8/1983 Vestal
4,396,144 A 8/1983 Gutierrez et al.
4,411,373 A 10/1983 Kupersmit
4,418,864 A 12/1983 Neilsen
4,488,623 A 12/1984 Linnell, II et al.
4,509,645 A 4/1985 Hotta
4,536,145 A 8/1985 Sawyer et al.
4,602,971 A 7/1986 Bergeron et al.

(56) References Cited

U.S. PATENT DOCUMENTS

| | | | |
|---|---|---|---|
| 4,679,242 | A | 7/1987 | Brockhaus |
| 4,682,708 | A | 7/1987 | Pool |
| 4,711,390 | A | 12/1987 | Andrews et al. |
| 4,797,010 | A | 1/1989 | Coelho |
| 4,805,776 | A | 2/1989 | Namgyal et al. |
| 4,819,793 | A | 4/1989 | Willard et al. |
| 4,828,133 | A | 5/1989 | Hougendobler |
| 4,830,282 | A | 5/1989 | Knight, Jr. |
| 4,889,252 | A | 12/1989 | Rockom et al. |
| 4,930,903 | A | 6/1990 | Mahoney |
| 4,953,705 | A | 9/1990 | Evamy |
| 4,988,216 | A | 1/1991 | Lyman |
| 4,989,780 | A | 2/1991 | Foote et al. |
| 5,016,813 | A | 5/1991 | Simons |
| 5,018,663 | A | 5/1991 | Corso |
| 5,020,481 | A | 6/1991 | Nelson |
| 5,062,527 | A | 11/1991 | Westerman |
| 5,094,547 | A | 3/1992 | Graham |
| 5,100,016 | A | 3/1992 | Wischusen, III |
| 5,102,004 | A | 4/1992 | Hollander et al. |
| 5,154,309 | A | 10/1992 | Wischusen, III et al. |
| 5,158,371 | A | 10/1992 | Moravek |
| 5,165,583 | A | 11/1992 | Kouwenberg |
| 5,185,904 | A | 2/1993 | Rogers et al. |
| 5,201,868 | A | 4/1993 | Johnson |
| 5,226,542 | A | 7/1993 | Boecker et al. |
| 5,229,447 | A | 7/1993 | Miyajima et al. |
| 5,230,450 | A | 7/1993 | Mahvi et al. |
| 5,263,339 | A | 11/1993 | Evans |
| 5,358,757 | A | 10/1994 | Robinette et al. |
| 5,372,429 | A | 12/1994 | Beaver, Jr. et al. |
| 5,417,342 | A | 5/1995 | Hutchison |
| 5,418,031 | A | 5/1995 | English |
| 5,441,170 | A | 8/1995 | Bane, III |
| 5,454,471 | A | 10/1995 | Norvell |
| 5,460,324 | A | 10/1995 | Vinther |
| 5,491,186 | A | 2/1996 | Kean et al. |
| 5,493,874 | A | 2/1996 | Landgrebe |
| 5,499,473 | A | 3/1996 | Ramberg |
| 5,505,810 | A | 4/1996 | Kirby et al. |
| 5,507,429 | A | 4/1996 | Arlin |
| 5,511,667 | A | 4/1996 | Carder |
| 5,512,345 | A | 4/1996 | Tsutsumi et al. |
| 5,516,580 | A | 5/1996 | Frenette et al. |
| 5,562,228 | A | 10/1996 | Ericson |
| 5,562,980 | A | 10/1996 | Koutitonsky |
| 5,573,119 | A | 11/1996 | Luray |
| 5,596,880 | A | 1/1997 | Welker et al. |
| 5,601,232 | A | 2/1997 | Greenlee |
| 5,613,610 | A | 3/1997 | Bradford |
| 5,615,795 | A | 4/1997 | Tipps |
| 5,637,368 | A | 6/1997 | Cadalbert et al. |
| 5,638,978 | A | 6/1997 | Cadiente |
| 5,683,772 | A | 11/1997 | Andersen et al. |
| 5,775,576 | A | 7/1998 | Stone |
| 5,804,024 | A | 9/1998 | Bloch et al. |
| 5,820,268 | A | 10/1998 | Becker et al. |
| 5,842,571 | A | 12/1998 | Rausch |
| 5,857,778 | A | 1/1999 | Ells |
| 5,906,290 | A | 5/1999 | Haberkorn |
| 5,922,379 | A | 7/1999 | Wang |
| 5,989,371 | A | 11/1999 | Nishimoto |
| 5,989,724 | A | 11/1999 | Wittosch et al. |
| 5,993,953 | A | 11/1999 | Takahashi et al. |
| 5,996,366 | A | 12/1999 | Renard |
| 6,003,719 | A | 12/1999 | Steward, III |
| 6,007,467 | A | 12/1999 | Becker et al. |
| 6,022,615 | A | 2/2000 | Rettenbacher |
| D421,457 | S | 3/2000 | Crofton |
| 6,041,958 | A | 3/2000 | Tremelo |
| 6,048,099 | A | 4/2000 | Muffett et al. |
| 6,050,410 | A | 4/2000 | Quirion |
| 6,050,412 | A | 4/2000 | Clough et al. |
| 6,068,402 | A | 5/2000 | Freese et al. |
| 6,080,096 | A | 6/2000 | Becker et al. |
| 6,083,586 | A | 7/2000 | Andersen et al. |
| 6,090,027 | A | 7/2000 | Brinkman |
| 6,132,822 | A | 10/2000 | Overcash et al. |
| 6,138,902 | A | 10/2000 | Welch |
| 6,164,526 | A | 12/2000 | Dalvey |
| 6,168,040 | B1 | 1/2001 | Sautner et al. |
| 6,179,025 | B1 | 1/2001 | Sutton |
| 6,200,404 | B1 | 3/2001 | Andersen et al. |
| 6,220,473 | B1 | 4/2001 | Lehman et al. |
| 6,223,551 | B1 | 5/2001 | Mitchell |
| 6,238,091 | B1 | 5/2001 | Mogil |
| 6,244,458 | B1 | 6/2001 | Frysinger et al. |
| 6,247,328 | B1 | 6/2001 | Mogil |
| 6,253,993 | B1 | 7/2001 | Lloyd et al. |
| 6,274,077 | B1 | 8/2001 | Hur et al. |
| 6,295,830 | B1 | 10/2001 | Newman |
| 6,295,860 | B1 | 10/2001 | Sakairi et al. |
| 6,296,134 | B1 | 10/2001 | Cardinale |
| 6,308,850 | B1 | 10/2001 | Coom et al. |
| 6,325,281 | B1 | 12/2001 | Grogan |
| 6,364,199 | B1 | 4/2002 | Rose |
| 6,406,649 | B1 | 6/2002 | Fisk |
| 6,416,620 | B1 | 7/2002 | Narancic et al. |
| 6,443,309 | B1 | 9/2002 | Becker |
| 6,453,682 | B1 | 9/2002 | Jennings et al. |
| 6,478,268 | B1 | 11/2002 | Bidwell et al. |
| 6,510,705 | B1 | 1/2003 | Jackson |
| 6,530,480 | B1 | 3/2003 | Hardy |
| 6,582,124 | B2 | 6/2003 | Mogil |
| 6,598,783 | B2 | 7/2003 | Brinkman |
| 6,618,868 | B2 | 9/2003 | Minnick |
| 6,641,758 | B1 | 11/2003 | Arentsen et al. |
| 6,688,133 | B1 | 2/2004 | Donefrio |
| 6,713,548 | B1 | 3/2004 | Zhang et al. |
| 6,725,783 | B2 | 4/2004 | Sekino |
| 6,726,017 | B2 | 4/2004 | Maresh et al. |
| 6,736,309 | B1 | 5/2004 | Westerman et al. |
| 6,771,183 | B2 | 8/2004 | Hunter |
| 6,821,019 | B2 | 11/2004 | Mogil |
| 6,837,420 | B2 | 1/2005 | Westerman et al. |
| 6,868,982 | B2 | 3/2005 | Gordon |
| 6,875,486 | B2 | 4/2005 | Miller |
| 6,878,199 | B2 | 4/2005 | Bowden et al. |
| 6,899,229 | B2 | 5/2005 | Dennison et al. |
| 6,910,582 | B2 | 6/2005 | Lantz |
| 6,913,389 | B2 | 7/2005 | Kannankeril et al. |
| 6,971,539 | B1 | 12/2005 | Abbe |
| 7,000,962 | B2 | 2/2006 | Le |
| 7,019,271 | B2 | 3/2006 | Wnek et al. |
| 7,041,369 | B1 | 5/2006 | Mackey et al. |
| 7,070,841 | B2 | 7/2006 | Benim et al. |
| 7,083,673 | B2 | 8/2006 | Bowden et al. |
| 7,094,192 | B2 | 8/2006 | Schoenberger et al. |
| 7,138,078 | B2 | 11/2006 | Gotoh |
| 7,140,773 | B2 | 11/2006 | Becker et al. |
| D534,797 | S | 1/2007 | El-Afandi |
| 7,170,040 | B1 | 1/2007 | Benim et al. |
| D545,189 | S | 6/2007 | El-Afandi |
| 7,225,632 | B2 | 6/2007 | Derifield |
| 7,225,970 | B2 | 6/2007 | Philips |
| 7,229,677 | B2 | 6/2007 | Miller |
| 7,235,308 | B2 | 6/2007 | Druckrey et al. |
| D546,679 | S | 7/2007 | El-Afandi |
| 7,255,261 | B2 | 8/2007 | Mesly |
| 7,264,147 | B1 | 9/2007 | Benson et al. |
| 7,270,358 | B2 | 9/2007 | Hirsch |
| 7,392,931 | B2 | 7/2008 | Issler |
| 7,452,316 | B2 | 11/2008 | Cals et al. |
| D582,676 | S | 12/2008 | Rothschild |
| 7,484,623 | B2 | 2/2009 | Goodrich |
| 7,487,904 | B2 | 2/2009 | McClure |
| 7,597,209 | B2 | 10/2009 | Rothschild et al. |
| 7,607,563 | B2 | 10/2009 | Hanna et al. |
| 7,659,316 | B2 | 2/2010 | Kittle et al. |
| 7,677,406 | B2 | 3/2010 | Maxson |
| 7,681,405 | B2 | 3/2010 | Williams |
| 7,784,301 | B2 | 8/2010 | Sasaki et al. |
| 7,807,773 | B2 | 10/2010 | Matsuoka et al. |
| 7,832,558 | B2 | 11/2010 | Cheng et al. |

(56) References Cited

U.S. PATENT DOCUMENTS 7,841,512 B2 11/2010 Westerman et al.
7,845,508 B2 12/2010 Rothschild et al.
7,870,992 B2 1/2011 Schille et al.
7,908,870 B2 * 3/2011 Williams .................. F25D 3/08 62/530
7,909,806 B2 3/2011 Goodman et al.
7,943,765 B2 5/2011 Muller et al.
7,955,428 B2 6/2011 Aoki et al.
7,967,904 B2 6/2011 Bowden et al.
7,971,720 B2 7/2011 Minkler
8,003,032 B2 8/2011 Al-Sabih et al.
8,118,177 B2 2/2012 Drapela et al.
8,153,783 B2 4/2012 Muller et al.
8,209,995 B2 7/2012 Kieling et al.
8,210,353 B2 7/2012 Epicureo
8,277,718 B2 10/2012 Aoki et al.
8,343,024 B1 1/2013 Contanzo, Jr. et al.
8,365,943 B2 2/2013 Bentley
8,389,110 B2 3/2013 Liu
8,465,404 B2 6/2013 Hadley
8,567,662 B2 10/2013 Costanzo, Jr.
8,579,183 B2 11/2013 Belfort et al.
8,596,520 B2 12/2013 Scott
8,613,202 B2 12/2013 Williams
8,651,593 B2 2/2014 Bezich et al.
8,679,826 B2 3/2014 Yamamoto et al.
8,763,811 B2 7/2014 Antz
8,763,886 B2 7/2014 Hall
D710,692 S 8/2014 Genender
8,795,470 B2 8/2014 Henderson et al.
8,875,885 B2 11/2014 Padden et al.
8,875,983 B2 11/2014 Lenhard et al.
8,919,082 B1 12/2014 Cataldo
8,960,528 B2 2/2015 Sadlier
9,139,319 B2 9/2015 Crespo et al.
9,199,782 B1 12/2015 Cliatt
9,217,253 B2 12/2015 Collison
9,272,475 B2 3/2016 Ranade et al.
9,290,313 B2 3/2016 De Lesseux et al.
9,322,136 B2 4/2016 Ostendorf et al.
D758,182 S 6/2016 Sponselee
9,358,576 B2 6/2016 Anderson et al.
9,394,633 B2 7/2016 Shimotsu et al.
D764,903 S 8/2016 Sanfilippo et al.
9,408,445 B2 8/2016 Mogil et al.
9,410,032 B2 8/2016 Kim et al.
9,429,350 B2 8/2016 Chapman, Jr.
9,457,929 B2 10/2016 Jenkins
9,499,294 B1 11/2016 Contanzo, Jr.
9,550,618 B1 1/2017 Jobe
9,580,846 B2 2/2017 Tseitlin et al.
9,605,382 B2 3/2017 Virtanen
9,611,067 B2 4/2017 Collison
9,635,916 B2 5/2017 Bezich et al.
9,656,779 B2 5/2017 Arki
9,688,454 B2 * 6/2017 Ranade ................. B32B 27/306
9,701,437 B2 7/2017 Bugas et al.
9,738,420 B2 8/2017 Miller
9,738,432 B1 8/2017 Petrucci et al.
9,834,366 B2 12/2017 Giuliani
9,856,069 B1 1/2018 Dong
9,908,680 B2 3/2018 Shi et al.
9,908,684 B2 3/2018 Collison
9,920,517 B2 3/2018 Sollie et al.
9,950,830 B2 4/2018 De Lesseux et al.
9,957,098 B2 5/2018 Jobe
9,981,797 B2 5/2018 Aksan et al.
10,046,901 B1 8/2018 Jobe
10,065,786 B2 * 9/2018 Kuhn ................. B65D 81/3823
10,094,126 B2 10/2018 Collison et al.
10,112,756 B2 10/2018 Menzel, Jr.
10,226,909 B2 3/2019 Frem et al.
10,266,332 B2 4/2019 Aksan et al.
10,273,073 B2 4/2019 Collison
10,357,936 B1 7/2019 Vincent et al.
10,392,156 B2 8/2019 McDonald et al.
10,400,105 B2 9/2019 Stevens
10,435,194 B2 10/2019 Sollie et al.
10,442,600 B2 10/2019 Waltermire et al.
10,449,694 B2 10/2019 Ojala et al.
10,507,968 B2 12/2019 Sollie et al.
10,550,523 B2 2/2020 Shih
10,551,110 B2 2/2020 Waltermire et al.
10,583,977 B2 3/2020 Collison et al.
10,604,304 B2 3/2020 Waltermire et al.
D881,690 S 4/2020 Smalley
10,661,941 B2 5/2020 Genender et al.
10,662,301 B2 5/2020 Krause et al.
10,676,263 B2 6/2020 Menzel, Jr.
10,745,542 B2 8/2020 Bastioli et al.
10,787,303 B2 9/2020 Chase et al.
10,800,595 B2 10/2020 Waltermire et al.
10,843,840 B2 11/2020 Sollie et al.
10,858,141 B2 12/2020 Sollie et al.
10,875,979 B2 12/2020 Ge et al.
10,882,681 B2 1/2021 Waltermire et al.
10,882,682 B2 1/2021 Collison et al.
10,882,683 B2 1/2021 Collison et al.
10,882,684 B2 1/2021 Sollie et al.
10,926,939 B2 2/2021 Collison et al.
10,941,977 B2 3/2021 Waltermire et al.
10,947,025 B2 3/2021 Sollie et al.
10,954,057 B2 3/2021 Waltermire et al.
10,954,058 B2 3/2021 Sollie et al.
11,027,875 B2 6/2021 Sollie et al.
11,046,500 B2 6/2021 Collison et al.
11,059,652 B2 7/2021 Sollie et al.
11,066,228 B2 7/2021 Sollie et al.
11,117,731 B2 9/2021 Waltermire et al.
11,124,354 B2 9/2021 Waltermire et al.
D934,064 S 10/2021 Satnick
11,137,198 B2 10/2021 Waltermire et al.
11,148,870 B2 10/2021 Collison et al.
11,203,458 B2 12/2021 Sollie et al.
11,214,427 B2 1/2022 Collison et al.
11,215,393 B2 1/2022 Waltermire et al.
11,230,404 B2 1/2022 Sollie et al.
11,247,806 B2 2/2022 Sollie et al.
11,247,827 B2 2/2022 Jobe
11,255,596 B2 2/2022 Waltermire et al.
11,261,017 B2 3/2022 Waltermire et al.
11,267,641 B2 3/2022 Collison et al.
11,286,099 B2 3/2022 Sollie et al.
11,312,563 B2 4/2022 Smith
11,325,772 B2 5/2022 Sollie et al.
D955,876 S 6/2022 Sill et al.
D957,246 S 7/2022 Culler et al.
D957,936 S 7/2022 Lincoln
D968,950 S 11/2022 Sollie et al.
11,485,566 B2 11/2022 Waltermire et al.
11,524,832 B2 12/2022 Sollie et al.
11,542,092 B2 1/2023 Sollie et al.
11,565,871 B2 1/2023 Waltermire et al.
11,618,608 B2 4/2023 Sollie et al.
11,623,783 B2 4/2023 Sollie et al.
11,628,978 B2 4/2023 Waltermire et al.
11,634,265 B2 4/2023 Collison et al.
11,679,925 B2 6/2023 Sollie et al.
11,692,762 B2 7/2023 Waltermire et al.
11,697,542 B2 7/2023 Sollie et al.
11,713,180 B2 8/2023 Sollie et al.
11,718,464 B2 8/2023 Sollie et al.
11,724,851 B2 8/2023 Sollie et al.
11,780,635 B2 10/2023 Sollie et al.
11,780,636 B2 10/2023 Sollie et al.
11,780,666 B2 10/2023 Collison et al.
11,820,579 B1 11/2023 Lantz
11,858,717 B2 1/2024 Waltermire et al.
11,919,699 B2 3/2024 Sollie et al.
11,940,204 B2 3/2024 Waltermire et al.
11,975,910 B2 5/2024 Sollie et al.
11,999,553 B2 6/2024 Sollie et al.
12,038,227 B2 7/2024 Waltermire et al.
12,060,214 B2 8/2024 Waltermire et al.

(56) References Cited

U.S. PATENT DOCUMENTS

| | | | |
|---|---|---|---|
| 12,179,990 | B2 | 12/2024 | Sollie et al. |
| 12,195,266 | B2 | 1/2025 | Sollie et al. |
| 2001/0010312 | A1 | 8/2001 | Mogil |
| 2001/0024716 | A1 | 9/2001 | Chen et al. |
| 2002/0020188 | A1 | 2/2002 | Sharon et al. |
| 2002/0050324 | A1 | 5/2002 | Middelstadt |
| 2002/0056500 | A1 | 5/2002 | Collison et al. |
| 2002/0064318 | A1 | 5/2002 | Malone et al. |
| 2002/0134698 | A1 | 9/2002 | Rhodes et al. |
| 2002/0162767 | A1 | 11/2002 | Ohtsubo |
| 2003/0099833 | A1 | 5/2003 | Erb, Jr. et al. |
| 2003/0113563 | A1 | 6/2003 | Buhring |
| 2003/0113565 | A1 | 6/2003 | Silver et al. |
| 2003/0145561 | A1 | 8/2003 | Cals et al. |
| 2003/0159777 | A1 | 8/2003 | Tsujimoto et al. |
| 2004/0004111 | A1 | 1/2004 | Cardinale |
| 2004/0031842 | A1 | 2/2004 | Westerman et al. |
| 2004/0079794 | A1 | 4/2004 | Mayer |
| 2004/0164132 | A1 | 8/2004 | Kuester |
| 2004/0209058 | A1 | 10/2004 | Chou et al. |
| 2005/0109655 | A1 | 5/2005 | Vershum et al. |
| 2005/0117817 | A1 | 6/2005 | Mogil et al. |
| 2005/0186417 | A1 | 8/2005 | Rodriguez |
| 2005/0189404 | A1 | 9/2005 | Xiaohai et al. |
| 2005/0214512 | A1 | 9/2005 | Fascio |
| 2005/0224501 | A1 | 10/2005 | Folkert et al. |
| 2005/0279963 | A1 | 12/2005 | Church et al. |
| 2006/0053828 | A1 | 3/2006 | Shallman et al. |
| 2006/0062990 | A1 | 3/2006 | Gotoh |
| 2006/0078720 | A1 | 4/2006 | Toas et al. |
| 2006/0096978 | A1 | 5/2006 | Lafferty et al. |
| 2006/0193541 | A1 | 8/2006 | Norcom |
| 2006/0235099 | A1 | 10/2006 | Kamite et al. |
| 2006/0243784 | A1 | 11/2006 | Glaser et al. |
| 2006/0255507 | A1 | 11/2006 | Bowden et al. |
| 2007/0000932 | A1 | 1/2007 | Cron et al. |
| 2007/0000983 | A1 | 1/2007 | Spurrell et al. |
| 2007/0012414 | A1 | 1/2007 | Kajander et al. |
| 2007/0051782 | A1 | 3/2007 | Lantz |
| 2007/0071368 | A1 | 3/2007 | Becker et al. |
| 2007/0122584 | A1 | 5/2007 | Song et al. |
| 2007/0151685 | A1 | 7/2007 | Horsfield et al. |
| 2007/0193298 | A1 | 8/2007 | Derifield |
| 2007/0209307 | A1 | 9/2007 | Andersen |
| 2007/0257040 | A1 | 11/2007 | Price et al. |
| 2008/0095959 | A1 | 4/2008 | Warner et al. |
| 2008/0095970 | A1 | 4/2008 | Takashima et al. |
| 2008/0135564 | A1 | 6/2008 | Romero |
| 2008/0173703 | A1 | 7/2008 | Westerman et al. |
| 2008/0190940 | A1 | 8/2008 | Scott |
| 2008/0203090 | A1 | 8/2008 | Dickinson |
| 2008/0268220 | A1 | 10/2008 | Olliges |
| 2008/0289302 | A1 | 11/2008 | Vulpitta |
| 2008/0296356 | A1 | 12/2008 | Hatcher et al. |
| 2008/0308616 | A1 | 12/2008 | Phung |
| 2008/0314794 | A1 | 12/2008 | Bowman |
| 2009/0034883 | A1 | 2/2009 | Giuliani |
| 2009/0078708 | A1* | 3/2009 | Williams ........... B65D 81/3825 220/592.2 |
| 2009/0114311 | A1 | 5/2009 | McDowell |
| 2009/0193765 | A1 | 8/2009 | Lantz |
| 2009/0214142 | A1 | 8/2009 | Bossel et al. |
| 2009/0275531 | A1 | 11/2009 | Muller et al. |
| 2009/0283578 | A1 | 11/2009 | Miller |
| 2009/0288791 | A1 | 11/2009 | Hammer et al. |
| 2010/0001056 | A1 | 1/2010 | Chandaria |
| 2010/0006630 | A1 | 1/2010 | Humphries et al. |
| 2010/0062921 | A1 | 3/2010 | Veiseh |
| 2010/0072105 | A1 | 3/2010 | Glaser et al. |
| 2010/0109196 | A1 | 5/2010 | Al-Sabih et al. |
| 2010/0139878 | A1 | 6/2010 | Clemente |
| 2010/0140124 | A1 | 6/2010 | Hafner |
| 2010/0151164 | A1 | 6/2010 | Grant et al. |
| 2010/0168260 | A1 | 7/2010 | Frenzel et al. |
| 2010/0219232 | A1 | 9/2010 | Smith |
| 2010/0258574 | A1 | 10/2010 | Bentley |
| 2010/0270317 | A1 | 10/2010 | Kieling et al. |
| 2010/0282827 | A1 | 11/2010 | Padovani |
| 2010/0284634 | A1 | 11/2010 | Hadley |
| 2010/0285294 | A1 | 11/2010 | Crane et al. |
| 2010/0291822 | A1 | 11/2010 | Netravali |
| 2010/0314397 | A1 | 12/2010 | Williams et al. |
| 2010/0314437 | A1 | 12/2010 | Dowd |
| 2011/0042388 | A1 | 2/2011 | Tristancho Tello |
| 2011/0042449 | A1 | 2/2011 | Copenhaver et al. |
| 2011/0100868 | A1 | 5/2011 | Lantz |
| 2011/0114513 | A1 | 5/2011 | Miller |
| 2011/0235950 | A1 | 9/2011 | Lin |
| 2011/0240515 | A1 | 10/2011 | Ridgeway |
| 2011/0244258 | A1 | 10/2011 | Vonfelden |
| 2011/0284556 | A1 | 11/2011 | Palmer et al. |
| 2011/0311758 | A1 | 12/2011 | Burns et al. |
| 2011/0317944 | A1 | 12/2011 | Liu |
| 2012/0031957 | A1 | 2/2012 | Whitaker |
| 2012/0074823 | A1 | 3/2012 | Bezich et al. |
| 2012/0097067 | A1 | 4/2012 | Fascio |
| 2012/0145568 | A1 | 6/2012 | Collison et al. |
| 2012/0178856 | A1 | 7/2012 | Gobl et al. |
| 2012/0193365 | A1 | 8/2012 | Humphries et al. |
| 2012/0243808 | A1 | 9/2012 | De Lesseux et al. |
| 2012/0248101 | A1 | 10/2012 | Tumber et al. |
| 2012/0251818 | A1 | 10/2012 | Axrup et al. |
| 2012/0276619 | A1 | 11/2012 | Yamamoto et al. |
| 2012/0279896 | A1 | 11/2012 | Lantz |
| 2012/0292226 | A1 | 11/2012 | Hilbish |
| 2012/0309246 | A1 | 12/2012 | Tseitlin et al. |
| 2012/0328807 | A1 | 12/2012 | Grimes |
| 2013/0017349 | A1 | 1/2013 | Heiskanen et al. |
| 2013/0026215 | A1 | 1/2013 | Lenhard et al. |
| 2013/0101855 | A1 | 4/2013 | Cham et al. |
| 2013/0112694 | A1 | 5/2013 | Bentley |
| 2013/0112695 | A1 | 5/2013 | Hall |
| 2013/0140317 | A1 | 6/2013 | Roskoss |
| 2013/0203879 | A1 | 8/2013 | Rensen et al. |
| 2013/0256940 | A1 | 10/2013 | Henderson et al. |
| 2014/0000306 | A1 | 1/2014 | Chapman, Jr. |
| 2014/0021208 | A1 | 1/2014 | Anti et al. |
| 2014/0093697 | A1 | 4/2014 | Perry et al. |
| 2014/0144161 | A1 | 5/2014 | Pointer et al. |
| 2014/0174682 | A1 | 6/2014 | Brungardt |
| 2014/0248003 | A1 | 9/2014 | Mogil et al. |
| 2014/0272163 | A1 | 9/2014 | Tilton |
| 2014/0272352 | A1 | 9/2014 | Tilton |
| 2014/0274633 | A1 | 9/2014 | Tilton |
| 2014/0300026 | A1 | 10/2014 | Taccolini |
| 2014/0312107 | A1 | 10/2014 | Nash |
| 2014/0319018 | A1 | 10/2014 | Collison |
| 2014/0367393 | A1 | 12/2014 | Ranade |
| 2015/0068696 | A1 | 3/2015 | Reed et al. |
| 2015/0110423 | A1 | 4/2015 | Fox et al. |
| 2015/0111011 | A1 | 4/2015 | Hoekstra et al. |
| 2015/0166244 | A1 | 6/2015 | Wood et al. |
| 2015/0175338 | A1 | 6/2015 | Culp et al. |
| 2015/0238033 | A1 | 8/2015 | Zavitsanos |
| 2015/0239639 | A1 | 8/2015 | Wenner et al. |
| 2015/0255009 | A1 | 9/2015 | Akhter et al. |
| 2015/0259126 | A1 | 9/2015 | McGoff et al. |
| 2015/0284131 | A1 | 10/2015 | Genender et al. |
| 2015/0345853 | A1 | 12/2015 | Oeyen |
| 2015/0367981 | A1 | 12/2015 | Moore |
| 2015/0377407 | A1 | 12/2015 | Shinoki et al. |
| 2016/0015039 | A1 | 1/2016 | Pierce |
| 2016/0052696 | A1 | 2/2016 | Cook et al. |
| 2016/0060017 | A1 | 3/2016 | De Lesseux et al. |
| 2016/0230343 | A1 | 8/2016 | Pang et al. |
| 2016/0236498 | A1 | 8/2016 | Anderson et al. |
| 2016/0264294 | A1 | 9/2016 | Bacon |
| 2016/0304267 | A1 | 10/2016 | Aksan |
| 2016/0312010 | A1 | 10/2016 | Alavi |
| 2016/0312941 | A1 | 10/2016 | Alavi et al. |
| 2016/0318648 | A1 | 11/2016 | Kuninobu |
| 2016/0325915 | A1 | 11/2016 | Aksan |
| 2016/0340064 | A1 | 11/2016 | Loda |
| 2017/0015080 | A1 | 1/2017 | Collison et al. |

(56) References Cited

U.S. PATENT DOCUMENTS

| | | | |
|---|---|---|---|
| 2017/0021961 | A1 | 1/2017 | Humphrey et al. |
| 2017/0043937 | A1 | 2/2017 | Lantz |
| 2017/0121052 | A1 | 5/2017 | Morimoto |
| 2017/0144792 | A1 | 5/2017 | Block |
| 2017/0198959 | A1 | 7/2017 | Morris |
| 2017/0217654 | A1 | 8/2017 | Harmon |
| 2017/0225870 | A1 | 8/2017 | Collison |
| 2017/0233134 | A9 | 8/2017 | Grajales et al. |
| 2017/0233165 | A1 | 8/2017 | Kuhn |
| 2017/0283157 | A1 | 10/2017 | Jobe |
| 2017/0305639 | A1 | 10/2017 | Kuhn et al. |
| 2017/0320653 | A1 | 11/2017 | Mogil et al. |
| 2017/0334622 | A1 | 11/2017 | Menzel, Jr. |
| 2017/0341847 | A1 | 11/2017 | Chase et al. |
| 2017/0361973 | A1 | 12/2017 | Padilla |
| 2017/0369226 | A1 | 12/2017 | Chase et al. |
| 2017/0369667 | A1 | 12/2017 | Ruckdaschel et al. |
| 2018/0002451 | A1 | 1/2018 | Ge et al. |
| 2018/0050857 | A1 | 2/2018 | Collison |
| 2018/0051460 | A1 | 2/2018 | Sollie et al. |
| 2018/0086539 | A1 | 3/2018 | Aksan et al. |
| 2018/0148245 | A1 | 5/2018 | Aggarwal et al. |
| 2018/0148246 | A1 | 5/2018 | Fu et al. |
| 2018/0194534 | A1 | 7/2018 | Jobe |
| 2018/0215525 | A1 | 8/2018 | Vogel et al. |
| 2018/0229917 | A1 | 8/2018 | Jobe |
| 2018/0237207 | A1 | 8/2018 | Aksan et al. |
| 2018/0274837 | A1 | 9/2018 | Christensen |
| 2018/0290813 | A1 | 10/2018 | Waltermire et al. |
| 2018/0290815 | A1 | 10/2018 | Waltermire et al. |
| 2018/0299059 | A1 | 10/2018 | McGoff et al. |
| 2018/0319569 | A1 | 11/2018 | McGoff et al. |
| 2018/0327171 | A1 | 11/2018 | Waltermire et al. |
| 2018/0327172 | A1 | 11/2018 | Waltermire et al. |
| 2018/0334308 | A1 | 11/2018 | Moore et al. |
| 2018/0335241 | A1 | 11/2018 | Li et al. |
| 2019/0009946 | A1 | 1/2019 | Nixon et al. |
| 2019/0032991 | A1 | 1/2019 | Waltermire et al. |
| 2019/0040221 | A1 | 2/2019 | Hitzler et al. |
| 2019/0047775 | A1 | 2/2019 | Waltermire et al. |
| 2019/0071550 | A1 | 3/2019 | Ge et al. |
| 2019/0085155 | A1 | 3/2019 | Niles |
| 2019/0144155 | A1 | 5/2019 | Geng et al. |
| 2019/0185246 | A1 | 6/2019 | Sollie et al. |
| 2019/0185247 | A1 | 6/2019 | Sollie et al. |
| 2019/0193916 | A1 | 6/2019 | Waltermire et al. |
| 2019/0210790 | A1 | 7/2019 | Rizzo et al. |
| 2019/0234679 | A1 | 8/2019 | Waltermire et al. |
| 2019/0248573 | A1 | 8/2019 | Collison et al. |
| 2019/0270572 | A1 | 9/2019 | Collison et al. |
| 2019/0270573 | A1 | 9/2019 | Collison et al. |
| 2019/0352075 | A1 | 11/2019 | Waltermire et al. |
| 2019/0352076 | A1 | 11/2019 | Waltermire et al. |
| 2019/0352080 | A1 | 11/2019 | Waltermire et al. |
| 2019/0359411 | A1 | 11/2019 | Fallgren |
| 2019/0359412 | A1 | 11/2019 | Sollie et al. |
| 2019/0359413 | A1 | 11/2019 | Sollie et al. |
| 2019/0359414 | A1 | 11/2019 | Sollie et al. |
| 2019/0367208 | A1 | 12/2019 | Jobe |
| 2019/0367209 | A1 | 12/2019 | Jobe |
| 2019/0376636 | A1 | 12/2019 | Fellinger et al. |
| 2019/0382186 | A1 | 12/2019 | Sollie et al. |
| 2019/0390892 | A1 | 12/2019 | Waltermire et al. |
| 2020/0047976 | A1 | 2/2020 | Collison et al. |
| 2020/0048422 | A1 | 2/2020 | Doug et al. |
| 2020/0071056 | A1 | 3/2020 | Henderson et al. |
| 2020/0088458 | A1 | 3/2020 | Waltermire et al. |
| 2020/0103159 | A1 | 4/2020 | Waltermire et al. |
| 2020/0122896 | A1 | 4/2020 | Waltermire et al. |
| 2020/0129338 | A1 | 4/2020 | Gardiner et al. |
| 2020/0140179 | A1 | 5/2020 | Costanzo, Jr. |
| 2020/0148409 | A1 | 5/2020 | Sollie et al. |
| 2020/0148410 | A1 | 5/2020 | Sollie et al. |
| 2020/0148452 | A1 | 5/2020 | Sollie et al. |
| 2020/0148453 | A1 | 5/2020 | Sollie et al. |
| 2020/0214314 | A1 | 7/2020 | Bakker et al. |
| 2020/0283188 | A1 | 9/2020 | Sollie et al. |
| 2020/0308359 | A1 | 10/2020 | Glenn et al. |
| 2020/0318292 | A1 | 10/2020 | Alden et al. |
| 2020/0346816 | A1 | 11/2020 | Sollie et al. |
| 2020/0346841 | A1 | 11/2020 | Sollie et al. |
| 2021/0039869 | A1 | 2/2021 | Waltermire et al. |
| 2021/0039870 | A1 | 2/2021 | Sollie et al. |
| 2021/0039871 | A1 | 2/2021 | Sollie et al. |
| 2021/0070527 | A1 | 3/2021 | Sollie et al. |
| 2021/0070529 | A1 | 3/2021 | Sollie et al. |
| 2021/0070530 | A1 | 3/2021 | Sollie et al. |
| 2021/0078755 | A1 | 3/2021 | Sollie et al. |
| 2021/0101734 | A1 | 4/2021 | Collison et al. |
| 2021/0101735 | A1 | 4/2021 | Collison et al. |
| 2021/0101736 | A1 | 4/2021 | Waltermire et al. |
| 2021/0101737 | A1 | 4/2021 | Waltermire et al. |
| 2021/0102746 | A1 | 4/2021 | Waltermire et al. |
| 2021/0155365 | A1 | 5/2021 | Sollie et al. |
| 2021/0155367 | A1 | 5/2021 | Sollie et al. |
| 2021/0163210 | A1 | 6/2021 | Waltermire et al. |
| 2021/0179313 | A1 | 6/2021 | Sollie et al. |
| 2021/0179337 | A1 | 6/2021 | Sollie et al. |
| 2021/0347553 | A1 | 11/2021 | Sollie et al. |
| 2022/0017260 | A1 | 1/2022 | Sollie et al. |
| 2022/0024634 | A1 | 1/2022 | Sollie et al. |
| 2022/0024635 | A1 | 1/2022 | Sollie et al. |
| 2022/0026140 | A1 | 1/2022 | Waltermire et al. |
| 2022/0026141 | A1 | 1/2022 | Waltermire et al. |
| 2022/0033167 | A1 | 2/2022 | Collison et al. |
| 2022/0081152 | A1 | 3/2022 | Sollie et al. |
| 2022/0081186 | A1 | 3/2022 | Waltermire et al. |
| 2022/0177216 | A1 | 6/2022 | Sollie et al. |
| 2022/0185533 | A1 | 6/2022 | Chen et al. |
| 2022/0242607 | A1 | 8/2022 | Sollie et al. |
| 2022/0251783 | A1 | 8/2022 | Anagnostopoulos et al. |
| 2022/0288870 | A1 | 9/2022 | Collison et al. |
| 2022/0297918 | A1 | 9/2022 | Collison et al. |
| 2022/0388755 | A1 | 12/2022 | Waltermire et al. |
| 2022/0411167 | A1 | 12/2022 | Sollie et al. |
| 2023/0125191 | A1 | 4/2023 | Waltermire et al. |
| 2023/0159213 | A1 | 5/2023 | Sollie et al. |
| 2023/0159214 | A1 | 5/2023 | Sollie et al. |
| 2023/0182990 | A1 | 6/2023 | Sollie et al. |
| 2023/0227210 | A1 | 7/2023 | Waltermire et al. |
| 2023/0280087 | A1 | 9/2023 | Waltermire et al. |
| 2023/0322466 | A1 | 10/2023 | Sollie et al. |
| 2023/0322467 | A1 | 10/2023 | Sollie et al. |
| 2023/0322468 | A1 | 10/2023 | Sollie et al. |
| 2023/0382627 | A1 | 11/2023 | Collison et al. |
| 2024/0067438 | A1 | 2/2024 | Waltermire et al. |
| 2024/0083659 | A1 | 3/2024 | Sollie et al. |
| 2024/0159455 | A1 | 5/2024 | Waltermire et al. |
| 2024/0159456 | A1 | 5/2024 | Waltermire et al. |
| 2024/0262600 | A1 | 8/2024 | Collison et al. |
| 2024/0318899 | A1 | 9/2024 | Waltermire et al. |
| 2024/0336424 | A1 | 10/2024 | Waltermire et al. |
| 2025/0100775 | A1 | 3/2025 | Sollie et al. |

FOREIGN PATENT DOCUMENTS

| | | | |
|---|---|---|---|
| AU | 2018260918 | B2 | 5/2024 |
| AU | 2018260919 | B2 | 5/2024 |
| AU | 2018264050 | | 10/2024 |
| AU | 2018260911 | B2 | 11/2024 |
| AU | 2018260914 | B2 | 12/2024 |
| AU | 2018260920 | B2 | 12/2024 |
| CA | 2019104 | | 12/1991 |
| CA | 2097735 | | 12/1994 |
| CA | 2145953 | | 10/1996 |
| CA | 2149939 | | 11/1996 |
| CN | 1073993 | | 7/1993 |
| CN | 1503962 | | 6/2004 |
| CN | 102206361 | | 10/2011 |
| CN | 102264961 | | 11/2011 |
| CN | 206494316 | | 9/2017 |
| CN | 108001787 | | 5/2018 |
| CN | 110204794 | | 9/2019 |
| CN | 117071332 | A | 11/2023 |

(56) References Cited

FOREIGN PATENT DOCUMENTS

| | | | |
|---|---|---|---|
| DE | 1897846 | | 7/1964 |
| DE | 102011016500 | | 10/2012 |
| DE | 202017103230 | | 7/2017 |
| DE | 202017003908 | | 10/2017 |
| DE | 202018101998 | | 7/2019 |
| DE | 202019003407 | | 11/2019 |
| EP | 0133539 | | 2/1985 |
| EP | 0537058 | | 4/1993 |
| EP | 2781652 | | 12/2015 |
| EP | 2990196 | | 3/2016 |
| EP | 3144248 | | 3/2017 |
| EP | 3348493 | | 7/2018 |
| EP | 3538708 | | 1/2022 |
| EP | 4071298 | B1 | 1/2024 |
| EP | 4043639 | B1 | 1/2025 |
| FR | 1241878 | | 9/1960 |
| FR | 2705317 | | 11/1994 |
| FR | 2820718 | | 8/2002 |
| FR | 2821786 | | 9/2002 |
| FR | 3016352 | | 7/2015 |
| GB | 217683 | | 6/1924 |
| GB | 235673 | | 6/1925 |
| GB | 528289 | | 1/1940 |
| GB | 713640 | | 8/1954 |
| GB | 1204058 | | 9/1970 |
| GB | 1305212 | | 1/1973 |
| GB | 1372054 | | 10/1974 |
| GB | 2029461 | | 3/1980 |
| GB | 2400096 | | 5/2006 |
| GB | 2516490 | | 1/2015 |
| GB | 2528289 | | 1/2016 |
| GB | 2534912 | | 8/2016 |
| JP | 01254557 | | 10/1989 |
| JP | H0632386 | | 2/1994 |
| JP | H06135487 | | 5/1994 |
| JP | 2001009949 | | 1/2001 |
| JP | 2005139582 | | 6/2005 |
| JP | 2005247329 | | 9/2005 |
| JP | 2006158584 | | 6/2006 |
| JP | 4069255 | | 4/2008 |
| JP | 2012126440 | | 7/2012 |
| JP | 2017079632 | | 5/2017 |
| KR | 101730461 | | 4/2017 |
| WO | 8807476 | | 10/1988 |
| WO | 9726192 | | 7/1997 |
| WO | 9932374 | | 7/1999 |
| WO | 2001070592 | | 9/2001 |
| WO | 2009026256 | | 2/2009 |
| WO | 2014147425 | | 9/2014 |
| WO | 2016187435 | A2 | 5/2016 |
| WO | 2016187435 | A3 | 11/2016 |
| WO | 2017207974 | | 12/2017 |
| WO | 2018089365 | | 5/2018 |
| WO | 2018093586 | | 5/2018 |
| WO | 2018227047 | | 12/2018 |
| WO | 2019113453 | | 6/2019 |
| WO | 2019125904 | | 6/2019 |
| WO | 2019125906 | | 6/2019 |
| WO | 2019226199 | | 11/2019 |
| WO | 2020011587 | | 1/2020 |
| WO | 2020101939 | | 5/2020 |
| WO | 2020102023 | | 5/2020 |
| WO | 2020122921 | | 6/2020 |
| WO | 2020222943 | | 11/2020 |

OTHER PUBLICATIONS

US 10,899,530 B2, 01/2021, Sollie et al. (withdrawn)
US 10,899,531 B2, 01/2021, Sollie et al. (withdrawn)
US 11,027,908 B2, 06/2021, Sollie et al. (withdrawn)
US 11,040,817 B2, 06/2021, Sollie et al. (withdrawn)
US 11,072,486 B2, 07/2021, Waltermire et al. (withdrawn)
US 11,079,168 B2, 08/2021, Waltermire et al. (withdrawn)
US 11,084,644 B2, 08/2021, Waltermire et al. (withdrawn)
US 11,167,877 B2, 11/2021, Sollie et al. (withdrawn)
US 11,167,878 B2, 11/2021, Sollie et al. (withdrawn)
US 11,247,836 B2, 02/2022, Sollie et al. (withdrawn)
US 11,292,656 B2, 04/2022, Sollie et al. (withdrawn)
US D959,977 S, 08/2022, Sollie et al. (withdrawn)
US 11,479,403 B2, 10/2022, Sollie et al. (withdrawn)
US 11,498,745 B2, 11/2022, Sollie et al. (withdrawn)
US 11,591,131 B2, 02/2023, Sollie et al. (withdrawn)
US 11,591,132 B2, 02/2023, Sollie et al. (withdrawn)
US 11,603,253 B2, 03/2023, Collison et al. (withdrawn)
US 11,613,421 B2, 03/2023, Sollie et al. (withdrawn)
Sollie, Greg; Non-Final Office Action for U.S. Appl. No. 17/536,878, filed Nov. 29, 2021, mailed Apr. 12, 2023, 140 pgs.
DHL Express; Brochure for Dry Ice Shipping Guidelines, accessed on Oct. 26, 2018, 12 pgs.
Sollie, Greg; Corrected Notice of Allowance for U.S. Appl. No. 16/382,710, filed Apr. 12, 2019, mailed Sep. 24, 2020, 9 pgs.
Sollie, Greg; Final Office Action for U.S. Appl. No. 16/382,710, filed Apr. 12, 2019, mailed Apr. 6, 2020, 33 pgs.
Sollie, Greg; Non-Final Office Action for U.S. Appl. No. 16/382,710, filed Apr. 12, 2019, mailed Oct. 10, 2019, 49 pgs.
Sollie, Greg; Notice of Allowance for U.S. Appl. No. 16/382,710, filed Apr. 12, 2019, mailed Oct. 21, 2020, 5 pgs.
Sollie, Greg; Notice of Allowance for U.S. Appl. No. 16/382,710, filed Apr. 12, 2019, mailed Jun. 3, 2020, 12 pgs.
Sollie, Greg; Requirement for Restriction/Election for U.S. Appl. No. 16/382,710, filed Apr. 12, 2019, mailed Jul. 15, 2019, 6 pgs.
Sollie, Greg; Certificate of Correction for U.S. Appl. No. 16/879,811, filed May 21, 2020, mailed Feb. 8, 2022, 1 pg.
Sollie, Greg; Non-Final Office Action for U.S. Appl. No. 16/879,811, filed May 21, 2020, mailed Jun. 22, 2021, 93 pgs.
Sollie, Greg; Notice of Allowance for U.S. Appl. No. 16/879,811, filed May 21, 2020, mailed Jul. 7, 2021, 5 pgs.
Sollie, Greg; Requirement for Restriction/Election for U.S. Appl. No. 16/879,811, filed May 21, 2020, mailed Apr. 15, 2021, 6 pgs.
Sollie, Greg; Non-Final Office Action for U.S. Appl. No. 17/492,285, filed Oct. 1, 2021, mailed Jul. 11, 2022, 109 pgs.
Sollie, Greg; Notice of Allowance for U.S. Appl. No. 17/492,285, filed Oct. 1, 2021, mailed Feb. 8, 2023, 25 pgs.
Sollie, Greg; Certificate of Correction for U.S. Appl. No. 16/567,192, filed Sep. 11, 2019, mailed Feb. 16, 2021, 1 pg.
Sollie, Greg; Corrected Notice of Allowance for U.S. Appl. No. 16/567,192, filed Sep. 11, 2019, mailed Oct. 20, 2020, 8 pgs.
Sollie, Greg; Final Office Action for U.S. Appl. No. 16/567,192, filed Sep. 11, 2019, mailed Jun. 8, 2020, 20 pgs.
Sollie, Greg; Non-Final Office Action for U.S. Appl. No. 16/567,192, filed Sep. 11, 2019, mailed Dec. 10, 2019, 49 pgs.
Sollie, Greg; Notice of Allowance for U.S. Appl. No. 16/567,192, filed Sep. 11, 2019, mailed Aug. 7, 2020, 14 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Sollie, Greg; Final Office Action for U.S. Appl. No. 16/408,981, filed May 10, 2019, mailed Dec. 29, 2020, 22 pgs.
Sollie, Greg; Final Office Action for U.S. Appl. No. 16/408,981, filed May 10, 2019, mailed Feb. 24, 2020, 29 pgs.
Sollie, Greg; Non-Final Office Action for U.S. Appl. No. 16/408,981, filed May 10, 2019, mailed Aug. 20, 2019, 50 pgs.
Sollie, Greg; Non-Final Office Action for U.S. Appl. No. 16/408,981, filed May 10, 2019, mailed Sep. 16, 2020, 40 pgs.
Sollie, Greg; Notice of Allowance for U.S. Appl. No. 16/408,981, filed May 10, 2019, mailed Feb. 23, 2021, 6 pgs.
Sollie, Greg; Certificate of Correction for U.S. Appl. No. 17/185,616, filed Feb. 25, 2021, mailed Feb. 28, 2023, 2 pgs.
Sollie, Greg; Final Office Action for U.S. Appl. No. 17/185,616, filed Feb. 25, 2021, mailed Jan. 28, 2022, 37 bgs.
Sollie, Greg; Non-Final Office Action for U.S. Appl. No. 17/185,616, filed Feb. 25, 2021, mailed Sep. 15, 2021, 103 pgs.
Sollie, Greg; Notice of Allowance for U.S. Appl. No. 17/185,616, filed Feb. 25, 2021, mailed Jun. 17, 2022, 18 pgs.
Sollie, Greg; Non-Final Office Action for U.S. Appl. No. 17/901,558, filed Sep. 1, 2022, mailed Feb. 15, 2023, 128 pgs.

(56) References Cited

OTHER PUBLICATIONS

Sollie, Greg; Non-Final Office Action for U.S. Appl. No. 16/886,040, filed May 28, 2020, mailed Mar. 30, 2021, 89 pgs.
Sollie, Greg; Notice of Allowance for U.S. Appl. No. 16/886,040, filed May 28, 2020, mailed Nov. 18, 2021, 10 pgs.
Sollie, Greg; Notice of Allowance for U.S. Appl. No. 16/886,040, filed May 28, 2020, mailed Jul. 7, 2021, 12 pgs.
Sollie, Greg; Requirement for Restriction/Election for U.S. Appl. No. 16/886,040, filed May 28, 2020, mailed Dec. 23, 2020, 6 pgs.
Sollie, Greg; Notice of Allowance for U.S. Appl. No. 17/493,449, filed Oct. 4, 2021, mailed Oct. 13, 2022, 10 pgs.
Sollie, Greg; Non-Final Office Action for U.S. Appl. No. 18/094,806, filed Jan. 9, 2023, mailed Apr. 21, 2023, 118 pgs.
Sollie, Greg; Non-Final Office Action for U.S. Appl. No. 17/493,474, filed Oct. 4, 2021, mailed Jul. 11, 2022, 112 pgs.
Sollie, Greg; Notice of Allowance for U.S. Appl. No. 17/493,474, filed Oct. 4, 2021, mailed Oct. 13, 2022, 15 pgs.
Sollie, Greg; Non-Final Office Action for U.S. Appl. No. 18/095,310, filed Jan. 10, 2023, mailed Apr. 24, 2023, 118 pgs.
Sollie, Greg; Non-Final Office Action for U.S. Appl. No. 17/307,650, filed May 4, 2021, mailed Nov. 30, 2022, 139 pgs.
Sollie, Greg; Notice of Allowance for U.S. Appl. No. 17/307,650, filed May 4, 2021, mailed Mar. 9, 2023, 15 pgs.
Sollie, Greg; Requirement for Restriction/Election for U.S. Appl. No. 17/307,650, filed May 4, 2021, mailed Oct. 28, 2022, 6 pgs.
Anagnostopoulos, John; Non-Final Office Action for U.S. Appl. No. 17/666,206, filed Feb. 7, 2022, mailed Apr. 19, 2023, 139 pgs.
Avella, et al.; Article entitled: "Biodegradable PVOH-based foams for packaging applications", Journal of Cellular Plastics 2011, 47:271, 12 pgs.
Moo-Tun, et al.; Article entitled: "Assessing the effect of PLA, cellulose microfibers and CaCO3 on the properties of starch-based foams using a factorial design", Polymer Testing 86 (2020) 106482, available on Mar. 8, 2020, 10 pgs.
Salgado, et al.; Article entitled: "Biodegradable foams based on cassava starch, sunflower proteins and cellulose fibers obtained by a baking process", Journal of Food Engineering 85 (2008) 435-443, available online Aug. 15, 2007, 9 pgs.
Schmidt, et al.; Article entitled: "Characterization of Foams Obtained from Cassava Starch, Cellulose Fibres and Dolomitic Limestone by a Thermopressing Process", Brazilian Archives of Biology and Technology vol. 53, n. 1, pp. 88-192, Jan.-Feb. 2010, 8 pgs.
Waltermire, Jamie; International Preliminary Report on Patentability for PCT Application No. PCT/US18/65464, filed Dec. 13, 2018, mailed Jun. 24, 2021, 8 pgs.
Waltermire, Jamie; International Search Report and Written Opinion for PCT Application No. PCT/US18/65464, filed Dec. 13, 2018, mailed Mar. 11, 2019, 9 pgs.
Waltermire, Jamie; Non-Final Office Action for U.S. Appl. No. 17/891,565, filed Aug. 19, 2022, mailed Sep. 6, 2023, 115 pgs.
Waltermire, Jamie; Requirement for Restriction/Election for U.S. Appl. No. 17/173,293, filed Feb. 11, 2021, mailed Aug. 30, 2023, 6 pgs.
Waltermire, Jamie; Notice of Allowance for U.S. Appl. No. 17/127,050, filed Dec. 18, 2020, mailed Aug. 7, 2023, 14 pgs.
Waltermire, Jamie; Non-Final Office Action for U.S. Appl. No. 17/497,054, filed Oct. 8, 2021, mailed Aug. 3, 2023, 24 pgs.
Waltermire, Jamie; Certificate of Correction for U.S. Appl. No. 17/497,057, filed Oct. 8, 2021, mailed Sep. 5, 2023, 1 pg.
Sollie, Greg; Certificate of Correction for U.S. Appl. No. 16/951,465, filed Nov. 18, 2020, mailed Aug. 1, 2023, 1 pg.
Collison, Alan B .; Advisory Action for U.S. Appl. No. 17/688,356, filed Mar. 7, 2022, mailed Jul. 25, 2023, 6 pgs.
Collison, Alan B.; Non-Final Office Action for U.S. Appl. No. 17/688,356, filed Mar. 7, 2022, mailed Jul. 31, 2023, 18 pgs.
Solie, Greg; Certificate of Correction for U.S. Appl. No. 16/280,595, filed Feb. 20, 2019, mailed Sep. 12, 2023, 2 pgs.
Sollie, Greg; Notice of Allowance for U.S. Appl. No. 17/679,772, filed Feb. 24, 2022, mailed Aug. 30, 2023, 12 pgs.
Sollie, Greg; Final Office Action for U.S. Appl. No. 17/901,558, filed Sep. 1, 2022, mailed Aug. 21, 2023, 25 pgs.
Sollie, Greg; Certificate of Correction for U.S. Appl. No. 17/493,449, filed Oct. 4, 2021, mailed Aug. 15, 2023, 1 pg.
Sollie, Greg; Notice of Allowance for U.S. Appl. No. 18/094,806, filed Jan. 9, 2023, mailed Jul. 21, 2023, 12 pgs.
Sollie, Greg; Certificate of Correction for U.S. Appl. No. 17/493,474, filed Oct. 4, 2021, mailed Aug. 1, 2023, 3 pgs.
Sollie, Greg; Notice of Allowance for U.S. Appl. No. 18/095,310, filed Jan. 10, 2023, mailed Jul. 28, 2023, 19 pgs.
Waltermire, Kamie; Non-Final Office Action for U.S. Appl. No. 17/127,102, filed Dec. 28, 2020, mailed Jan. 12, 2023, 19 pgs.
Waltermire, Jamie; Final Office Action for U.S. Appl. No. 16/689,433, filed Nov. 20, 2019, mailed Aug. 5, 2021, 23 pgs.
Waltermire, Jamie; Non-Final Office Action for U.S. Appl. No. 16/689,433, filed Nov. 20, 2019, mailed Feb. 23, 2021, 88 pgs.
Waltermire, Jamie; Notice of Allowance for U.S. Appl. No. 16/689,433, filed Nov. 20, 2019, mailed Oct. 15, 2021, 14 pgs.
Waltermire, Jamie; Requirement for Restriction/Election for U.S. Appl. No. 16/689,433, filed Nov. 20, 2019, mailed Oct. 16, 2020, 6 pgs.
Waltermire, Jamie; Final Office Action for U.S. Appl. No. 17/497,054, filed Oct. 8, 2021, mailed Apr. 24, 2023, 33 pgs.
Waltermire, Jamie; Non-Final Office Action for U.S. Appl. No. 17/497,054, filed Oct. 8, 2021, mailed Nov. 15, 2022, 131 pgs.
Waltermire, Jamie; Requirement for Restriction/Election for U.S. Appl. No. 17/497,054, filed Oct. 8, 2021, mailed Oct. 6, 2022, 8 pgs.
Waltermire, Jamie; Non-Final Office Action for U.S. Appl. No. 17/497,057, filed Oct. 8, 2021, mailed Oct. 19, 2022, 115 pgs.
Waltermire, Jamie; Notice of Allowance for U.S. Appl. No. 17/497,057, filed Oct. 8, 2021, mailed Feb. 16, 2023, 25 pgs.
Waltermire, Jamie; Requirement for Restriction/Election for U.S. Appl. No. 17/497,057, filed Oct. 8, 2021, mailed Sep. 15, 2022, 8 pgs.
Sollie, Greg; Non-Final Office Action for U.S. Appl. No. 15/845,545, filed Dec. 18, 2017, mailed Mar. 5, 2019, 41 pgs.
Sollie, Greg; Notice of Allowance for U.S. Appl. No. 15/845,545, filed Dec. 18, 2017, mailed Jun. 19, 2019, 20 pgs.
Sollie, Greg; Final Office Action for U.S. Appl. No. 16/552,277, filed Aug. 27, 2019, mailed Aug. 7, 2020, 19 pgs.
Sollie, Greg; Non-Final Office Action for U.S. Appl. No. 16/552,277, filed Aug. 27, 2019, mailed Jun. 3, 2020, 68 pgs.
Sollie, Greg; Notice of Allowance for U.S. Appl. No. 16/552,277, filed Aug. 27, 2019, mailed Aug. 31, 2020, 6 pgs.
Sollie, Greg; Restriction Requirement for U.S. Appl. No. 16/552,277, filed Aug. 27, 2019, mailed Apr. 20, 2020, 7 pgs.
Sollie, Greg; Non-Final Office Action for U.S. Appl. No. 16/951,454, filed Nov. 18, 2020, mailed Aug. 4, 2022, 165 pgs.
Sollie, Greg; Notice of Allowance for U.S. Appl. No. 16/951,454, filed Nov. 18, 2020, mailed Nov. 15, 2022, 13 pgs.
Sollie, Greg; Notice of Allowance for U.S. Appl. No. 16/951,454, filed Nov. 18, 2020, mailed May 2, 2023, 6 pgs.
Sollie, Greg; Restriction Requirement for U.S. Appl. No. 16/951,454, filed Nov. 18, 2020, mailed Jun. 14, 2022, 14 pgs.
Sollie, Greg; Applicant-Initiated Interview Summary for U.S. Appl. No. 16/951,465, filed Nov. 18, 2020, mailed Oct. 5, 2022, 2 pgs.
Sollie, Greg; Non-Final Office Action for U.S. Appl. No. 16/951,465, filed Nov. 18, 2020, mailed Dec. 13, 2022, 17 pgs.
Sollie, Greg; Non-Final Office Action for U.S. Appl. No. 16/951,465, filed Nov. 18, 2020, mailed May 13, 2022, 123 pgs.
Sollie, Greg; Notice of Allowance for U.S. Appl. No. 16/951,465, filed Nov. 18, 2020, mailed Feb. 28, 2023, 12 pgs.
Sollie, Greg; Certificate of Correction for U.S. Appl. No. 15/845,540, filed Dec. 18, 2017, mailed Jun. 1, 2021, 1 pg.
Sollie, Greg; Final Office Action for U.S. Appl. No. 15/845,540, filed Dec. 18, 2017, mailed Oct. 30, 2019, 56 pgs.
Sollie, Greg; Final Office Action for U.S. Appl. No. 15/845,540, filed Dec. 18, 2017, mailed Sep. 2, 2020, 28 pgs.
Sollie, Greg; Non-Final Office Action for U.S. Appl. No. 15/845,540, filed Dec. 18, 2017, mailed Feb. 19, 2020, 32 pgs.
Sollie, Greg; Non-Final Office Action for U.S. Appl. No. 15/845,540, filed Dec. 18, 2017, mailed Apr. 2, 2019, 50 pgs.

(56) References Cited

OTHER PUBLICATIONS

Sollie, Greg; Notice of Allowance for U.S. Appl. No. 15/845,540, filed Dec. 18, 2017, mailed Sep. 17, 2020, 5 pgs.
Sollie, Greg; Certificate of Correction for U.S. Appl. No. 17/100,819, filed Nov. 21, 2020, mailed Feb. 28, 2023, 2 pgs.
Sollie, Greg; Final Office Action for U.S. Appl. No. 17/100,819, filed Nov. 21, 2020, mailed Apr. 13, 2022, 39 pgs.
Sollie, Greg; Non-Final Office Action for U.S. Appl. No. 17/100,819, filed Nov. 21, 2020, mailed Sep. 29, 2021, 107 pgs.
Sollie, Greg; Notice of Allowance for U.S. Appl. No. 17/100,819, filed Nov. 21, 2020, mailed Sep. 7, 2022, 15 pgs.
"Green Cell Foam Shipping Coolers", located at <https://www.greencellfoam.com/shipping-coolers>, accessed on Oct. 18, 2019, 4 pgs.
Collison, Alan B.; Applicant Interview Summary for U.S. Appl. No. 15/677,738, filed Aug. 15, 2017, mailed Dec. 5, 2018, 4 pgs.
Collison, Alan B.; Applicant Interview Summary for U.S. Appl. No. 15/677,738, filed Aug. 15, 2017, mailed Apr. 22, 2019, 4 pgs.
Collison, Alan B.; Corrected Notice of Allowance for U.S. Appl. No. 15/677,738, filed Aug. 15, 2017, mailed Jul. 15, 2019, 7 pgs.
Collison, Alan B.; Final Office ACtion for U.S. Appl. No. 15/677,738, filed Aug. 15, 2017, mailed Feb. 28, 2019, 14 pgs.
Collison, Alan B.; Non-Final Office Action for U.S. Appl. No. 15/677,738, filed Aug. 15, 2017, mailed Oct. 23, 2018, 11 pgs.
Collison, Alan B.; Notice of Allowance for U.S. Appl. No. 15/677,738, filed Aug. 15, 2017, mailed Oct. 29, 2019, 14 pgs.
Collison, Alan B.; Notice of Allowance for U.S. Appl. No. 15/677,738, filed Aug. 15, 2017, mailed Jun. 19, 2019, 10 pgs.
Collison, Alan B.; Requirement for Restriction/Election for U.S. Appl. No. 15/677,738, filed Aug. 15, 2017, mailed Jul. 3, 2018, 8 pgs .
Collison, Alan B.; Requirement for Restriction/Election for U.S. Appl. No. 15/677,738, filed Aug. 15, 2017, mailed Jul. 31, 2018, 8 pgs.
Collison, Alan B.; Supplemental Notice of Allowance for U.S. Appl. No. 15/677,738, filed Aug. 15, 2017, mailed Dec. 10, 2019, 4 pgs.
CooLiner® Insulated Shipping Bags, available at <http://www/chem-tran.com/packaging/supplies/cooliner-insulated-shipping-bags.php>, accessed on Oct. 18, 2019, 4 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf.
Collison, Alan B.; Advisory Action for U.S. Appl. No. 16/658,756, filed Oct. 21, 2019, mailed Sep. 25, 2020, 4 pgs.
Collison, Alan B.; Applicant Interview Summary for U.S. Appl. No. 16/658,756, filed Oct. 21, 2019, mailed May 6, 2020, 3 pgs.
Sollie, Greg; Final Office Action for U.S. Appl. No. 15/988,550, filed May 24, 2018, mailed Aug. 14, 2019, 19 pgs.
Sollie, Greg; Final Office Action for U.S. Appl. No. 15/988,550, filed May 24, 2018, mailed Aug. 27, 2020, 27 pgs.
Sollie, Greg; Non-Final Office Action for U.S. Appl. No. 15/988,550, filed May 24, 2018, mailed Oct. 9, 2019, 17 pgs.
Sollie, Greg; Non-Final Office Action for U.S. Appl. No. 15/988,550, filed May 24, 2018, mailed Mar. 11, 2020, 35 pgs.
Sollie, Greg; Non-Final Office Action for U.S. Appl. No. 15/988,550, filed May 24, 2018, mailed May 29, 2019, 48 pgs.
Sollie, Greg; Notice of Allowance for U.S. Appl. No. 15/988,550, filed May 24, 2018, mailed Apr. 13, 2021, 21 pgs.
Sollie, Greg; Advisory Action for U.S. Appl. No. 16/280,595, filed Feb. 20, 2019, mailed Jul. 6, 2020, 3 pgs.
Sollie, Greg; Applicant-Initiated Interview Summary for U.S. Appl. No. 16/280,595, filed Feb. 20, 2019 mailed May 6, 2020, 3 pgs.
Sollie, Greg; Final Office Action for U.S. Appl. No. 16/280,595, filed Feb. 20, 2019, mailed Oct. 3, 2019, 19 pgs.
Sollie, Greg; Final Office Action for U.S. Appl. No. 16/280,595, filed Feb. 20, 2019, mailed Dec. 30, 2020, 25 pgs.
Sollie, Greg; Final Office Action for U.S. Appl. No. 16/280,595, filed Feb. 20, 2019, mailed Mar. 24, 2020, 20 pgs.
Sollie, Greg; Final Office Action for U.S. Appl. No. 16/280,595, filed Feb. 20, 2019, mailed May 31, 2022, 27 pgs.
Sollie, Greg; Final Office Action for U.S. Appl. No. 16/280,595, filed Feb. 20, 2019, mailed Aug. 16, 2021, 21 pgs.
Sollie, Greg; Non-Final Office Action for U.S. Appl. No. 16/280,595, filed Feb. 20, 2019, mailed Dec. 19, 2019, 23 pgs.
Sollie, Greg; Non-Final Office Action for U.S. Appl. No. 16/280,595, filed Feb. 20, 2019, mailed Dec. 8, 2021, 17 pgs.
Sollie, Greg; Non-Final Office Action for U.S. Appl. No. 16/280,595, filed Feb. 20, 2019, mailed Apr. 9, 2021, 20 pgs.
Sollie, Greg; Non-Final Office Action for U.S. Appl. No. 16/280,595, filed Feb. 20, 2019, mailed May 29, 2019, 60 pgs.
Sollie, Greg; Non-Final Office Action for U.S. Appl. No. 16/280,595, filed Feb. 20, 2019, mailed Aug. 28, 2020, 26 pgs.
Sollie, Greg; Non-Final Office Action for U.S. Appl. No. 16/280,595, filed 2/20/20219, mailed Sep. 16, 2022, 14 pgs.
Sollie, Greg; Notice of Allowance for U.S. Appl. No. 16/280,595, filed Feb. 20, 2019, mailed Mar. 31, 2023, 27 pgs.
Sollie, Greg; Advisory Action for U.S. Appl. No. 16/530,052, filed Aug. 2, 2019, mailed Mar. 9, 2022, 4 pgs.
Sollie, Greg; Advisory Action for U.S. Appl. No. 16/530,052, filed Aug. 2, 2019, mailed Jun. 29, 2021, 15 pgs.
Sollie, Greg; Applicant-Initiated Interview Summary for U.S. Appl. No. 16/530,052, filed Aug. 2, 2019, mailed Feb. 5, 2020, 2 pgs.
Sollie, Greg; Final Office Action for U.S. Appl. No. 16/530,052, filed Aug. 2, 2019, mailed Dec. 27, 2019, 49 pgs.
Sollie, Greg; Final Office Action for U.S. Appl. No. 16/530,052, filed Aug. 2, 2019, mailed Dec. 8, 2021, 17 pgs.
Sollie, Greg; Final Office Action for U.S. Appl. No. 16/530,052, filed Aug. 2, 2019, mailed Apr. 20, 2021, 27 pgs.
Sollie, Greg; Final Office Action for U.S. Appl. No. 16/530,052, filed Aug. 2, 2019, mailed Aug. 28, 2020, 29 pgs.
Sollie, Greg; Non-Final Office Action for U.S. Appl. No. 16/530,052, filed Aug. 2, 2019, mailed Oct. 2, 2019, 12 pgs.
Sollie, Greg; Non-Final Office Action for U.S. Appl. No. 16/530,052, filed Aug. 2, 2019, mailed Dec. 18, 2020, 17 pgs.
Sollie, Greg; Non-Final Office Action for U.S. Appl. No. 16/530,052, filed Aug. 2, 2019, mailed Mar. 3, 2020, 24 pgs.
Sollie, Greg; Non-Final Office Action for U.S. Appl. No. 16/530,052, filed Aug. 2, 2019, mailed Aug. 13, 2021, 22 pgs.
Cellulose Material Solutions, LLC; Brochure for Infinity Care Thermal Liner, accessed on Oct. 22, 2018, 2 pgs.
Sollie, Greg; Applicant-Initiated Interview Summary for U.S. Appl. No. 16/401,603, filed May 2, 2019, mailed May 15, 2020, 3 pgs.
Sollie, Greg; Final Office Action for U.S. Appl. No. 16/401,603, filed May 2, 2019, mailed Jun. 30, 2020, 13 pgs.
Sollie, Greg; Non-Final Office Action for U.S. Appl. No. 16/401,603, filed May 2, 2019, mailed Mar. 10, 2020, 67 pgs.
Sollie, Greg; Notice of Allowance for U.S. Appl. No. 16/401,603, filed May 2, 2019, mailed Aug. 31, 2020, 14 pgs.
Sollie, Greg; Requirement for Restriction/Election for U.S. Appl. No. 16/401,603, filed May 2, 2019, mailed Feb. 18, 2020, 6 pgs.
Sollie, Greg; Non-Final Office Action for U.S. Appl. No. 17/078,884, filed Oct. 23, 2020, mailed Aug. 12, 2021, 105 pgs.
Sollie, Greg; Notice of Allowance for U.S. Appl. No. 17/078,884, filed Oct. 23, 2020, mailed Nov. 22, 2021, 12 pgs.
Sollie, Greg; Applicant-Initiated Interview Summary for U.S. Appl. No. 17/078,891, filed Oct. 23, 2020, mailed Oct. 25, 2021, 2 pgs.
Sollie, Greg; Non-Final Office Action for U.S. Appl. No. 17/078,891, filed Oct. 23, 2020, mailed Aug. 23, 2021, 104 pgs.
Sollie, Greg; Notice of Allowance for U.S. Appl. No. 17/078,891, filed Oct. 23, 2020, mailed Dec. 1, 2021, 12 pgs.
Sollie, Greg; Non-Final Office Action for U.S. Appl. No. 17/679,772, filed Feb. 24, 2022, mailed Oct. 17, 2022, 108 pgs.
Sollie, Greg; Non-Final Office Action for U.S. Appl. No. 17/679,772, filed Feb. 24, 2022, mailed May 2, 2023, 29 pgs.
Sollie, Greg; Non-Final Office Action for U.S. Appl. No. 16/401,607, filed May 2, 2019, mailed Aug. 19, 2020, 88 pgs.
Sollie, Greg; Notice of Allowance for U.S. Appl. No. 16/401,607, filed May 2, 2019, mailed Dec. 4, 2020, 12 pgs.

(56) References Cited

OTHER PUBLICATIONS

Uline; Article entitled: Corrugated Corner Protectors—4 x 4", accessed on Oct. 25, 2018, 1 pg.
Sollie, Greg; Certificate of Correction for U.S. Appl. No. 17/187,239, filed Feb. 26, 2021, mailed Apr. 26, 2022, 1 pg.
Sollie, Greg; Non-Final Office Action for U.S. Appl. No. 17/187,239, filed Feb. 26, 2021, mailed Sep. 21, 2021, 99 pgs.
Sollie, Greg; Notice of Allowance for U.S. Appl. No. 17/187,239, filed Feb. 26, 2021, mailed Oct. 13, 2021, 5 pgs.
Collison, Alan B.; Applicant Interview Summary for U.S. Appl. No. 16/658,756, filed Oct. 21, 2019, mailed Jun. 29, 2020, 3 pgs.
Collison, Alan B.; Final Office Action for U.S. Appl. No. 16/658,756, filed Oct. 21, 2019, mailed Jun. 17, 2020, 10 pgs.
Collison, Alan B.; Non-Final Office Action for U.S. Appl. No. 16/658,756, filed Oct. 21, 2019, mailed Feb. 4, 2020, 14 pgs.
Collison, Alan B.; Notice of Allowance for U.S. Appl. No. 16/658,756, filed Oct. 21, 2019, mailed Oct. 23, 2020, 10 pgs.
MP Global Products LLC: European Search Report for serial No. 17868605.1, mailed Mar. 16, 2020, 7 pgs.
MP Global Products LLC: Office Action for European application No. 17868605.1, mailed Dec. 3, 2020, 4 pgs.
MP Global Products, LLC; Examination Report for Australian patent application No. 2017359035, mailed Nov. 27, 2020, 3 pgs.
MP Global Products, LLC; Office Action for Chinese patent application No. 201780081689.7, mailed Nov. 2, 2020, 17 pgs.
Collison, Alan B.; Non-Final Office Action for U.S. Appl. No. 17/181,377, filed Feb. 22, 2021, mailed Jul. 1, 2021, 22 pgs.
Collison, Alan B.; Notice of Allowance for U.S. Appl. No. 17/181,377, filed Feb. 22, 2021, mailed Oct. 21, 2021, 6 pgs.
Collison, Alan B.; Restriction Requirement for U.S. Appl. No. 17/181,377, filed Feb. 22, 2021, mailed Apr. 22, 2021, 6 pgs.
MP Global Products LLC; Office Action for Chinese Patent Application No. 201780081689.7, mailed May 14, 2021, 17 pgs.
MP Global Products, LLC; Decision on Rejection for Chinese patent application No. 201780081689.7, mailed Sep. 23, 2021, 15 pgs.
Collison, Alan B.; Applicant-Initiated Interview Summary for U.S. Appl. No. 16/414,309, filed May 16, 2019, mailed Aug. 21, 2020, 3 pgs.
Collison, Alan B.; Applicant-Initiated Interview Summary for U.S. Appl. No. 16/414,309, filed May 16, 2019, mailed Oct. 15, 2020, 3 pgs.
Collison, Alan B.; Certificate of Correction for U.S. Appl. No. 16/414,309, filed May 16, 2019, mailed Mar. 9, 2021, 1 pg.
Collison, Alan B.; Final Office Action for U.S. Appl. No. 16/414,309, filed May 16, 2019, mailed Oct. 8, 2020, 15 pgs.
Collison, Alan B.; Non-Final Office Action for U.S. Appl. No. 16/414,309, filed May 16, 2019, mailed Jul. 17, 2020, 77 pgs.
Collison, Alan B.; Notice of Allowance for U.S. Appl. No. 16/414,309, filed May 16, 2019, mailed Oct. 21, 2020, 6 pgs.
Collison, Alan B.; Requirement for Restriction/Election for U.S. Appl. No. 16/414,309, filed May 16, 2019, mailed Jun. 16, 2020, 5 pgs.
Collison, Alan B.; Applicant-Initiated Interview Summary for U.S. Appl. No. 17/123,673, filed Dec. 16, 2020, mailed Jun. 24, 2021, 2 pgs.
Collison, Alan B.; Certificate of Correction for U.S. Appl. No. 11/214,427, filed Dec. 16, 2020, mailed Mar. 29, 2022, 1 pg.
Collison, Alan B.; Non-Final Office Action for U.S. Appl. No. 17/123,673, filed Dec. 16, 2020, mailed Mar. 23, 2021, 86 pgs.
Collison, Alan B.; Notice of Allowance for U.S. Appl. No. 17/123,673, filed Dec. 16, 2020, mailed Jul. 1, 2021, 12 pgs.
Collison, Alan B.; Applicant-Initiated Interview Summary for U.S. Appl. No. 16/414,310, filed May 16, 2019, mailed Jul. 30, 2020, 3 pgs.
Collison, Alan B.; Non-Final Office Action for U.S. Appl. No. 16/414,310, filed May 16, 2019, mailed Jul. 8, 2020, 84 pgs.
Collison, Alan B.; Notice of Allowance for U.S. Appl. No. 16/414,310, filed May 16, 2019, mailed Nov. 13, 2020, 15 pgs.
Collison, Alan; Final Office Action for U.S. Appl. No. 16/414,310, filed May 16, 2019, mailed Oct. 13, 2020, 30 pgs.
Collison, Alan B.; Applicant-Initiated Interview Summary for U.S. Appl. No. 17/123,676, filed Dec. 16, 2020, mailed May 4, 2021, 4 pgs.
Collison, Alan B.; Certificate of Correction for U.S. Appl. No. 17/123,676, filed Dec. 16, 2020, mailed Jan. 4, 2021, 1 pg.
Collison, Alan B.; Non-Final Office Action for U.S. Appl. No. 17/123,676, filed Dec. 16, 2020, mailed Feb. 3, 2021, 23 pgs.
Collison, Alan B.; Notice of Allowance for U.S. Appl. No. 17/123,676, filed Dec. 16, 2020, mailed May 13, 2021, 93 pgs.
Collison, Alan B.; Applicant-Initiated Interview Summary for U.S. Appl. No. 17/502,599, filed Oct. 15, 2021, mailed Oct. 27, 2022, 2 pgs.
Collison, Alan B.; Certificate of Correction for U.S. Appl. No. 17/502,599, filed Oct. 15, 2021, mailed Jun. 6, 2023, 1 pg.
Collison, Alan B.; Non-Final Office Action for U.S. Appl. No. 17/502,599, filed Oct. 15, 2021, mailed Nov. 30, 2021, 6 pgs.
Collison, Alan B.; Non-Final Office Action for U.S. Appl. No. 17/502,599, filed Oct. 15, 2021, mailed Sep. 12, 2022, 12 pgs.
Collison, Alan B.; Notice of Allowance for U.S. Appl. No. 17/502,599, filed Oct. 15, 2021, mailed Jan. 23, 2023, 12 pgs.
Collison, Alan B.; Notice of Allowance for U.S. Appl. No. 17/502,599, filed Oct. 15, 2021, mailed Mar. 9, 2022, 94 pgs.
Collison, Alan B.; Applicant-Initiated Interview Summary for U.S. Appl. No. 17/834,999, filed Jun. 8, 2022, mailed Oct. 27, 2022, 2 pgs.
Collison, Alan B.; Non-Final Office Action for U.S. Appl. No. 17/834,999, filed Jun. 8, 2022, mailed Jan. 27, 2023, 28 pgs.
Collison, Alan B.; Non-Final Office Action for U.S. Appl. No. 17/834,999, filed Jun. 8, 2022, mailed Sep. 12, 2022, 104 pgs.
Collison, Alan B.; Notice of Allowance for U.S. Appl. No. 17/834,999, filed Jun. 8, 2022, mailed May 18, 2023, 14 pgs.
Collison, Alan B.; Advisory Action for U.S. Appl. No. 17/688,356, filed Mar. 7, 2022, mailed Apr. 26, 2023, 7 pgs.
Collison, Alan B.; Applicant-Initiated Interview Summary for U.S. Appl. No. 17/688,356, filed Mar. 7, 2022, mailed Dec. 28, 2022, 3 pgs.
Collison, Alan B.; Applicant-Initiated Interview Summary for U.S. Appl. No. 17/688,356, filed Mar. 7, 2022, mailed Apr. 6, 2023, 3 pgs.
Collison, Alan B.; Final Office Action for U.S. Appl. No. 17/688,356, filed Mar. 7, 2022, mailed Feb. 1, 2023, 21 pgs.
Collison, Alan B.; Non-Final Office Action for U.S. Appl. No. 17/688,356, filed Mar. 7, 2022, mailed Oct. 24, 2022, 41 pgs.
Collison, Alan B.; Restriction Requirement for U.S. Appl. No. 17/688,356, filed Mar. 7, 2022, mailed Jun. 20, 2022, 9 pgs.
Sollie, Greg; Applicant Initiated Interview Summary for U.S. Appl. No. 15/988,550, filed May 24, 2018, mailed Dec. 27, 2019, 3 pgs.
Sollie, Greg; Applicant-Initiated Interview Summary for U.S. Appl. No. 15/988,550, filed May 24, 2018, mailed Dec. 24, 2020, 2 pgs.
Waltermire, Jamie; Final Office Action for U.S. Appl. No. 16/293,716, filed Mar. 6, 2019, mailed Oct. 29, 2020, 19 pgs.
Waltermire, Jamie; Final Office Action for U.S. Appl. No. 16/293,716, filed Mar. 6, 2019, mailed Sep. 10, 2020, 24 pgs.
Waltermire, Jamie; Non-Final Office Action for U.S. Appl. No. 16/293,716, filed Mar. 6, 2019, mailed Feb. 5, 2021, 18 pgs.
Waltermire, Jamie; Non-Final Office Action for U.S. Appl. No. 16/293,716, filed Mar. 6, 2019, mailed May 5, 2020, 70 pgs.
Waltermire, Jamie; Non-Final Office Action for U.S. Appl. No. 16/293,716, filed Mar. 6, 2019, mailed Jul. 26, 2021, 26 pgs.
Waltermire, Jamie; Notice of Allowance for U.S. Appl. No. 16/293,716, filed Mar. 6, 2019, mailed Nov. 3, 2021, 20 pgs.
Waltermire, Jamie; Requirement for Restriction/Election for U.S. Appl. No. 16/293,716, filed Mar. 6, 2019, mailed Feb. 26, 2020, 6 pgs.
Waltermire, Jamie; Certificate of Correction for U.S. Appl. No. 16/526,555, filed Jul. 30, 2019, mailed Nov. 16, 2021, 1 pg.
Waltermire, Jamie; Final Office Action for U.S. Appl. No. 16/526,555, filed Jul. 30, 2019, mailed Mar. 8, 2021, 25 pgs.
Waltermire, Jamie; Non-Final Office Action for U.S. Appl. No. 16/526,555, filed Jul. 30, 2019, mailed Oct. 27, 2020, 39 pgs.

(56) References Cited

OTHER PUBLICATIONS

Waltermire, Jamie; Non-Final Office Action for U.S. Appl. No. 16/526,555, filed Jul. 30, 2019, mailed Apr. 2, 2020, 63 pgs.
Waltermire, Jamie; Notice of Allowance for U.S. Appl. No. 16/526,555, filed Jul. 30, 2019, mailed May 21, 2021, 32 pgs.
Waltermire, Jamie; Requirement for Restriction/Election for U.S. Appl. No. 16/526,555, filed Jul. 30, 2019, mailed Jan. 17, 2020, 7 pgs.
Waltermire, Jamie; Supplemental Notice of Allowance for U.S. Appl. No. 16/526,555, filed Jul. 30, 2019, mailed Jun. 8, 2021, 13 pgs.
Waltermire, Jamie; Supplemental Notice of Allowance for U.S. Appl. No. 16/526,555, filed Jul. 30, 2019, mailed Aug. 11, 2021, 8 pgs.
Waltermire, Jamie; Final Office Action for U.S. Appl. No. 17/127,050, filed Dec. 18, 2020, mailed Apr. 26, 2023, 32 pgs.
Waltermire, Jamie; Non-Final Office Action for U.S. Appl. No. 17/127,050, filed Dec. 18, 2020, mailed Dec. 2, 2022, 22 pgs.
Waltermire, Jamie; Non-Final Office Action for U.S. Appl. No. 17/127,050, filed Dec. 18, 2020, mailed Jun. 17, 2022, 147 pgs.
Waltermire, Jamie; Requirement for Restriction/Election for U.S. Appl. No. 17/127,050, filed Dec. 18, 2020, mailed Apr. 14, 2022, 5 pgs.
Waltermire, Jamie; Non-Final Office Action for U.S. Appl. No. 17/127,060, filed Dec. 18, 2020, mailed Jun. 21, 2023, 159 pgs.
Waltermire, Jamie; Final Office Action for U.S. Appl. No. 15/663,905, filed Jul. 31, 2017, mailed Aug. 22, 2019, 23 pgs.
Waltermire, Jamie; Non-Final Office Action for U.S. Appl. No. 15/663,905, filed Jul. 31, 2017, mailed Jun. 25, 2019, 66 pgs.
Waltermire, Jamie; Notice of Allowance for U.S. Appl. No. 15/663,905, filed Jul. 31, 2017, mailed Nov. 4, 2019, 18 pgs.
Waltermire, Jamie; Requirement for Restriction/Election for U.S. Appl. No. 15/663,905, filed Jul. 31, 2017, mailed Mar. 21, 2019, 8 pgs.
Waltermire, Jamie; Advisory Action for U.S. Appl. No. 16/381,678, filed Apr. 11, 2019, mailed Feb. 26, 2020, 3 pgs.
Waltermire, Jamie; Corrected Notice of Allowance for U.S. Appl. No. 16/381,678, filed Apr. 11, 2019, mailed Aug. 9, 2021, 8 pgs.
Waltermire, Jamie; Examiner-Initiated Interview Summary for U.S. Appl. No. 16/381,678, filed Apr. 11, 2019, mailed Aug. 30, 2021, 2 pgs.
Waltermire, Jamie; Final Office Action for U.S. Appl. No. 16/381,678, filed Apr. 11, 2019, mailed Oct. 19, 2020, 24 pgs.
Waltermire, Jamie; Final Office Action for U.S. Appl. No. 16/381,678, filed Apr. 11, 2019, mailed Dec. 30, 2019, 17 pgs.
Waltermire, Jamie; Final Office Action for U.S. Appl. No. 16/381,678, filed Apr. 11, 2019, mailed Jun. 16, 2020, 8 pgs.
Waltermire, Jamie; Final Office Action for U.S. Appl. No. 16/381,678, filed Apr. 11, 2019, mailed Aug. 20, 2020, 21 pgs.
Waltermire, Jamie; Non-Final Office Action for U.S. Appl. No. 16/381,678, filed Apr. 11, 2019, mailed Mar. 5, 2021, 36 pgs.
Waltermire, Jamie; Non-Final Office Action for U.S. Appl. No. 16/381,678, filed Apr. 11, 2019, mailed Apr. 17, 2020, 30 pgs.
Waltermire, Jamie; Non-Final Office Action for U.S. Appl. No. 16/381,678, filed Apr. 11, 2019, mailed Sep. 9, 2019, 50 pgs.
Waltermire, Jamie; Notice of Allowance for U.S. Appl. No. 16/381,678, filed Apr. 11, 2019, mailed Jun. 3, 2021, 14 pgs.
Waltermire, Jamie; Notice of Allowance for U.S. Appl. No. 16/381,678, filed Apr. 11, 2019, mailed Jul. 30, 2020, 15 pgs.
Waltermire, Jamie; Final Office Action for U.S. Appl. No. 16/561,203, filed Sep. 5, 2019, mailed Sep. 10, 2020, 25 pgs.
Waltermire, Jamie; Non-Final Office Action for U.S. Appl. No. 16/561,203, filed Sep. 5, 2019, mailed May 6, 2020, 59 pgs.
Waltermire, Jamie; Notice of Allowance for U.S. Appl. No. 16/561,203, filed Sep. 5, 2019, mailed Nov. 3, 2020, 14 pgs.
Waltermire, Jamie; Requirement for Restriction/Election for U.S. Appl. No. 16/561,203, filed Sep. 5, 2019, mailed Feb. 26, 2020, 5 pgs.
Waltermire, Jamie; Final Office Action for U.S. Appl. No. 16/689,407, filed Nov. 20, 2019, mailed Apr. 23, 2021, 18 pgs.
Waltermire, Jamie; Non-Final Office Action for U.S. Appl. No. 16/689,407, filed Nov. 20, 2019, mailed Jan. 8, 2021, 92 pgs.
Waltermire, Jamie; Notice of Allowance for U.S. Appl. No. 16/689,407, filed Nov. 20, 2019, mailed Jul. 19, 2021, 12 pgs.
Waltermire, Jamie; Requirement for Restriction/Election for U.S. Appl. No. 16/689,407, filed Nov. 20, 2019, mailed Oct. 29, 2020, 6 pgs.
Waltermire, Jamie; Advisory Action for U.S. Appl. No. 17/127,102, filed Dec. 18, 2020, mailed Dec. 7, 2022, 4 pgs.
Waltermire, Jamie; Applicant-Initiated Interview Summary for U.S. Appl. No. 17/127,102, filed Dec. 18, 2020, mailed Oct. 31, 2022, 2 pgs.
Waltermire, Jamie; Final Office Action for U.S. Appl. No. 17/127,102, filed Dec. 18, 2020, mailed Oct. 5, 2022, 31 pgs.
Waltermire, Jamie; Final Office Action for U.S. Appl. No. 17/127,102, filed Dec. 18, 2020, mailed Jul. 6, 2023, 35 pgs.
Waltermire, Jamie; Non-Final Office Action for U.S. Appl. No. 17/127,102, filed Dec. 18, 2020, mailed Jun. 27, 2022, 128 pgs.
Waltermire, Jamie; Requirement for Restriction/Election for U.S. Appl. No. 17/127,102, filed Dec. 18, 2020, mailed Apr. 14, 2022, 6 pgs.
Waltermire, Jamie; Final Office Action for U.S. Appl. No. 17/127,060, filed Dec. 18, 2020, mailed Oct. 19, 2023, 44 pgs.
Waltermire, Jamie; Notice of Allowance for U.S. Appl. No. 17/127,102, filed Dec. 18, 2020, mailed Oct. 20, 2023, 10 pgs.
Waltermire, Jamie; Final Office Action for U.S. Appl. No. 17/497,054, filed Oct. 8, 2021, mailed Nov. 28, 2023, 26 pgs.
Collison, Alan B.; Final Office Action for U.S. Appl. No. 17/688,356, filed Mar. 7, 2022, mailed Nov. 21, 2023, 29 pgs.
Sollie, Greg; Final Office Action for U.S. Appl. No. 17/536,878, filed Nov. 29, 2021, mailed Oct. 20, 2023, 29 pgs.
Anagnostopoulos, John; Final Office Action for U.S. Appl. No. 17/666,206, filed Feb. 7, 2022, mailed Oct. 2, 2023, 32 pgs.
paperweb.com, 2006, downloaded online Sep. 26, 2023 from archive.org (Year: 2006), 1 pg.
Sollie, Greg; Examination Report for Australian application No. 2018260918, filed Nov. 8, 2018, mailed Oct. 13, 2023, 5 pgs.
Sollie, Greg; Examination Report for Australian application No. 2018260918, filed Nov. 8, 2018, mailed Dec. 2, 2023, 5 pgs.
Sollie, Greg; Examination Report for Australian patent application No. 2018260919, filed Nov. 8, 2018, mailed Oct. 16, 2023, 4 pgs.
Sollie, Greg; Examination Report for Australian patent application No. 2018260919, filed Nov. 8, 2018, mailed Dec. 5, 2023, 4 pgs.
Waltermire, Jamie; Certificate of Correction for U.S. Appl. No. 15/482,186, filed Apr. 7, 2017, mailed Dec. 29, 2020, 1 pg.
Waltermire, Jamie; Non-Final Office Action for U.S. Appl. No. 15/482,186, filed Apr. 7, 2017, mailed Aug. 20, 2019, 81 pgs.
Waltermire, Jamie; Notice of Allowance for U.S. Appl. No. 15/482,186, filed Apr. 7, 2017, mailed Mar. 5, 2020, 29 pgs.
Waltermire, Jamie; Requirement for Restriction/Election for U.S. Appl. No. 15/482,186, filed Apr. 7, 2017, mailed Apr. 17, 2019, 7 pgs.
Waltermire, Jamie; Applicant-Initiated Interview Summary for U.S. Appl. No. 16/526,511, filed Jul. 30, 2019, mailed Jun. 12, 2020, 5 pgs.
Waltermire, Jamie; Final Office Action for U.S. Appl. No. 16/526,511, filed Jul. 30, 2019, mailed May 19, 2020, 39 pgs.
Waltermire, Jamie; Non-Final Office Action for U.S. Appl. No. 16/526,511, filed Jul. 30, 2019, mailed Dec. 9, 2019, 55 pgs.
Waltermire, Jamie; Non-Final Office Action for U.S. Appl. No. 16/526,511, filed Jul. 30, 2019, mailed Jul. 10, 2020, 23 pgs.
Waltermire, Jamie; Notice of Allowance for U.S. Appl. No. 16/526,511, filed Jul. 30, 2019, mailed Sep. 14, 2020, 18 pgs.
Carlson, Dave; Article entitled: "FBA Updates Voluntary Standard for Recyclable Wax Alternatives", dated Aug. 14, 2013, Fiber Box Association (Year: 2013), 2 pgs.
Waltermire, Jamie; Final Office Action for U.S. Appl. No. 17/079,437, filed Oct. 24, 2020, mailed Feb. 24, 2022, 24 pgs.
Waltermire, Jamie; Non-Final Office Action for U.S. Appl. No. 17/079,437, filed Oct. 24, 2020, mailed Sep. 20, 2021, 108 pgs.
Waltermire, Jamie; Notice of Allowance for U.S. Appl. No. 17/079,437, filed Oct. 24, 2020, mailed Jun. 2, 2022, 21 pgs.

(56) References Cited

OTHER PUBLICATIONS

Waltermire, Jamie; Final Office Action for U.S. Appl. No. 15/482,200, filed Apr. 7, 2017, mailed Jan. 2, 2019, 23 pgs.
Waltermire, Jamie; Non-Final Office Action for U.S. Appl. No. 15/482,200, filed Apr. 7, 2017, mailed Jun. 11, 2018, 36 pgs.
Waltermire, Jamie; Notice of Allowance for U.S. Appl. No. 15/482,200, filed Apr. 7, 2017, mailed May 14, 2019, 25 pgs.
Waltermire, Jamie; Applicant-Initiated Interview Summary for U.S. Appl. No. 16/530,045, filed Aug. 2, 2019, mailed Jun. 15, 2020, 3 pgs.
Waltermire, Jamie; Certificate of Correction for U.S. Appl. No. 16/530,045, filed Aug. 2, 2019, mailed Mar. 28, 2023, 1 pg.
Waltermire, Jamie; Final Office Action for U.S. Appl. No. 16/530,045, filed Aug. 2, 2019, mailed Nov. 24, 2020, 40 pgs.
Waltermire, Jamie; Final Office Action for U.S. Appl. No. 16/530,045, filed Aug. 2, 2019, mailed Jun. 9, 2022, 20 pgs.
Waltermire, Jamie; Non-Final Office Action for U.S. Appl. No. 16/530,045, filed Aug. 2, 2019, mailed Dec. 20, 2019, 61 pgs.
Waltermire, Jamie; Non-Final Office Action for U.S. Appl. No. 16/530,045, filed Aug. 2, 2019, mailed Feb. 10, 2022, 82 pgs.
Waltermire, Jamie; Non-Final Office Action for U.S. Appl. No. 16/530,045, filed Aug. 2, 2019, mailed May 27, 2020, 38 pgs.
Waltermire, Jamie; Notice of Allowance for U.S. Appl. No. 16/530,045, filed Aug. 2, 2019, mailed Oct. 5, 2022, 14 pgs.
Waltermire, Jamie; Non-Final Office Action for U.S. Appl. No. 16/164,933, filed Oct. 19, 2018, mailed Nov. 18, 2020, 104 pgs.
Waltermire, Jamie; Notice of Allowance for U.S. Appl. No. 16/164,933, filed Oct. 19, 2018, mailed May 14, 2021, 24 pgs.
Waltermire, Jamie; Notice of Allowance for U.S. Appl. No. 16/164,933, filed Oct. 19, 2018, mailed Aug. 9, 2021, 10 pgs.
Waltermire, Jamie; Corrected Notice of Allowance for U.S. Appl. No. 15/590,345, filed May 9, 2017, mailed Feb. 18, 2020, 9 pgs.
Waltermire, Jamie; Final Office Action for U.S. Appl. No. 15/590,345, filed May 9, 2017, mailed Mar. 19, 2019, 42 pgs.
Waltermire, Jamie; Non-Final Office Action for U.S. Appl. No. 15/590,345, filed May 9, 2017, mailed Aug. 24, 2018, 41 pgs.
Waltermire, Jamie; Notice of Allowance for U.S. Appl. No. 15/590,345, filed May 9, 2017, mailed Oct. 1, 2019, 28 pgs.
Waltermire, Jamie; Supplemental Notice of Allowance for U.S. Appl. No. 15/590,345, filed May 9, 2017, mailed Jan. 9, 2020, 8 pgs.
Waltermire, Jamie; Supplemental Notice of Allowance for U.S. Appl. No. 15/590,345, filed May 9, 2017, mailed Dec. 3, 2019, 14 pgs.
Waltermire, Jamie; Non-Final Office Action for U.S. Appl. No. 16/721,995, filed Dec. 20, 2019, mailed Dec. 27, 2021, 133 pgs.
Waltermire, Jamie; Non-Final Office Action for U.S. Appl. No. 16/721,995, filed Dec. 20, 2019, mailed Jul. 5, 2022, 28 pgs.
Waltermire, Jamie; Notice of Allowance for U.S. Appl. No. 16/721,995, filed Dec. 20, 2019, mailed Dec. 5, 2022, 22 pgs.
Waltermire, Jamie; Requirement for Restriction/Election for U.S. Appl. No. 16/721,995, filed Dec. 20, 2019, mailed Aug. 13, 2021, 6 pgs.
Waltermire, Jamie; Applicant-Initiated Interview Summary for U.S. Appl. No. 15/590,349, filed May 9, 2017, mailed Dec. 3, 2019, 3 pgs.
Waltermire, Jamie; Certificate of Correction for U.S. Appl. No. 15/590,349, filed May 9, 2017, mailed Jun. 1, 2021, 1 pg.
Waltermire, Jamie; Corrected Notice of Allowance for U.S. Appl. No. 15/590,349, filed May 9, 2017, mailed Nov. 2, 2020, 9 pgs.
Waltermire, Jamie; Corrected Notice of Allowance for U.S. Appl. No. 15/590,349, filed May 9, 2017, mailed Dec. 22, 2020, 9 pgs.
Waltermire, Jamie; Corrected Notice of Allowance for U.S. Appl. No. 15/590,349, filed May 9, 2017, mailed Feb. 5, 2021, 9 pgs.
Waltermire, Jamie; Final Office Action for U.S. Appl. No. 15/590,349, filed May 9, 2017, mailed Jan. 6, 2020, 26 pgs.
Waltermire, Jamie; Final Office Action for U.S. Appl. No. 15/590,349, filed May 9, 2017, mailed May 9, 2019, 31 pgs.
Waltermire, Jamie; Non-Final Office Action for U.S. Appl. No. 15/590,349, filed May 9, 2017, mailed Nov. 5, 2018, 41 pgs.
Waltermire, Jamie; Non-Final Office Action for U.S. Appl. No. 15/590,349, filed May 9, 2017, mailed Jun. 12, 2020, 30 pgs.
Waltermire, Jamie; Non-Final Office Action for U.S. Appl. No. 15/590,349, filed May 9, 2017, mailed Sep. 5, 2019, 25 pgs.
Waltermire, Jamie; Notice of Allowance for U.S. Appl. No. 15/590,349, filed May 9, 2017, mailed Oct. 20, 2020, 20 pgs.
Waltermire, Jamie; Requirement for Restriction/Election for U.S. Appl. No. 15/590,349, filed May 9, 2017, mailed Aug. 30, 2018, 10 pgs.
Waltermire, Jamie; Certificate of Correction for U.S. Appl. No. 16/293,716, filed Mar. 6, 2019, mailed Aug. 30, 2022, 1 pg.
Collison, Alan B.; Office Action for Chinese patent application No. 2021107289972, filed Nov. 7, 2017, mailed May 7, 2022, 20 pgs.
Any Custom Box. Perforated Dispenser Boxes. Publication date unavailable. Visited May 2, 2022. https://anycustombox.com/folding-cartons/perforated-dispenser-boxes/, 9 pgs.
Massage Warehouse. Cando® Low Powder 100 Yard Perforated Dispenser. Publication date unavailable. Visited May 2, 2022. https://www.massagewarehouse.com/products/cando-perf-low-powder-1 DO-yd-dispenser/, 2 pgs.
Premier Storage. Oil & Fuel Absorbent Pads. Publication date unavailable. Visited May 2, 2022. https://www.premier-storage.co.uk/oil-and-fuel-absorbent-pads-bonded-and-perforated-double-weight.html, 1 pg.
Sollie, Greg; International Preliminary Report on Patentability for PCT Application No. PCT/US18/65459, filed Dec. 13, 2018, mailed Jul. 2, 2020, 11 pgs.
Sollie, Greg; International Search Report and Written Opinion for PCT Application No. PCT/US18/65459, filed Dec. 13, 2018, mailed May 1, 2019, 15 pgs.
Sollie, Greg; International Preliminary Report on Patentability for PCT Application No. PCT/US18/65461, filed Dec. 13, 2018, mailed Jul. 2, 2020, 12 pgs.
Sollie, Greg; International Search Report and Written Opinion for PCT Application No. PCT/US18/65461, filed Dec. 13, 2018, mailed Mar. 21, 2019, 13 pgs.
MP Global Products, LLC; First Examination Report for Australian patent application No. 2017359035, filed Nov. 7, 2017, mailed Nov. 27, 2020, 3 pgs.
MP Global Products, LLC; Office Action for Canadian patent application No. 3,043,192, filed Nov. 7, 2017, mailed Oct. 25, 2021, 11 pgs.
MP Global Products, LLC; Office Action for Canadian patent application No. 3,043,192, filed Nov. 7, 2017, mailed Nov. 8, 2022, 3 pgs.
MP Global Products, LLC; Office Action for Canadian patent application No. 3,043,192, filed Nov. 7, 2017, mailed Jan. 8, 2022, 9 pgs.
MP Global Products LLC: European Office Action for application No. 17868605.1, mailed Dec. 3, 2020, 4 pgs.
MP Global Products LLC: European Office Action for application No. 17868605.1, mailed Apr. 13, 2021, 3 pgs.
MP Global Products LLC: European Office Action Response for application No. 17868605.1, filed Jan. 19, 2021, 15 pgs.
MP Global Products LLC: European Search Report Response for serial No. 17868605.1, filed Oct. 2, 2020, 15 pgs.
Collison, Alan B.; Examination Report for Australian patent application No. 2021204424, filed Nov. 7, 2017, mailed Dec. 6, 2022, 2 pgs.
Collison, Alan B.; Examination Report for Australian patent application No. 2021204424, filed Nov. 7, 2017, mailed Aug. 25, 2022, 8 pgs.
Collison, Alan B.; Office Action for Chinese patent application No. 2021107289972, filed Nov. 7, 2017, mailed Apr. 15, 2023, 7 pgs.
Collison, Alan. B.; Extended European Search Report for application No. 21160713.0, filed Nov. 7, 2017, mailed May 10, 2021, 7 pgs.
MP Global Products, LLC; Extended European Search Report for application No. 22152100.8, mailed Jun. 2, 2022, 7 pgs.
Collison, Alan B.; Extended European Search Report for application No. 22173063.3, filed Nov. 7, 2017, mailed Sep. 9, 2022, 7 pgs.

(56) References Cited

OTHER PUBLICATIONS

MP Global Products, L.L.C; Examination Report for Australian patent application No. 2021245201, filed Nov. 7, 2017, mailed Feb. 21, 2023, 3 pgs.
Sollie, Greg; International Preliminary Report on Patentability for PCT/US18/65463, filed Dec. 13, 2018, mailed Dec. 3, 2020, 9 pgs.
Sollie, Greg; International Search Report and Written Opinion for PCT/US18/65463, filed Dec. 13, 2018, mailed Mar. 25, 2019, 11 pgs.
Sollie, Greg; International Preliminary Report on Patentability for PCT Application No. PCT/US20/24820, filed Mar. 26, 2020, mailed Nov. 11, 2021, 13 pgs.
Sollie, Greg; International Search Report and Written Opinion for PCT Application No. PCT/US20/24820, filed Mar. 26, 2020, mailed Jul. 2, 2020, 14 pgs.
Sollie, Greg; International Preliminary Report on Patentability for PCT Application No. PCT/US19/60486, filed Nov. 18, 2019, mailed May 27, 2021, 9 pgs.
Sollie, Greg; International Search Report and Written Opinion for PCT Application No. PCT/US19/60486, filed Nov. 18, 2019, mailed Jan. 13, 2020, 10 pgs.
Sollie, Greg; International Preliminary Report on Patentability for PCT Application No. PCT/US19/59764, filed Nov. 5, 2019, mailed May 27, 2021, 9 pgs.
Sollie, Greg; International Search Report and Written Opinion for PCT Application No. PCT/US19/59764, filed Nov. 5, 2019, mailed Jul. 1, 2020, 13 pgs.
Sollie, Greg; Invitation to Pay Additional Fees for PCT/US19/59764, filed Nov. 5, 2019, mailed Jan. 2, 2020, 2 pgs.
Amazon. ECOOPTS Cling Wrap Plastic Food Wrap with Slide Cutter. First available Dec. 21, 2020. Visited Sep. 2, 2022. https://www.amazon.com/ECOOPTS-Cling-Plastic-Cutter-121 N %C3% 971 000FT/dp/B08R3L7K4W/ (Year: 2020).
Sollie, Greg; Notice of Allowance for Design U.S. Appl. No. 29/745,881, filed Aug. 10, 2020, mailed May 9, 2022, 139 pgs.
Sollie, Greg; Notice of Allowance for Design U.S. Appl. No. 29/745,881, filed Aug. 10, 2020, mailed Sep. 13, 2022, 12 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials- Fiber-Based Materials", Sustainable Packaging Solution, 2009.
Images of Novolex bag, including an outer paper bag, a corrugated cardboard insert, and an inner foil-covered bubble-wrap bag, publicly available prior to May 9, 2017, 7 pgs.
MP Global Products, LLC; International Search Report and Written Opinion of the International Searching Authority for PCT/US2017/060403, filed Nov. 7, 2017, mailed Feb. 19, 2018, 15 pgs.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Periwrap; Article entitled: "Insulated Solutions", located at <https://www.peri-wrap.com/insulation/>, accessed on Dec. 3, 2018, 9 pgs.
Salazar Packaging; Article entitle: "Custom Packaging and Design", located at <https://salazarpackaging.com/custom-packaging-and-design/>, accessed on Sep. 28, 2017, 2 pgs.
Singh, et al; Article entitled: "Performance Comparison of Thermal Insulated Packaging Boxes, Bags and Refrigerants for Single-parcel Shipments", published Mar. 13, 2007, 19 pgs.
Tera-Pak; Article entitled: "Insulated Shipping Containers", located at <http://www.tera-pak.com/>, accessed on Mar. 20, 2017, 3 pgs.
UN Packaging; Article entitled: "CooLiner® Insulated Shipping Bags", available at <http://www.chem-tran.com/ packaging/supplies/cooliner-insulated-shipping-bags.php>, accessed on Aug. 30, 2017, 2 pgs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Sollie, Greg; Final Office Action for U.S. Appl. No. 16/951,465, filed Nov. 18, 2020, mailed Aug. 18, 2022, 20 pgs.
Sollie, Greg; Non-Final Office Action for U.S. Appl. No. 17/493,449, filed Oct. 4, 2021, mailed Jul. 14, 2022, 110 pgs.
Benezet, et al.; Article entitled: "Mechanical and physical properties of expanded starch, reinforced by natural fibres", Industrial Corps and Products 37 (2012) 435-440, available online Oct. 4, 2011, 6 pgs.
Collison, Alan B.; Office Action for Mexico patent application No. MX/a/2019/005376, mailed Mar. 1, 2022, 5 pgs.
Collison, Alan B.; Non-Final Office Action for U.S. Appl. No. 18/234,425, filed Aug. 16, 2023, mailed Apr. 11, 2024, 143 pgs.
Waltermire, Jamie; Certificate of Correction for U.S. Appl. No. 15/482, 186, filed Apr. 7, 2017, mailed Apr. 23, 2024, 1 pg.
Waltermire, Jamie; Non-Final Office Action for U.S. Appl. No. 17/891,565, filed Aug. 19, 2022, mailed Mar. 29, 2024, 24 pgs.
Waltermire, Jamie; Notice of Allowance for U.S. Appl. No. 18/146,232, filed Dec. 23, 2022, mailed Mar. 25, 2024, 149 pgs.
Waltermire, Jamie; Non-Final Office Action for U.S. Appl. No. 17/127,060, filed Dec. 18, 2020, mailed Mar. 13, 2024, 18 pgs.
Waltermire, Jamie; Notice of Allowance for U.S. Appl. No. 17/497,054, filed Oct. 8, 2021, mailed Mar. 6, 2024, 11 pgs.
Waltermire, Jamie; Certificate of Correction for U.S. Appl. No. 17/497,057, filed Oct. 8, 2021, mailed Apr. 23, 2024, 1 pg.
Solli, Greg; Non-Final Office Action for U.S. Appl. No. 17/536,878, filed Nov. 29, 2011, mailed Mar. 21, 2024, 25 pgs.
Sollie, Greg; Non-Final Office Action for U.S. Appl. No. 17/901,558, filed Sep. 1, 2022, mailed Mar. 11, 2024, 30 pgs.
Sollie, Greg; Certificate of Correction for U.S. Appl. No. 18/095,310, filed Jan. 10, 2023, mailed Apr. 16, 2024, 1 pg.
Sollie, Greg; Notice of Allowance for U.S. Appl. No. 18/208,709, filed Jun. 12, 2023, mailed Apr. 9, 2024, 9 pgs.
Anagnostopoulos, John; Non-Final Office Action U.S. Appl. No. 17/666,206, filed Feb. 7, 2022, mailed Mar. 19, 2024, 20 pgs.
https://www.cnckitchen.com/blog/whats-stronger-3d-prints-or-wood (Year: 2022), 2 pgs.
https://www.paperonweb.com/A 1030.htm#:-:text= Manila %20is %20considered %2othe%20longest, 3600mm)%20in%2othe%20natural%20state. (Year: 2006), 1 pg.
Waltermire, Jamie; Examination Report for Australian patent application No. 2018260901, filed Nov. 8, 2018, mailed Apr. 30, 2024, 4 pgs.
Waltermire, Jamie; Examination Report for Australian patent application No. 2018260911, filed Nov. 8, 2018, mailed Apr. 30, 2024, 4 pgs.
Waltermire, Jamie; Examination Report for Australian patent application No. 2018260914, filed Nov. 8, 2018, mailed Apr. 30, 2024, 4 pgs.
MP Global Products, LLC; Office Action for European patent application No. 22152100.8, mailed Mar. 19, 2024, 4 pgs.
Collison, Alan B.; Office Action for Canadian patent application No. 3,176,052, filed Nov. 7, 2027, mailed Feb. 27, 2024, 10 pgs.
Collison, Alan B.; Extended European Search Report for application No. 23211653.3, filed Nov. 7, 2017, mailed Mar. 14, 2024, 7 pgs.
Sollie, Greg; Examination Report for Australian Patent Application No. 2018264050, filed Nov. 14, 2018, mailed Mar. 7, 2024, 5 pgs.
Waltermire, Jamie; Final Office Action for U.S. Appl. No. 17/891,565, filed Aug. 19, 2022, mailed Jan. 17, 2024, 77 pgs.
Waltermire, Jamie; Non-Final Office Action for U.S. Appl. No. 17/173,293, filed Feb. 11, 2021, mailed Dec. 22, 2023, 168 pgs.
Waltermire, Jamie; Certificate of Correction for U.S. Appl. No. 17/127,050, filed Dec. 18, 2020, mailed Feb. 13, 2024, 1 pg.

(56) References Cited

OTHER PUBLICATIONS

Waltermire, Jamie; Advisory Action for U.S. Appl. No. 17/127,060, filed Dec. 18, 2020, mailed Dec. 21, 2023, 8 pgs.
Waltermire, Jamie; Advisory Action for U.S. Appl. No. 17/497,054, filed Oct. 8, 2021, mailed Jan. 30, 2024, 11 pgs.
Sollie, Greg; Non-Final Office Action for U.S. Appl. No. 18/106,169, filed Feb. 6, 2023, mailed Feb. 12, 2024, 148 pgs.
Sollie, Greg; Advisory Action for U.S. Appl. No. 17/536,878, filed Nov. 29, 2021, mailed Jan. 12, 2024, 8 pgs.
Sollie, Greg; Advisory Action for U.S. Appl. No. 17/901,558, filed Sep. 1, 2022, mailed Dec. 12, 2023, 3 pgs.
Sollie, Greg; Non-Final Office Action for U.S. Appl. No. 18/208,704, filed Jun. 12, 2023, mailed Feb. 13, 2024, 148 pgs.
Sollie, Greg; Requirement for Restriction/Election for U.S. Appl. No. 18/208,704, filed Jun. 12, 2023, mailed Jan. 9, 2024, 6 pgs.
Sollie, Greg; Notice of Allowance for U.S. Appl. No. 18/208,708, filed Jun. 12, 2023, mailed Jan. 17, 2024, 142 pgs.
Sollie, Greg; Notice of Allowance for U.S. Appl. No. 18/208,709, filed Jun. 12, 2023, mailed Jan. 17, 2024, 76 pgs.
Anagnostopoulos, John; Advisory Action for U.S. Appl. No. 17/666,206, filed Feb. 7, 2022, mailed Dec. 22, 2023, 4 pgs.
Collison, Alan B.; Final Office Action for U.S. Appl. No. 18/234,425, filed Aug. 16, 2023, mailed Jul. 23, 2024, 12 pgs.
Waltermire, Jamie; Final Office Action for U.S. Appl. No. 17/173,293, filed Feb. 11, 2021, mailed Jun. 6, 2024, 27 pgs.
Waltermire, Jamie; Final Office Action for U.S. Appl. No. 17/127,060, filed Dec. 18, 2020, mailed Jun. 24, 2024, 25 pgs.
Waltermire, Jamie; Non-Final Office Action for U.S. Appl. No. 18/385,726, filed Oct. 31, 2023, mailed Jul. 9, 2024, 148 pgs.
Waltermire, Jamie; Requirement for Restriction/Election for U.S. Appl. No. 18/385,726, filed Oct. 31, 2023, mailed May 10, 2024, 5 pgs.
Waltermire, Jamie; Non-Final Office Action for U.S. Appl. No. 17/538,795, filed Nov. 30, 2021, mailed May 13, 2024, 157 pgs.
Sollie, Greg; Notice of Allowance for U.S. Appl. No. 18/106,169, filed Feb. 6, 2023, mailed Jun. 7, 2024, 11 pgs.
Sollie, Greg; Certificate of Correction for U.S. Appl. No. 17/679,772, filed Feb. 24, 2022, mailed Jun. 4, 2024, 2 pgs.
Sollie, Greg; Requirement for Restriction/Election for U.S. Appl. No. 18/517,626, filed Nov. 22, 2023, mailed Jun. 13, 2024, 6 pgs.
Sollie, Greg; Non-Final Office Action for U.S. Appl. No. 18/208,704, filed Jun. 12, 2023, mailed May 22, 2024, 18 pgs.
Anagnostopoulos, John; Final Office Action for U.S. Appl. No. 17/666,206, filed Feb. 7, 2022, mailed Jul. 10, 2024, 30 pgs.
Waltermire, Jamie; Examination Report for Australian patent application No. 2018260915, filed Nov. 8, 2018, mailed May 30, 2024, 4 pgs.
Waltermire, Jamie; Examination Report for Australian patent application No. 2018260920, filed Nov. 8, 2018, mailed May 18, 2024, 4 pgs.
Collison, Alan B.; Office Action for European patent application No. 23211653.3, filed Nov. 7, 2017, mailed Jul. 12, 2024, 3 pgs.
Waltermire, Jamie; Requirement for Restriction/Election for U.S. Appl. No. 18/416,948, filed Jan. 19, 2024, mailed Aug. 5, 2024, 6 pgs.
Collison, Alan B.; Restriction Requirement for U.S. Appl. No. 18/612,835, filed Mar. 21, 2024, mailed May 22, 2024, 12 pgs.
MP Global Products LLC; Notice of Decision to Grant for European Patent Application No. 17868605.1, mailed Dec. 23, 2021, 2 pgs.
MP Global Products, L.L.C .; Notice of Acceptance of Patent Application for Australian Patent Application No. 2017359035, mailed Jun. 25, 2021, 3 pgs.
Waltermire, Jamie; Final Office Action for U.S. Appl. No. 17/891,565, filed Aug. 19, 2022, mailed Aug. 21, 2024, 33 pgs.
Fibre Box Association (FBA); "Voluntary Standard for Repulping and Recycling Corrugated Fiberboard Treated to Improve Its Performance in the Presence of Water and Water Vapor", 2013, 23 pgs.
NC State University Bio Resources; "Repulping High Wet-Strength Waste Banknote Paper by a Dual-pH Pretreatment Process", 2012, 7 pgs.
Waltermire, Jamie; Non-Final Office Action for U.S. Appl. No. 18/115,791, filed Mar. 1, 2023, mailed Aug. 28, 2024, 167 pgs.
Waltermire, Jamie; Non-Final Office Action for U.S. Appl. No. 17/173,293, filed Feb. 11, 2021, mailed Sep. 10, 2024, 32 pgs.
Waltermire, Jamie; Advisory Action for U.S. Appl. No. 17/127,060, filed Dec. 18, 2020, mailed Aug. 30, 2024, 8 pgs.
Waltermire, Jamie; Final Office Action for U.S. Appl. No. 17/538,795, filed Nov. 30, 2021, mailed Aug. 27, 2024, 51 pgs.
Waltermire, Jamie; Certificate of Correction for U.S. Appl. No. 17/497,054, filed Oct. 8, 2021, mailed Sep. 10, 2024, 1 pg.
Waltermire, Jamie; Non-Final Office Action for U.S. Appl. No. 18/197,300, filed May 15, 2023, mailed Aug. 28, 2024, 162 pgs.
Waltermire, Jamie; Requirement for Restriction/Election for U.S. Appl. No. 18/416,949, filed Jan. 19, 2024, mailed Aug. 5, 2024, 8 pgs.
Sollie, Greg; Non-Final Office Action for U.S. Appl. No. 18/517,626, filed Nov. 22, 2023, mailed Aug. 30, 2024, 159 pgs.
Sollie, Greg; Final Office Action for U.S. Appl. No. 17/536,878, filed Nov. 29, 2021, mailed Sep. 6, 2024, 38 pgs.
Sollie, Greg; Notice of Allowance for U.S. Appl. No. 17/901,558, filed Sep. 1, 2022, mailed Sep. 16, 2024, 28 pgs.
Sollie, Greg; Non-Final Office Action for U.S. Appl. No. 18/208,704, filed Jun. 12, 2023, mailed Sep. 13, 2024, 13 pgs.
Waltermire, Jamie; Examination Report for Australian Patent Application No. 2018260901, filed Nov. 8, 2018, mailed Jul. 18, 2024, 5 pgs.
Waltermire, Jamie; Notice of Acceptance of Patent Application for Australian Patent Application No. 2018260920, filed Nov. 8, 2018, mailed Aug. 16, 2024, 4 pgs.
Waltermire, Jamie; Non-Final Office Action for U.S. Appl. No. 18/416,948, filed Jan. 19, 2024, mailed Sep. 23, 2024, 155 pgs.
Waltermire, Jamie; Requirement for Restriction/Election for U.S. Appl. No. 18/734,865, filed Jun. 5, 2024, mailed Sep. 28, 2024, 6 pgs.
Collison, Alan B.; Non-Final Office Action for U.S. Appl. No. 18/612,835, filed Mar. 21, 2024, mailed Sep. 11, 2024, 65 pgs.
Waltermire, Jamie; Non-Final Office Action for U.S. Appl. No. 17/127,060, filed Dec. 18, 2020, mailed Oct. 9, 2024, 24 pgs.
Waltermire, Jamie; Final Office Action for U.S. Appl. No. 18/385,726, filed Oct. 31, 2023, mailed Oct. 22, 2024, 31 pgs.
Waltermire, Jamie; Non-final Office Action for U.S. Appl. No. 18/416,949, filed Jan. 19, 2024, mailed Sep. 26, 2024, 157 pgs.
Waltermire, Jamie; Examination Report for Australian Patent Application No. 2018260915, filed Nov. 8, 2018, mailed Oct. 2, 2024, 4 pgs.
Waltermire, Jamie; Examination Report for Australian Patent Application No. 2024216411, filed Nov. 8, 2018, mailed Oct. 8, 2024, 5 pgs.
Collison, Alan B.; Advisory Action for U.S. Appl. No. 18/234,425, filed Aug. 16, 2023, mailed Nov. 15, 2024, 3 pgs.
Collison, Alan B.; Advisory Action for U.S. Appl. No. 18/234,425, filed Aug. 16, 2023, mailed Nov. 25, 2024, 2 pgs.
Collison, Alan B.; Applicant-Initiated Interview Summary for U.S. Appl. No. 18/612,835, filed Mar. 21, 2024, mailed Oct. 29, 2024, 2 pgs.
Waltermire, Jamie; Advisory Action for U.S. Appl. No. 17/891,565, filed Aug. 19, 2022, mailed Oct. 31, 2024, 14 pgs.
Waltermire, Jamie; Final Office Action for U.S. Appl. No. 18/115,791, filed Mar. 1, 2023, mailed Dec. 20, 2024, 28 pgs.
Waltermire, Jamie; Final Office Action for U.S. Appl. No. 17/173,293, filed Feb. 11, 2021, mailed Dec. 23, 2024, 22 pgs.
Waltermire, Jamie; Advisory Action for U.S. Appl. No. 17/538,795, filed Nov. 30, 2021, mailed Dec. 5, 2024, 3 pgs.
Sollie, Greg; Final Office Action for U.S. Appl. No. 18/517,626, filed Nov. 22, 2023, mailed Dec. 12, 2024, 16 pgs.
Sollie, Greg; Advisory Action for U.S. Appl. No. 17/536,878, filed Nov. 29, 2021, mailed Nov. 27, 2024, 14 pgs.
Anagnostopoulos, John; Notice of Allowance for U.S. Appl. No. 17/666,206, filed Feb. 7, 2022, mailed Dec. 9, 2024, 31 pgs.
Waltermire, Jamie; Examination Report for Australian Patent Application No. 2018260901, filed Nov. 8, 2018, mailed Oct. 24, 2024, 4 pgs.

(56) References Cited

OTHER PUBLICATIONS

Waltermire, Jamie; Examination Report for Australian Patent Application No. 2024216411, filed Nov. 8, 2018, mailed Dec. 19, 2024, 4 pgs.
Sollie, Greg; Examination Report for Australian Patent Application No. 2023266362, filed Nov. 8, 2018, mailed Oct. 30, 2024, 4 pgs.
Collison, Alan B.; Examination Report for Australian Patent Application No. 2023203006, filed Nov. 7, 2017, mailed Nov. 27, 2024, 7 pgs.
Collison, Alan B.; Communication pursuant to Article 94(3) EPC for Application No. 23211653.3, filed Nov. 7, 2017, mailed Oct. 4, 2024, 3 pgs.
Waltermire, Jamie; Notice of Allowance for U.S. Appl. No. 17/891,565, filed Aug. 19, 2022, mailed Jan. 2, 2025, 18 pgs.
Waltermire, Jamie; Final Office Action for U.S. Appl. No. 18/197,300, filed May 15, 2023, mailed Jan. 13, 2025, 22 pgs.
Sollie, Greg; Non-Final Office Action for U.S. Appl. No. 17/536,878, filed Nov. 29, 2021, mailed Dec. 30, 2024, 25 pgs.
Sollie, Greg; Certificate of Correction for U.S. Appl. No. 18/094,806, filed Jan. 9, 2023, mailed Dec. 31, 2024, 4 pgs.
Sollie, Greg; Notice of Allowance for U.S. Appl. No. 18/208,704, filed Jun. 12, 2023, mailed Jan. 2, 2025, 26 pgs.
Waltermire, Jamie; Non-Final Office Action for U.S. Appl. No. 18/734,865, filed Jun. 5, 2024, mailed Jan. 24, 2025, 131 pgs.
Waltermire, Jamie; Final Office Action for U.S. Appl. No. 17/127,060, filed Dec. 18, 2020, mailed Jan. 24, 2025, 24 pgs.
Waltermire, Jamie; Notice of Allowance for U.S. Appl. No. 18/416,949, filed Jan. 19, 2024, mailed Jan. 27, 2025, 25 pgs.
Sollie, Greg; Certificate of Correction for U.S. Appl. No. 18/208,708, filed Jun. 12, 2023, mailed Jan. 21, 2025, 1 pg.
Sollie, Greg; Certificate of Correction for U.S. Appl. No. 18/208,709, filed Jun. 12, 2023, mailed Jan. 21, 2025, 1 pg.
Sollie, Greg; Examination Report for Australian Application No. 2023285920, filed Nov. 8, 2018, mailed Jan. 16, 2025, 4 pgs.
Sollie, Greg; Examination Report for Australian Patent Application No. 2023285879, filed Nov. 8, 2018, mailed Jan. 14, 2025, 3 pgs.
Waltermire, Jamie; Notice of Allowance for U.S. Appl. No. 18/416,948, filed Jan. 19, 2024, mailed Jan. 29, 2025, 23 pgs.
MP Global Products LLC; Examination Report for Canada Patent Application No. 3,218,319, filed mailed Dec. 23, 2024, 5 pgs.
Waltermire, Jamie; Applicant-Initiated Interview Summary for U.S. Appl. No. 18/115,791, filed Mar. 1, 2023, mailed Feb. 14, 2025, 3 pgs.
Waltermire, Jamie; Advisory Action for U.S. Appl. No. 17/173,293, filed Feb. 11, 2021, mailed Feb. 28, 2025, 3 pgs.
Waltermire, Jamie; Non-Final Office Action for U.S. Appl. No. 18/385,726, filed Oct. 31, 2023, mailed Jan. 30, 2025, 16 pgs.
Waltermire, Jamie; Non-Final Office Action for U.S. Appl. No. 17/538,795, filed Nov. 30, 2021, mailed Feb. 4, 2025, 33 pgs.
Sollie, Greg; Notice of Allowance for U.S. Appl. No. 18/517,626, filed Nov. 22, 2023, mailed Feb. 28, 2025, 10 pgs.
Collison, Alan B.; Notice of Allowance for Canadian Patent Application No. 3,176,052, filed Nov. 7, 2017, mailed Feb. 6, 2025, 1 pgs.
Waltermire, Jamie; Non-Final Office Action for U.S. Appl. No. 18/197,300, filed May 15, 2023, mailed Mar. 27, 2025, 14 pgs.
Waltermire, Jamie; Examination Report for Australian Patent Application No. 2024216412, filed Nov. 18, 2018, mailed Mar. 25, 2025, 9 pgs.
Sollie, Greg; Examination Report for Australian Application No. 2024200964, filed Nov. 8, 2018, mailed Mar. 5, 2025, 4 pgs.

* cited by examiner

INSULATED BOX ASSEMBLY WITH OVERLAPPING PANELS

CROSS-REFERENCE TO RELATED APPLICATIONS

This application is a continuation of U.S. patent application Ser. No. 17/492,285, filed Oct. 1, 2021, which issued as U.S. Pat. No. 11,724,851 on Aug. 15, 2023. which is a continuation of U.S. patent application Ser. No. 16/879,811, filed May 21, 2020, which issued as U.S. Pat. No. 11,203,458 on Dec. 21, 2021, which is a continuation of U.S. patent application Ser. No. 16/382,710, filed Apr. 12, 2019, which issued into U.S. Pat. No. 10,858,141 on Dec. 8, 2020, which claims the benefit of U.S. Provisional Application No. 62/760,672, filed on Nov. 13, 2018, which are each hereby incorporated by reference herein in their entireties.

JOINT RESEARCH AGREEMENT

The subject matter disclosed was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to foldable boxes. More specifically, this disclosure relates to insulated foldable boxes.

BACKGROUND

Home delivery of food is becoming more common as the process becomes more efficient and costs go down. Delivery boxes may alternatively need to keep the food hot or cold enough to, for example, prevent bacterial growth, prevent melting or congealing of the food, or simply maintain the edibility, texture, and flavor of the food. Another consideration for the type of box to use is its impact on the environment, as it relates to the reusability and recyclability of the boxes. Polystyrene foam boxes are prevalent in the food-delivery industry because of their low cost, but they are not commonly recycled. Thus, they take up a disproportionate volume of landfill space.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a box assembly comprising an exterior piece comprising a middle portion; a connecting segment coupled to the middle portion by a fold line; and a end segment coupled to the connecting segment by a fold line, the connecting segment positioned substantially perpendicular to the middle portion and the end segment; an interior piece positioned within the exterior piece, the interior piece comprising a side panel, a space defined between the middle portion and the side panel, the interior piece defining a cavity, the end segment extending into the cavity, the end segment coupled to the side panel; and an insulator positioned at least partially within the space.

Also disclosed is a method of assembling a box assembly comprising folding a lower portion of an exterior piece about a fold line relative to a middle portion of the exterior piece; folding a side panel of an interior piece about a fold line relative to a bottom panel of the interior piece; positioning an insulator within the exterior piece; positioning the interior piece within the exterior piece comprising positioning the bottom panel over the lower portion; and forming a space between the middle portion and the side panel, the insulator at least partially positioned within the space; folding a connecting segment of the exterior piece about a fold line relative to the middle portion to at least partially cover the space; inserting an end segment of the exterior piece into a cavity defined by the interior piece, the end segment coupled to the connecting segment by a fold line; and coupling the end segment to the side panel.

Also disclosed is a box assembly comprising an exterior piece comprising a first middle portion, a second middle portion, a third middle portion, and a fourth middle portion; the first middle portion and the third middle portion positioned perpendicular to the second middle portion and the fourth middle portion; a plurality of insulator pads comprising a first side insulator pad, a second side insulator pad, and a third side insulator pad; the first side insulator pad contacting the first middle portion; the second side insulator pad contacting the first middle portion, the second middle portion, and the third middle portion; the third side insulator pad contacting the third middle portion; and an interior piece positioned within the exterior piece, the interior piece comprising a first side panel and a second side panel; the first side insulator pad positioned between the first side panel and the first middle portion; the second side panel extending between the second side insulator pad and each of the first side insulator pad and the third side insulator pad.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
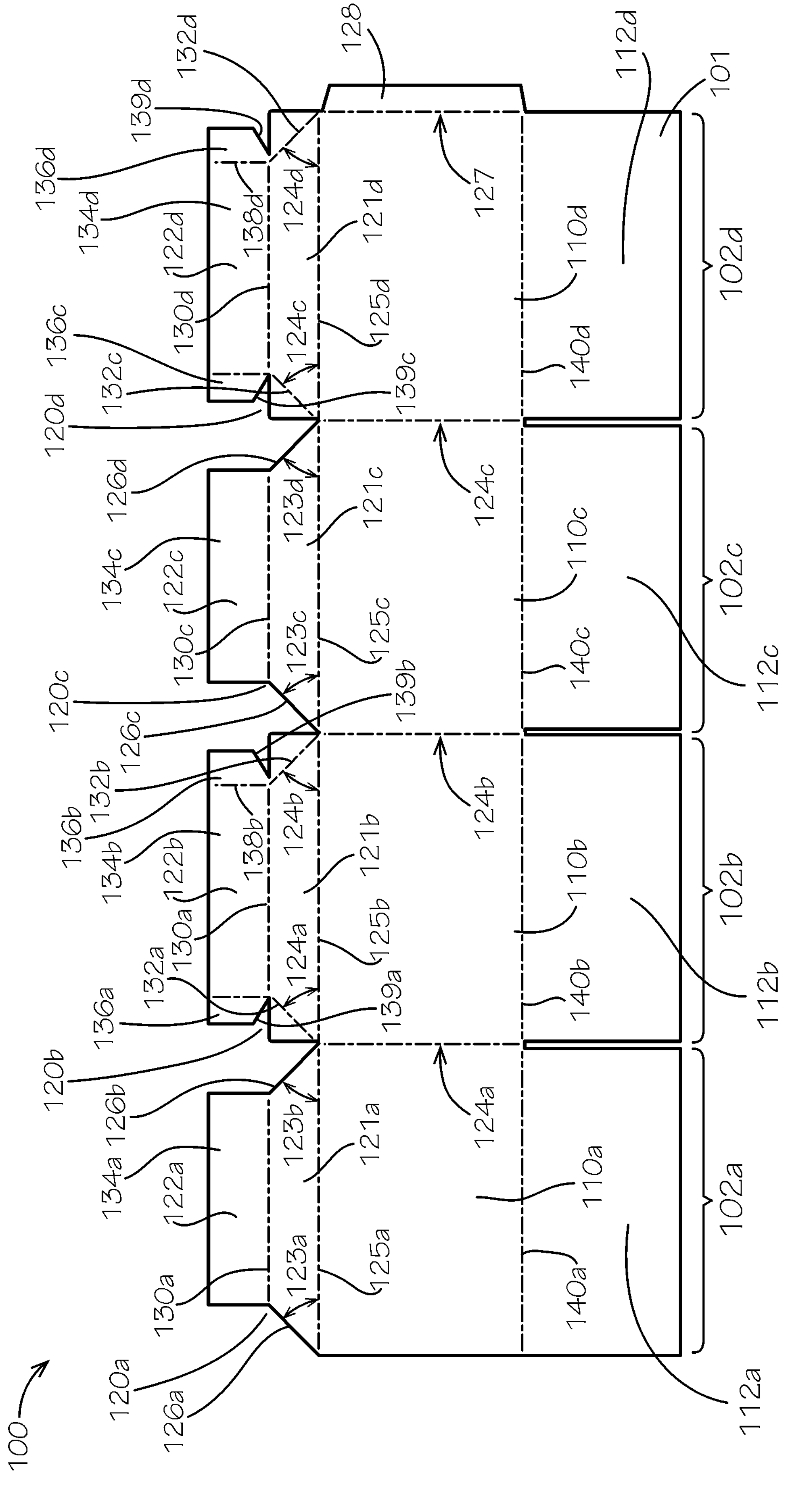
FIG. 1 shows a blank configured to be assembled into an exterior piece of an insulated box in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

FIG. 1 shows in one exemplary aspect an exterior piece 100 of an insulated box 2400 (shown in FIG. 25) in an unassembled configuration as a blank. As shown, the exterior piece 100 can comprise four subpanels 102*a,b,c,d*. Each subpanel can comprise a middle portion 110*a,b,c,d*, an upper portion 120*a,b,c,d*, and a lower portion 112*a,b,c,d*. The middle portions 110*a,b,c,d* can be joined by fold lines 124*a,b,c*. A side strip 128 can be joined to the fourth middle portion 110*d* by a fold line 127. The exterior piece 100 as a blank can define a planar first exterior surface 101, with a similar planar second exterior surface (not shown) opposite from the exterior surface 101.

Each middle portion 110*a,b,c,d* can be joined to an upper portion 120*a,b,c,d* by a fold line 125*a,b,c,d*. Each upper portion can comprise a connecting segment 121*a,b,c,d* and an end segment 122*a,b,c,d*. The end segments 122*a,b,c,d* can be joined to the connecting segments 121*a,b,c,d* by fold lines 130*a,b,c,d*.

The connecting segments 121*a,c* can be of various shapes, including rectangles, parallelograms, and trapezoids. In the current aspect, a first connecting segment 121*a* and a third connecting segment 121*c* can be trapezoidal in shape. The legs 126*a,b,c,d* of the first and third connecting segments 121*a,c* can form angles 123*a,b,c,d* with the fold lines 125*a,b,c,d*. The angles 123*a,b,c,d* can be about 45 degrees. A second and a fourth connecting segment 121*b,d* can be substantially rectangular and can comprise or define crease lines 132*a,b,c,d*.

Each end segment 122*a,b,c,d* can comprise a middle tab 134*a,b,c,d* and a side tab 136*a,b,c,d*. In the current aspect, the second and fourth end segments 122*b,d* can each comprise two side tabs 136*a,b,c,d*. The side tabs 136*a,b,c,d* can be joined to the middle tabs 134*a,b,c,d* by fold lines 138*a,b,c,d*. Each side tab can comprise a bottom edge 139*a,b,c,d*, and each bottom edge 139*a,b,c,d* can form an angle with the fold lines 138*a,b,c,d*. The lower portions 112*a,b,c,d* can be joined to the middle portions 110*a,b,c,d* by fold lines 140*a,b,c,d*.

Figure 2:
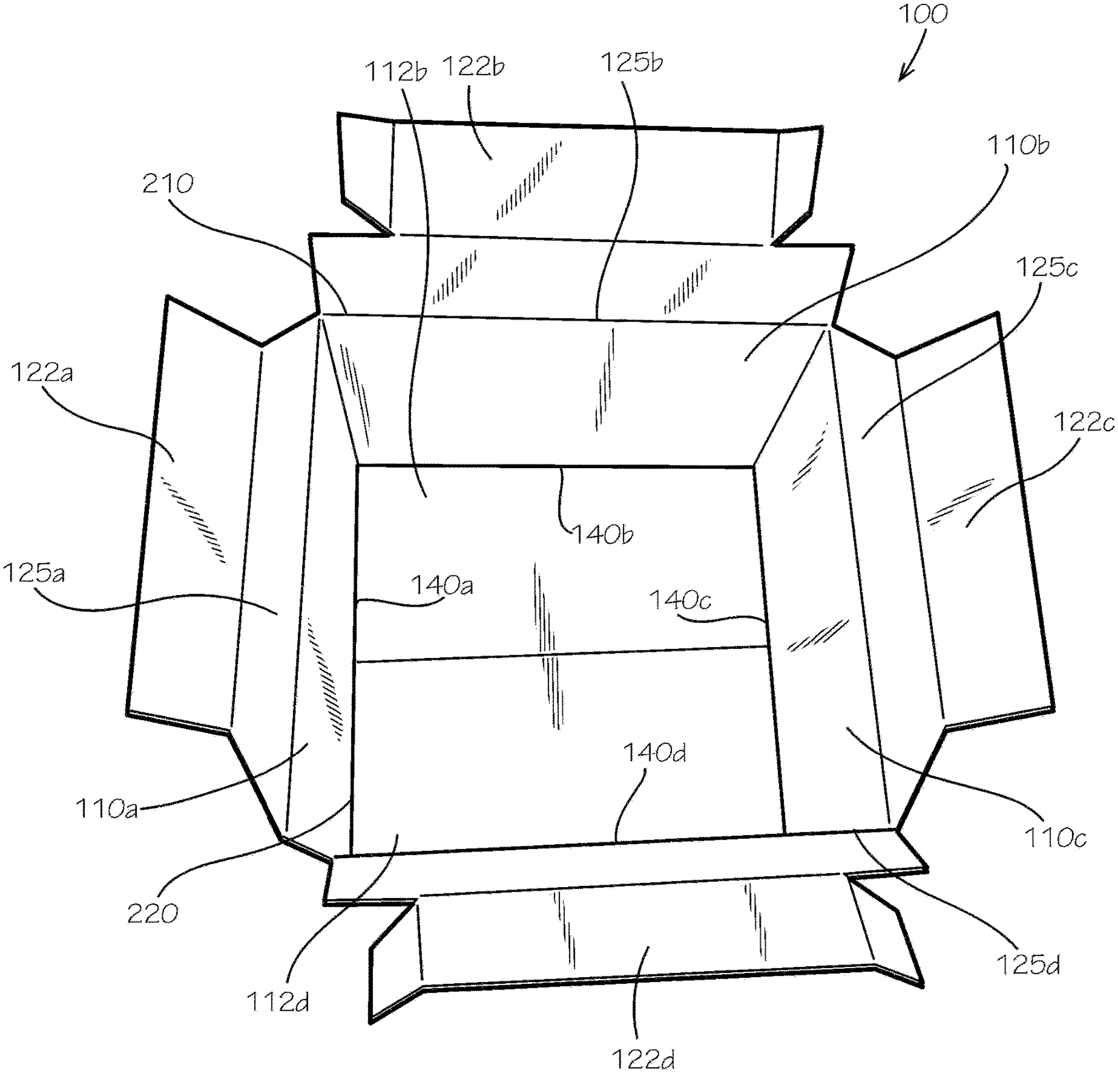
FIG. 2 is a perspective view of the exterior piece of the insulated box assembled from the blank of FIG. 1.

FIG. 2 is a perspective view of the exterior piece 100 in an assembled configuration. The fold lines 140*a,b,c,d* joining the middle portions 110*a,b,c,d* to the upper portions 120*a,b,c,d* can form a top outside edge 210. The fold lines 140*a,b,c,d* joining the middle portions 110*a,b,c,d* to the lower portions 112*a,b,c,d* can form a bottom outside edge 220. The side strip 128 can be affixed to the first subpanel 102*a* by staples, hot melt glue, or other adhesives known in the art, or with no adhesive at all.

Figure 3:
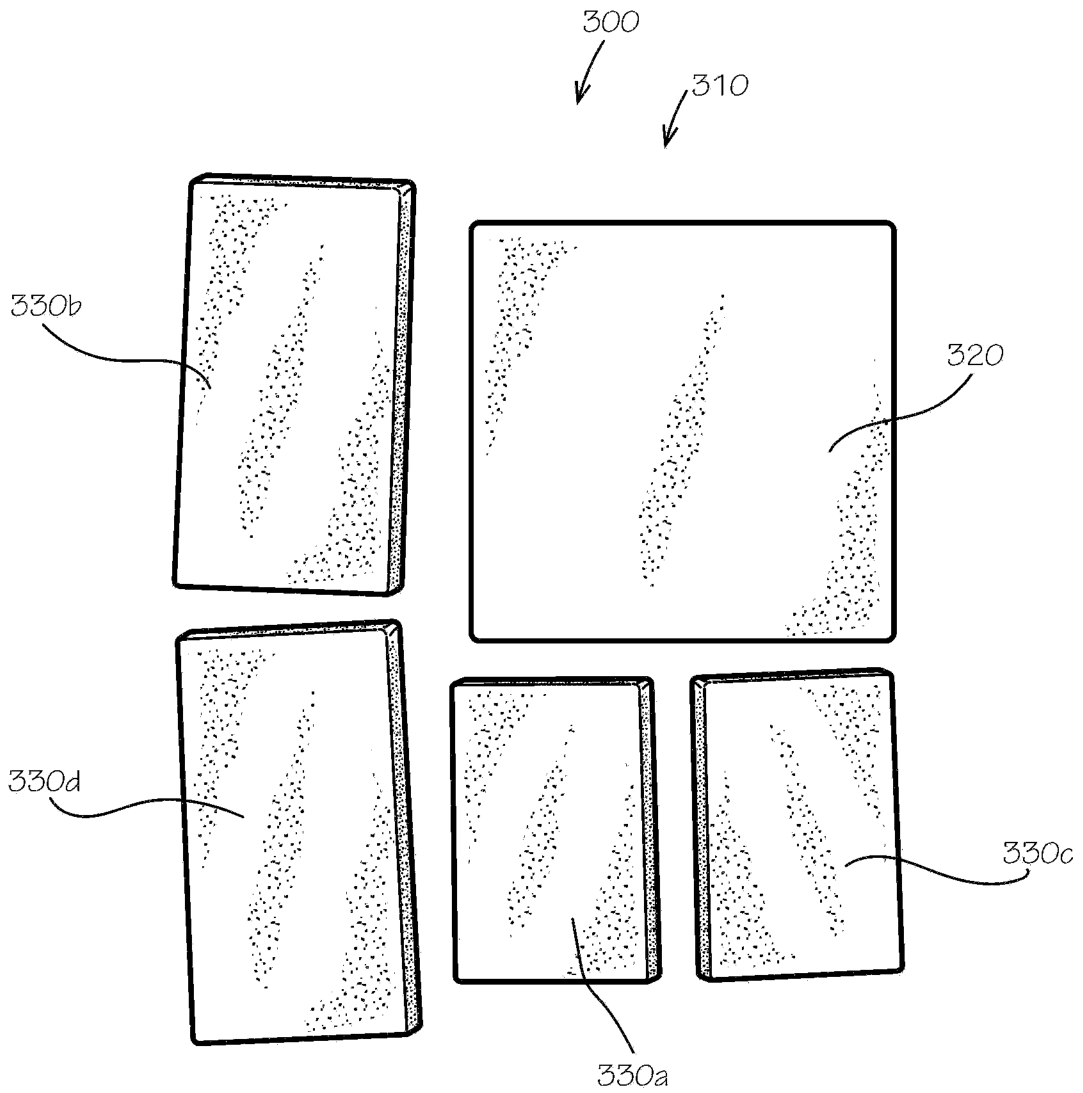
FIG. 3 shows a side view of insulator pads configured to be placed between an interior piece of the insulated box and the exterior piece, according to another aspect of the present disclosure.

FIG. 3 shows an exemplary aspect of an insulator 300 that can be used in the insulated box 2400. The insulator 300 can form a loose fill (not shown) or another configuration known in the art. In the current aspect, the insulator 300 can comprise insulator pads 310. The insulator pads 310 can comprise a variety of materials known in the art, such as polystyrene and/or cellulose. The insulator pads 310 can comprise a bottom insulator 320 and side insulators 330*a,b,c,d*. The side insulators 330*a,b,c,d* can comprise a first, second, third, and fourth side insulator 330*a,b,c,d*, respectively. The first and third side insulators 330*a,c* can be shorter than the second and fourth side insulators 330*b,d*. The side insulators can also comprise a single insulator pad (not shown) extending circumferentially around an interior piece 500.

The insulator pads 310 can comprise paper or other paper fiber materials; however, in other aspects, the insulation batts can comprise cotton, foam, rubber, plastics, fiberglass, mineral wool, or any other flexible insulation material. In the present application, the insulation batts can be repulpable. In the present aspect, the insulated box 2400 can be 100% recyclable. In the present aspect, the insulated box 2400 can be single-stream recyclable wherein all materials comprised by the insulated box 2400 can be recycled by a single processing train without requiring separation of any materials or components of the insulated box 2400. In the present aspect, the insulated box 2400 can be compostable. In the present aspect, the insulated box 2400 can be repulpable. In the present aspect, the insulated box 2400 and the insulator pads 310 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, the insulated box 2400 and the insulator pads 310 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

Recyclable and repulpable insulation materials are further described in U.S. patent application Ser. No. 15/677,738, filed Aug. 15, 2017, U.S. Provisional Patent Application No. 62/375,555, filed Aug. 16, 2016, U.S. Provisional Patent Application No. 62/419,894, filed Nov. 9, 2016, and U.S. Provisional Patent Application No. 62/437,365, filed Dec. 21, 2016, which are each incorporated by reference in their entirety herein.

Figure 4:
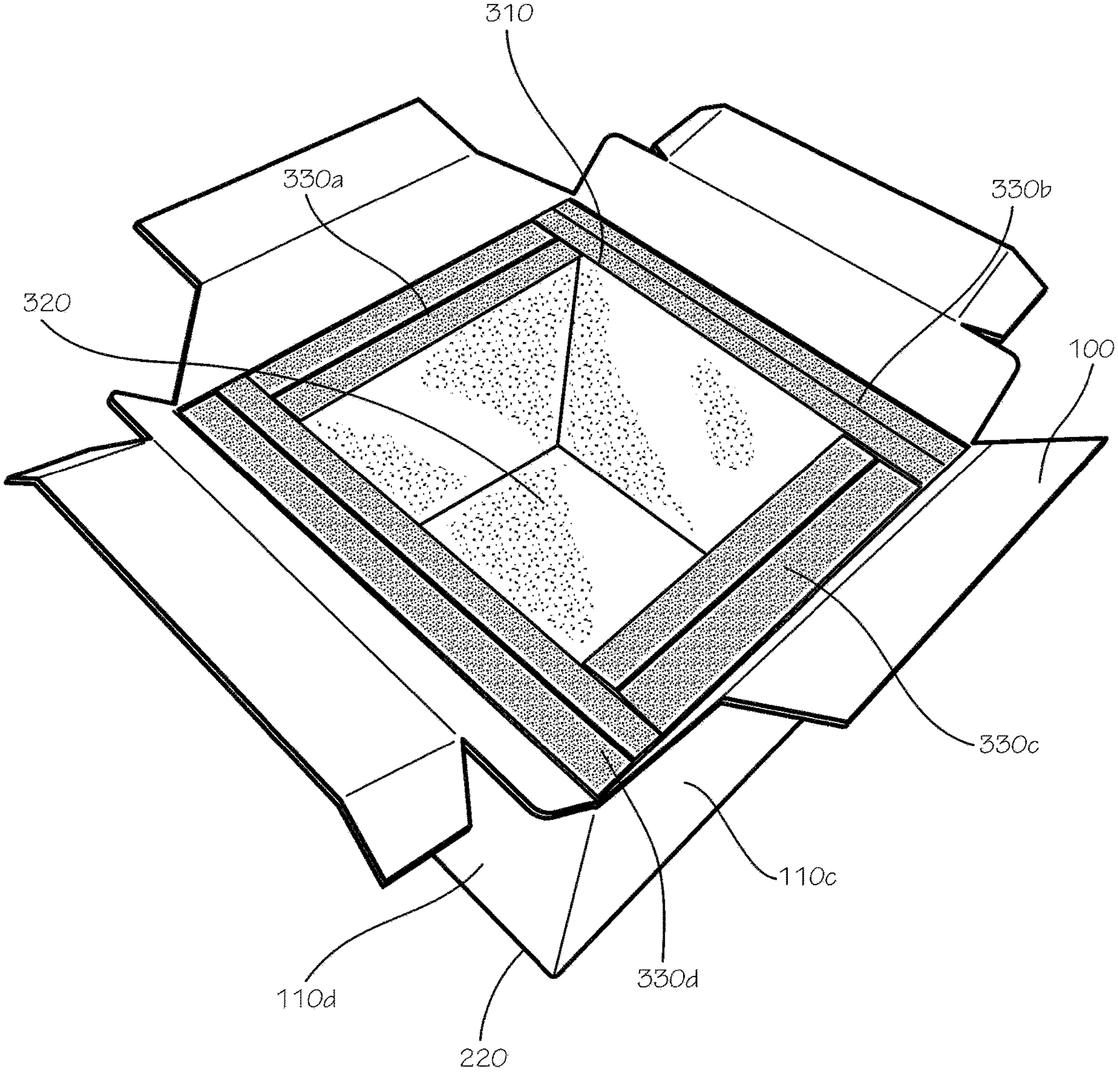
FIG. 4 is a perspective view of the insulator pads placed inside the exterior piece.

FIG. 4 is a perspective view of the partially assembled insulated box 2400. The insulator pads 310 are placed inside the assembled exterior piece 100. The bottom insulator 320 can cover, or proximately face, the lower portions 112*a,b,c,d* (not shown) of the exterior piece 100. The bottom insulator 320 can fully extend to the bottom outside edge 220. The side insulators 330*a,b,c,d* can alternate shorter and longer. For example, in the current aspect, the first side insulator 330*a* can be configured to proximately face the first middle portion 110*a* (not shown). Likewise, the second, third, and fourth side insulators 330*b,c,d*, respectively, can be configured to face the corresponding numbered middle portions 110*b,c,d*.

Figure 5:
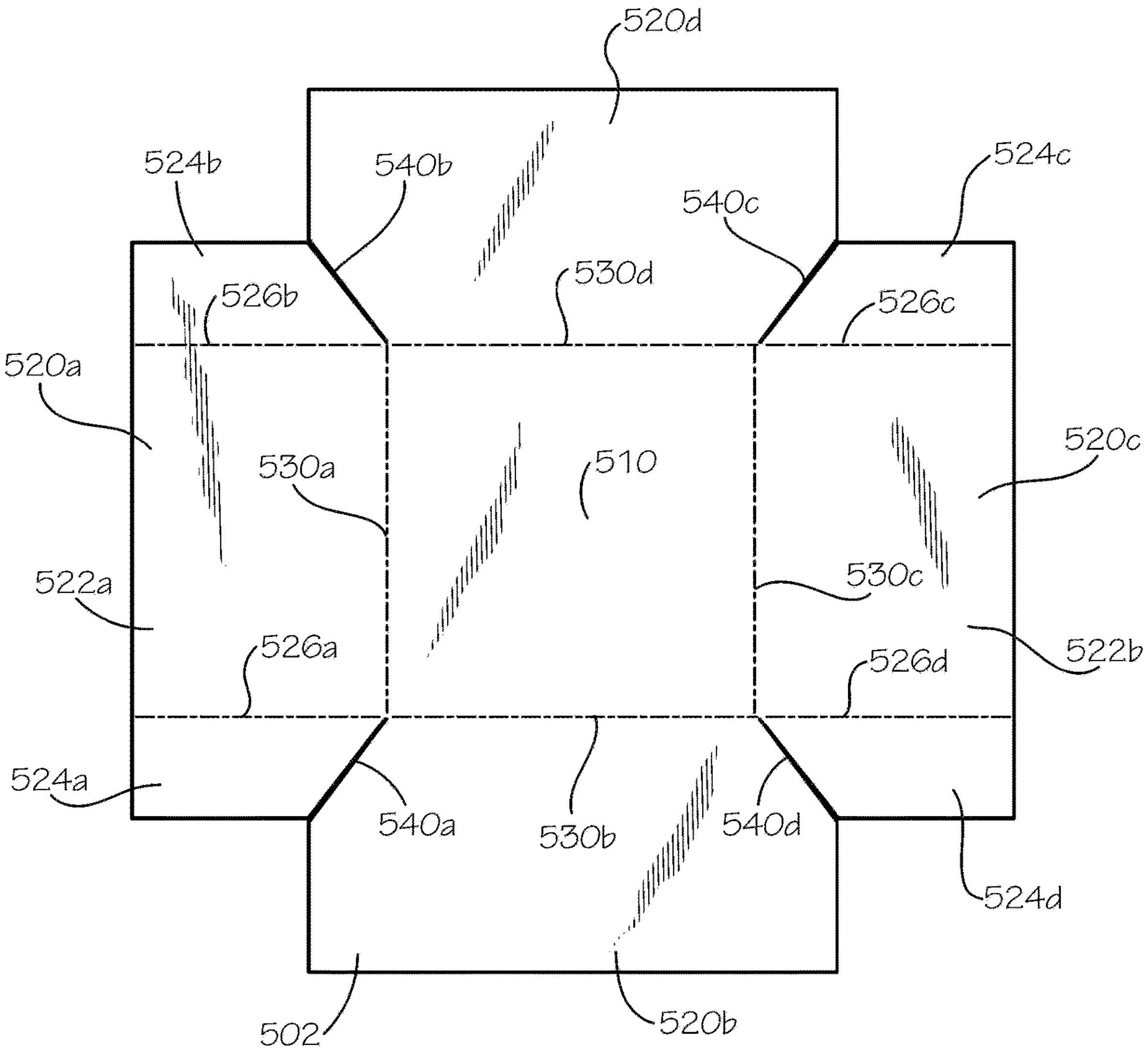
FIG. 5 shows a blank configured to be assembled into the interior piece of the insulated box.

FIG. 5 shows the interior piece 500 of the insulated box 2400 in an unassembled configuration. The interior piece 500 can comprise a bottom panel 510, side panels 520*a,b,c,d*, and fold lines 530*a,b,c,d* joining the bottom panel 510 to the side panels 520*a,b,c,d*. An interior surface 502 faces out of the page in FIG. 5. Alternating side panels—for example, a first and a third side panel 520*a,c*—can comprise a middle tab 522*a,b* and a side tab 524*a,b,c,d*. The middle tabs 522*a,b* can be joined to the side tabs 524*a,b,c,d* by fold lines 526*a,b,c,d*. A second and a fourth side panel 520*b,d* can lack fold lines. The interior piece 500 can be formed from a single flat piece with side panel cuts 540*a,b,c,d* separating the side panels 520*a,b,c,d* from each other. Thus, a blank of the interior piece 500 can be configured such that each side panel 520*a,b,c,d* is not connected to any other side panel 520*a,b,c,d*, except only indirectly through the bottom panel 510. The side panel cuts 540*a,b,c,d* can form angles with the fold lines 526*a,b,c,d*, the angles being approximately 45 degrees.

Figure 6:
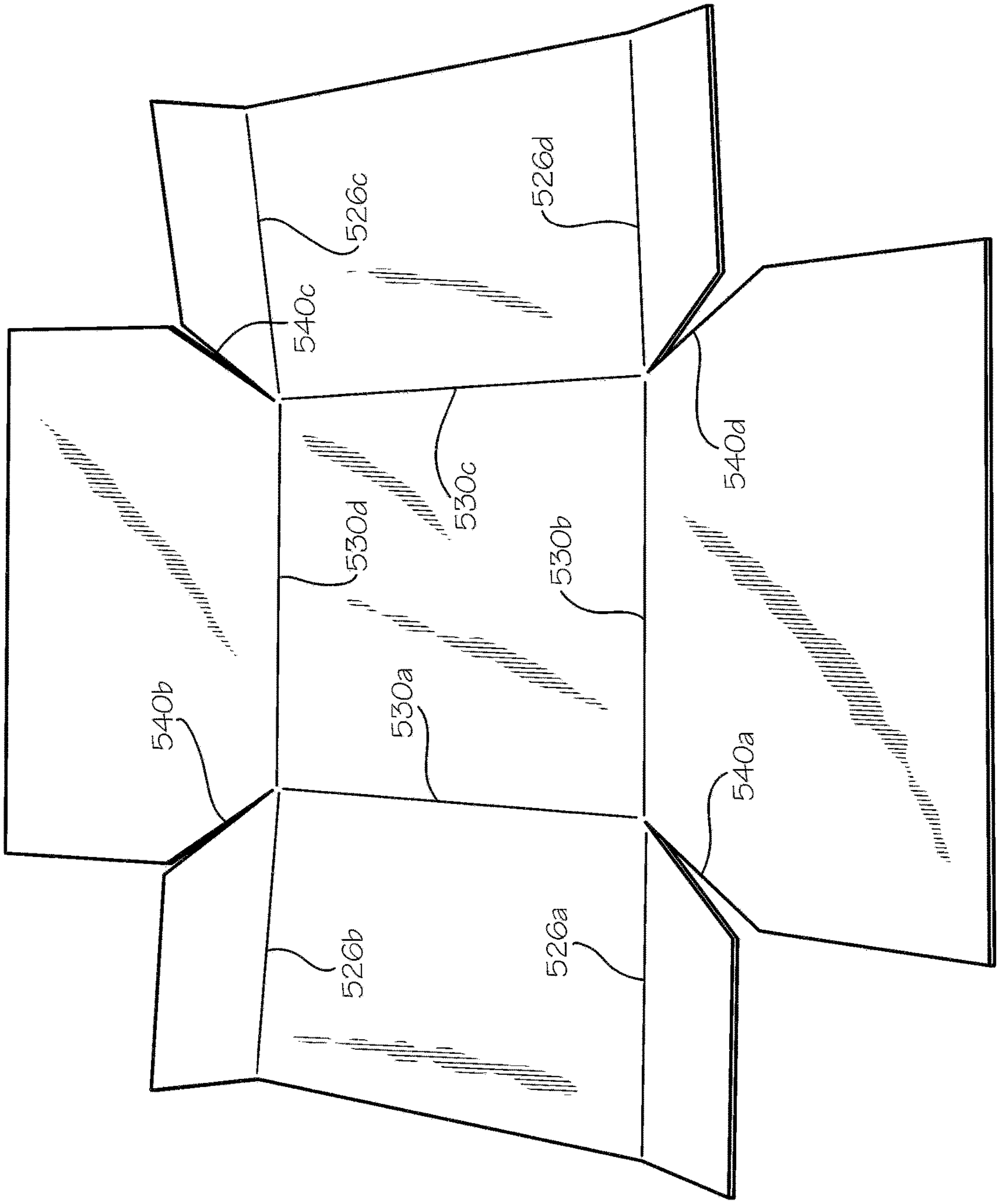
FIG. 6 is a perspective view of the blank of FIG. 5 with flaps of the blank slightly folded up.

FIG. 6 is a perspective view of the interior piece 500 with the fold lines 530*a,b,c,d*; 526*a,b,c,d* in a slightly bent configuration.

Figure 7:
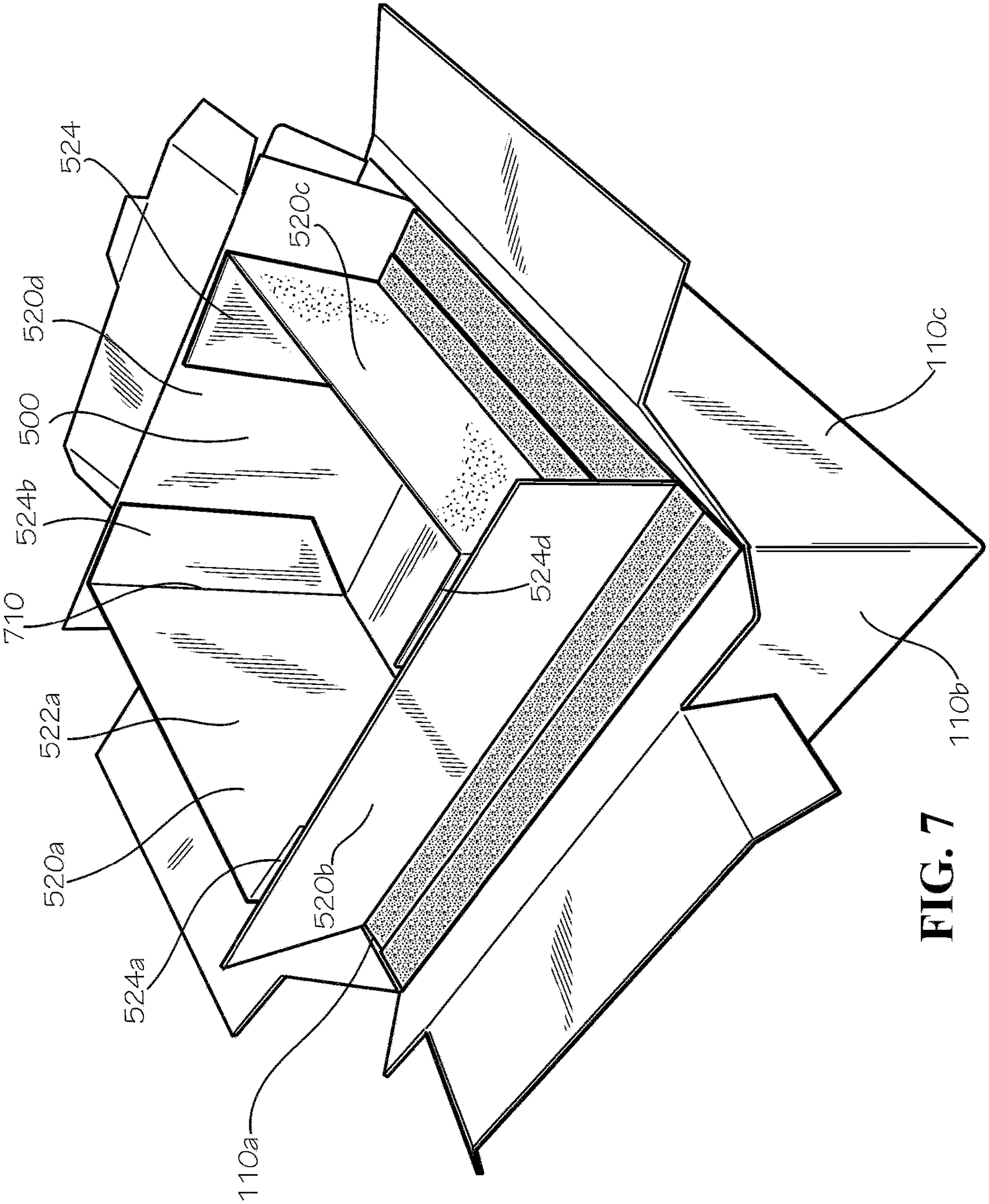
FIG. 7 is a perspective view of the interior piece positioned into the exterior piece with the insulator pads of FIG. 4 positioned therebetween.

FIG. 7 is a perspective view of the interior piece 500 partially inside the partially assembled box of FIG. 4. The middle tab 522*a* of the first side panel 520*a* of the interior piece 500 can be configured to proximately face the first middle portion 110*a* of the exterior piece 100. Likewise, the second, third, and fourth side panels 520*b,c,d* of the interior piece 500 can face the corresponding middle portions 110*b, c,d* of the exterior piece 100. Alternating side panels—for example, the second and fourth side panels 520*b,d*—can be configured to extend completely between the second and fourth middle portions 110*b,d* of the exterior piece 100. The side tabs 524*a,b,c,d* of the side panels 520*a,c* can be configured to fold inwards toward a cavity 710 in the insulated box 2400.

Figure 8:
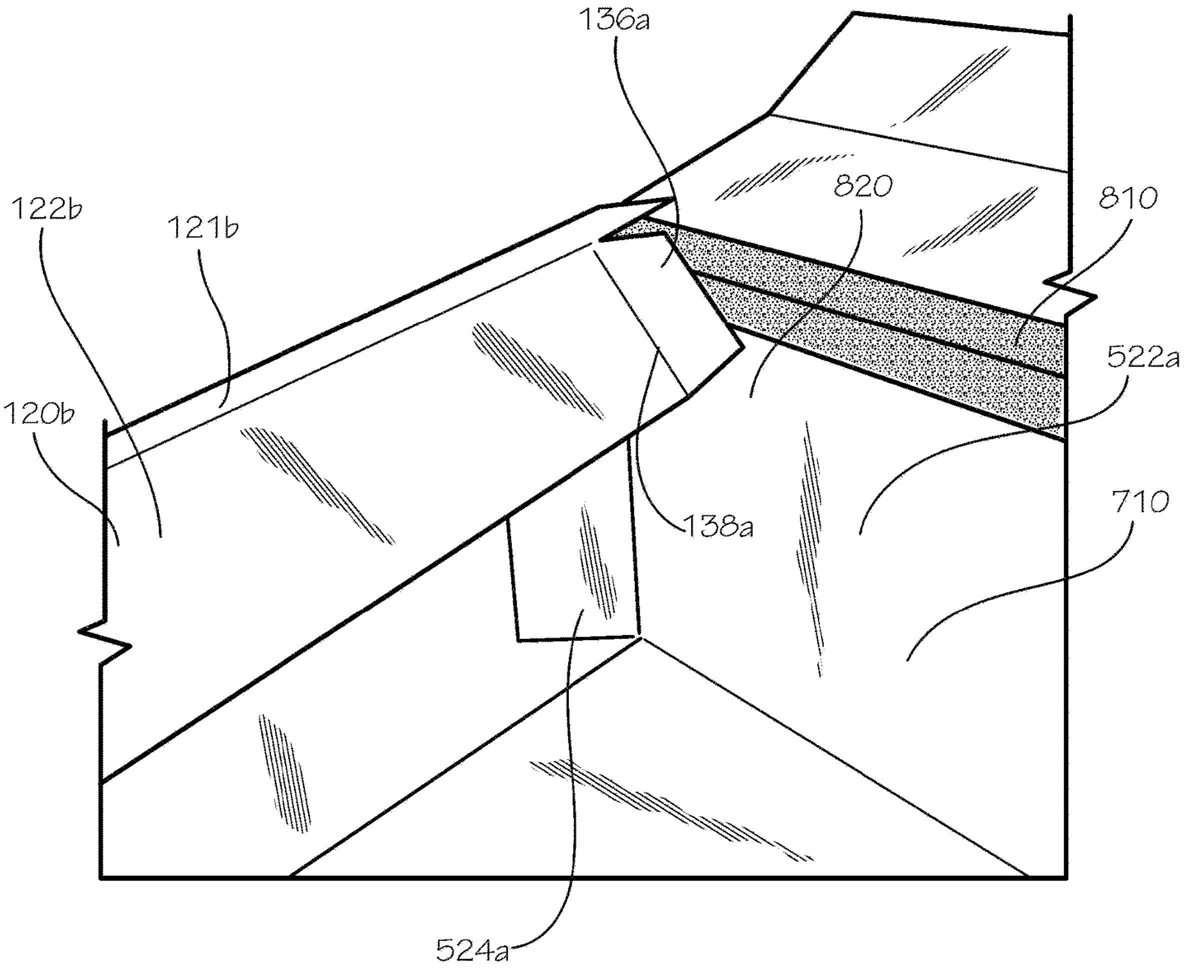
FIG. 8 is a perspective view of a top interior corner of the interior piece, with an upper portion of the exterior piece folded over to overlap a top edge of the interior piece.

FIG. 8 is a perspective view of the partially assembled insulated box 2400, showing a close-up of one of the exterior piece's 100 upper portions 120*b* (of the exterior piece 100) comprising an end segment 122*b* comprising a side tab 136*a*. The connecting segment can be configured to fold down toward the cavity 710 and cover a top edge 810 of the insulating pads 310. In other aspects (not shown) in accordance with the present disclosure, the insulator pads can be omitted, in which case the insulating properties of air left behind in a space or gap left between the interior piece 500 and the exterior piece 100 can insulate the insulated box 2400. In yet other aspects, at least a portion of the upper portion 120*a,b,c,d* of the exterior piece 100—not necessarily the connecting segment 121*a,c*—can cover at least some portion of the space. In other words, “covering” can comprise “partially covering.”

The end segment 122*b* can be configured to overlap or cover a top interior portion 820 of the assembled interior piece 500. In some aspects, only a portion of the top interior portion 820 may be covered by a portion of the upper portion 120*a,b,c,d* of the exterior piece 100. The side tab 136*a* can overlap the side panel adjoining the side panel overlapped by the end segment 122*b*, which in this aspect can be side panel 520*a*.

Figure 9:
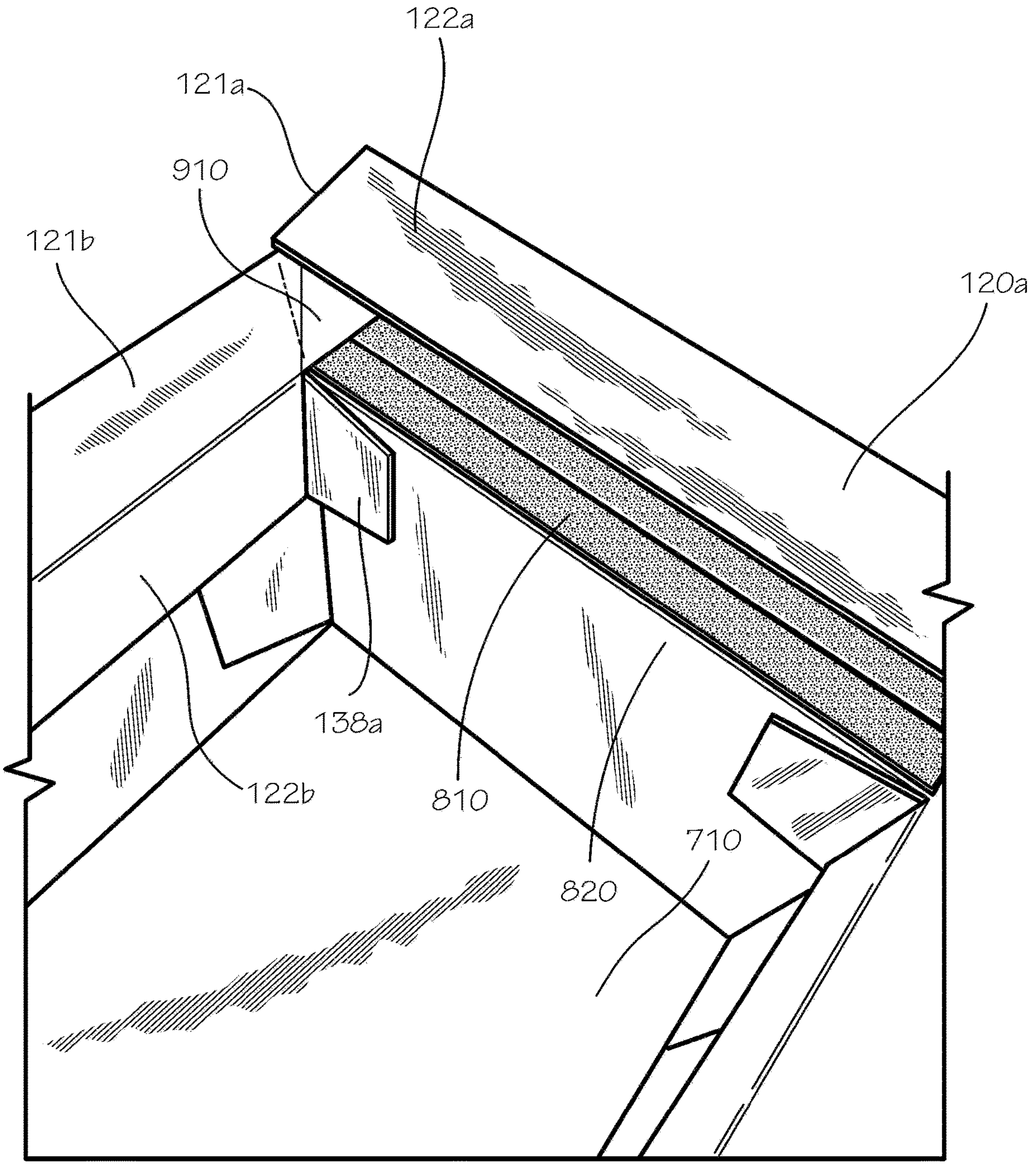
FIG. 9 is a perspective view of the partially assembled insulated box, with another upper portion of the exterior piece in the process of being folded over to overlap the top edge of the interior piece.

FIG. 9 is a perspective view of the partially assembled insulated box 2400, showing the next step in assembly after FIG. 8. The upper portion 120*a* can be configured to fold down toward the cavity 710. The connecting segment 121*a* can overlap a corner 910 of the adjoining connecting segment. The end segment 122*a* can overlap the top interior portion 820 of the interior piece 500 and further overlap the side tab 136*a* of the exterior piece 100. The end segments 122*a* can be affixed in place by adhesives known in the art or by friction without adhesive.

Figure 10:
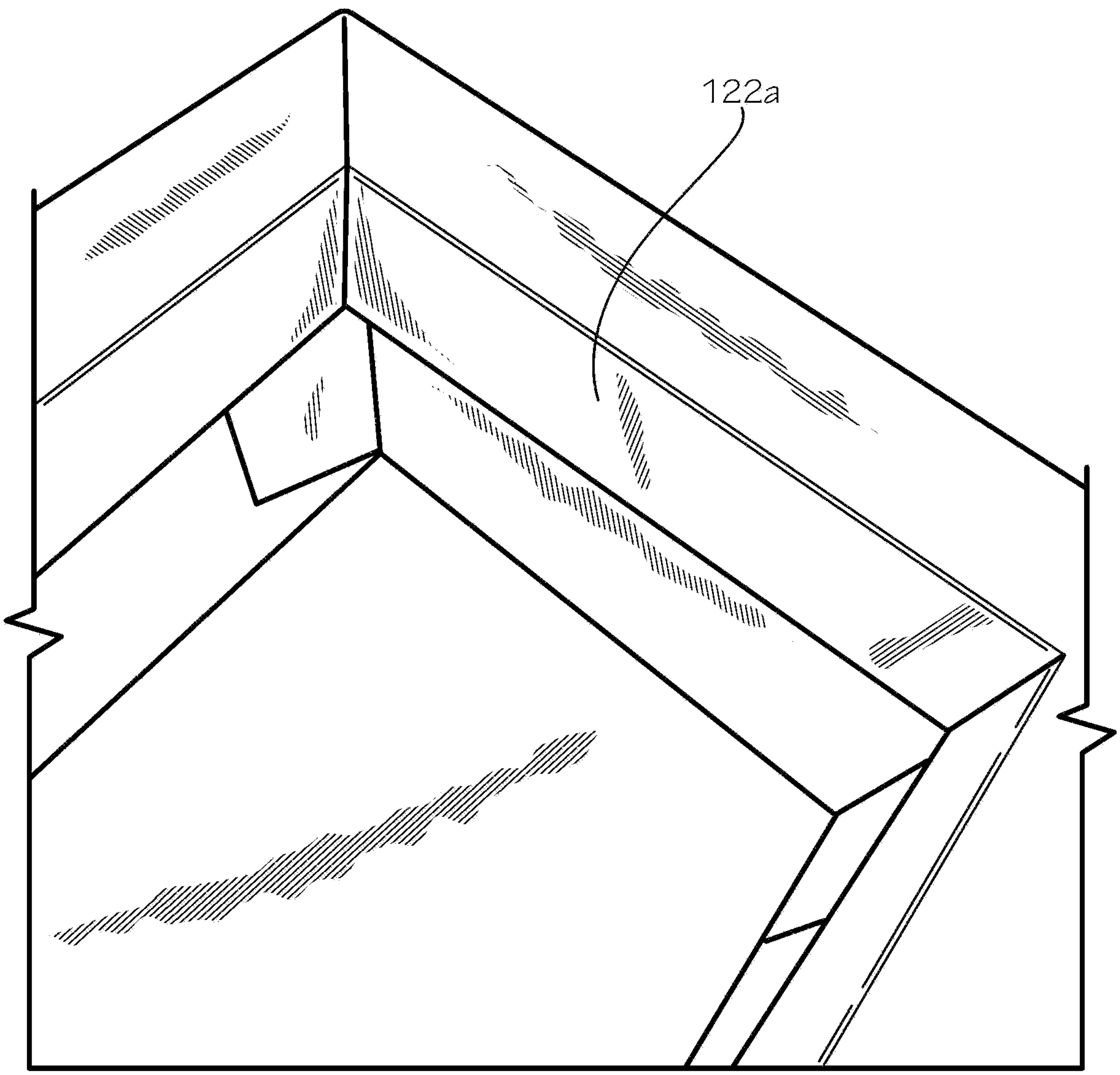
FIG. 10 is a perspective view of the insulated box after another upper portion of the exterior piece has been folded over to overlap the top edge of the interior piece.

FIG. 10 shows the insulated box 2400 after the step shown in FIG. 9 has been completed. The end segment 122*a* overlaps side panel 520*a* and side tab 136*a* of the exterior piece 100.

Figure 11:
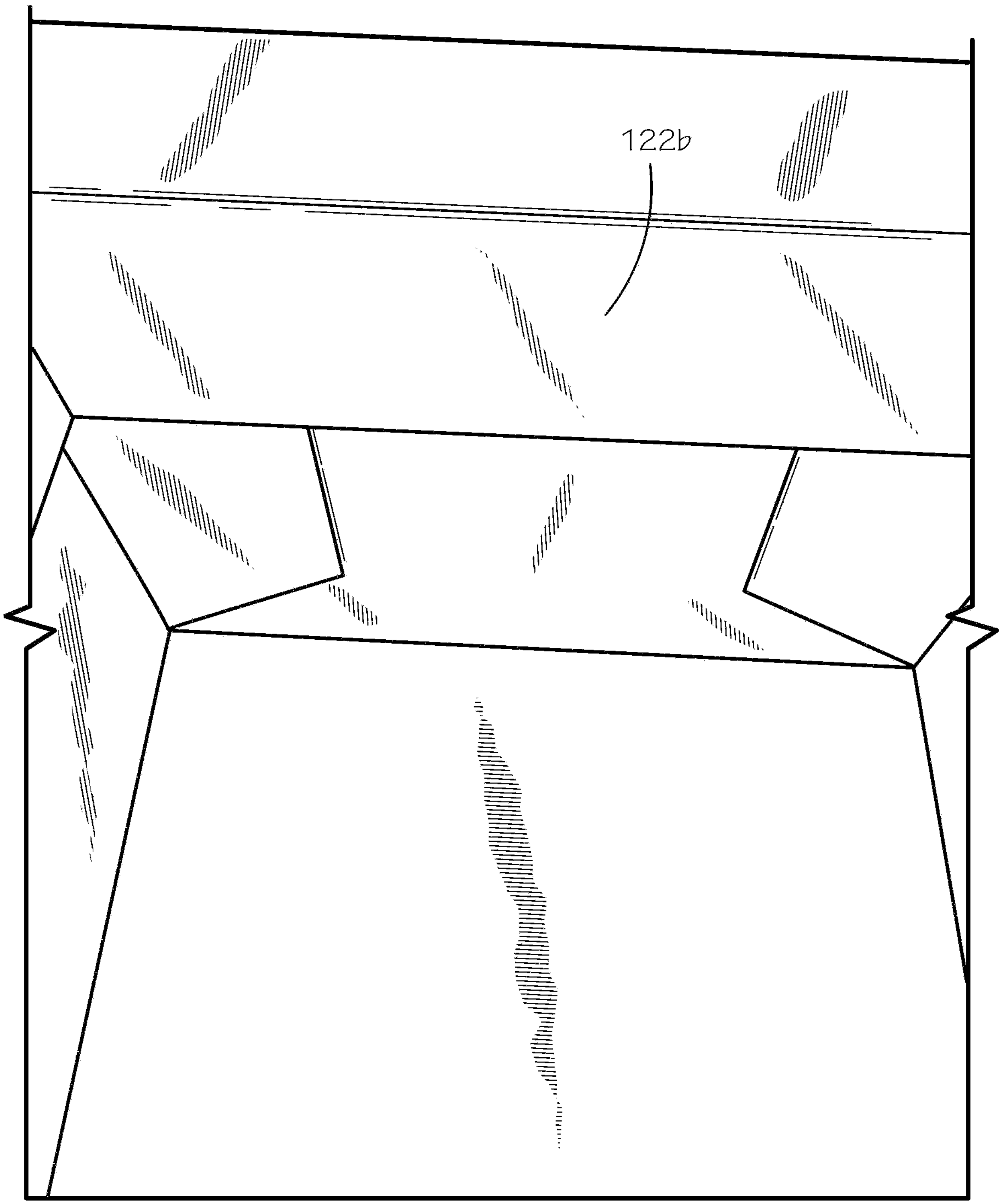
FIG. 11 is a perspective view of an interior of the insulated box with the upper portions of the exterior piece folded over and overlapping side panels of the interior piece.

FIG. 11 shows another view of the insulated box 2400, particularly a close-up of end segment 122*b*.

Figure 12:
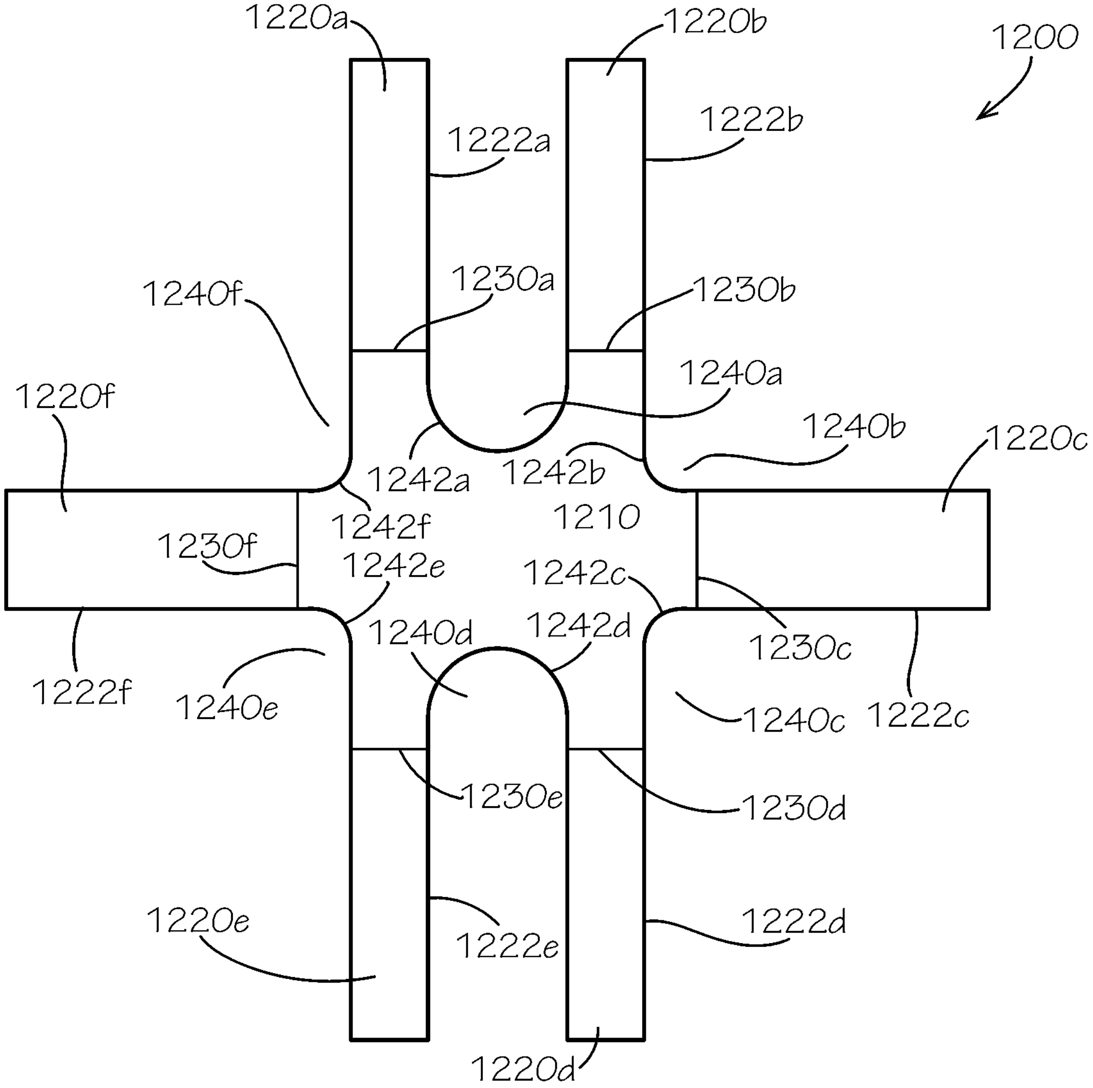
FIG. 12 shows a blank configured to be assembled into a box insert with vertical rails in accordance with another aspect of the present disclosure.

FIG. 12 is a top view of a box insert 1200 with vertical rails 1220 in a flat configuration. The box insert 1200 can comprise a center segment 1210 and vertical rails 1220*a,b, c,d,e,f* joined thereto by fold lines 1230*a,b,c,d,e,f*. The center segment 1210 can comprise cutouts 1240*a,b,c,d,e,f*. An edge 1242*a,b,c,d,e,f* of each cutout 1240*a,b,c,d,e,f* can be contiguous with an edge 1222*a,b,c,d,e,f* of each vertical rail 1220*a,b,c,d,e,f*, respectively. The edges 1242*a,b,c,d,e,f* of the cutouts 1240*a,b,c,d,e,f* can be curvilinear, rectilinear, or some other shape. The edges 1222*a,b,c,d,e,f* of the vertical rails 1220*a,b,c,d,e,f* can be curvilinear or rectilinear or some other shape.

Figure 13:
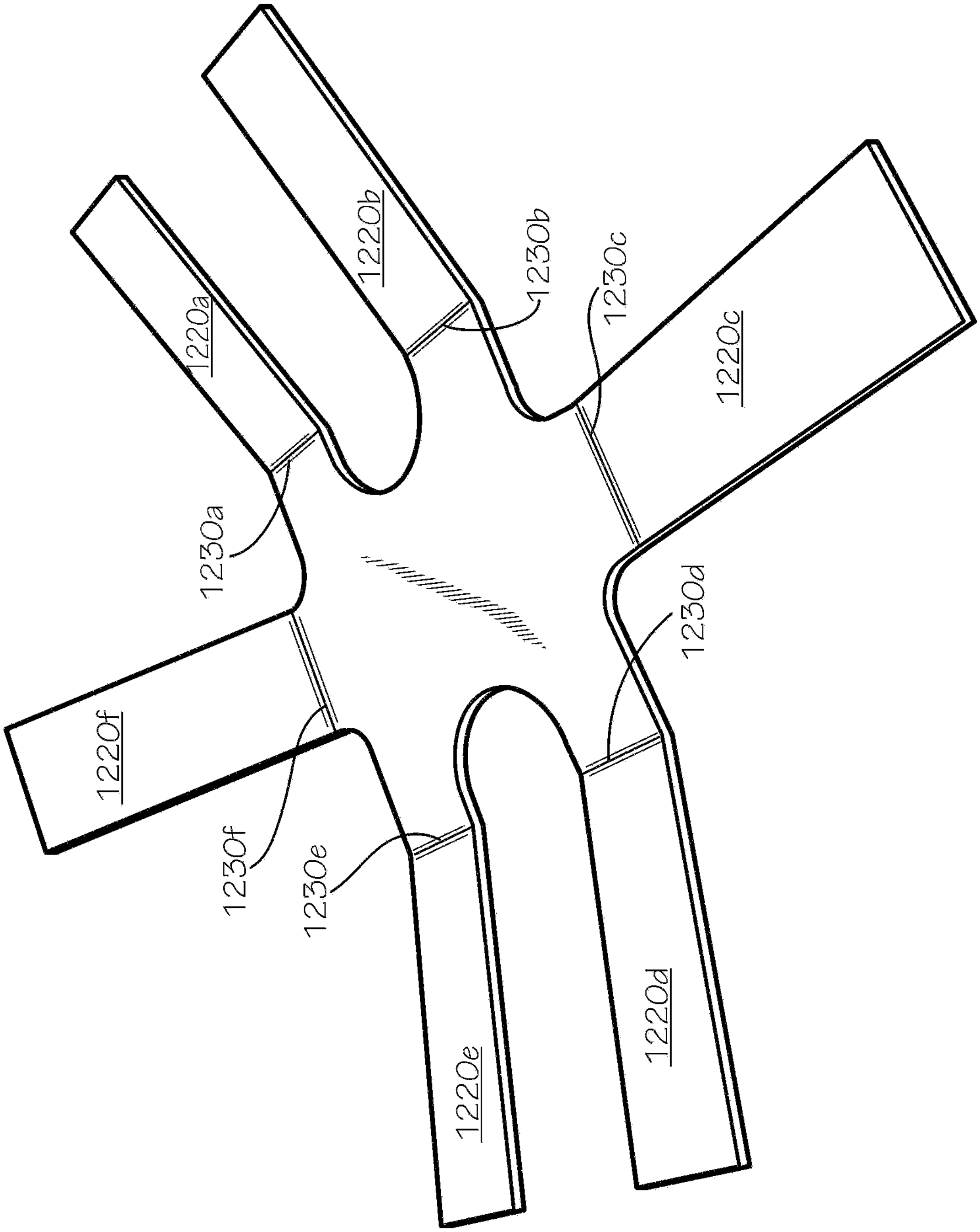
FIG. 13 is a perspective view of the blank of FIG. 12 with rails folded slightly upwards.

FIG. 13 is a perspective view of the box insert 1200. The vertical rails 1220*a,b,c,d,e,f* of the box insert 1200 can be configured to bend upward along the fold lines 1230*a,b,c, d,e,f*. As shown in the current aspect, the fold lines 1230*a, b,c,d,e,f* between the vertical rails 1220*a,b,c,d,e,f* and the center segment 1210 can coincide with the fold lines 530*a, b,c,d* between the bottom panel 510 and the side panels 520*a,b,c,d* of the interior piece 500.

Figure 14:
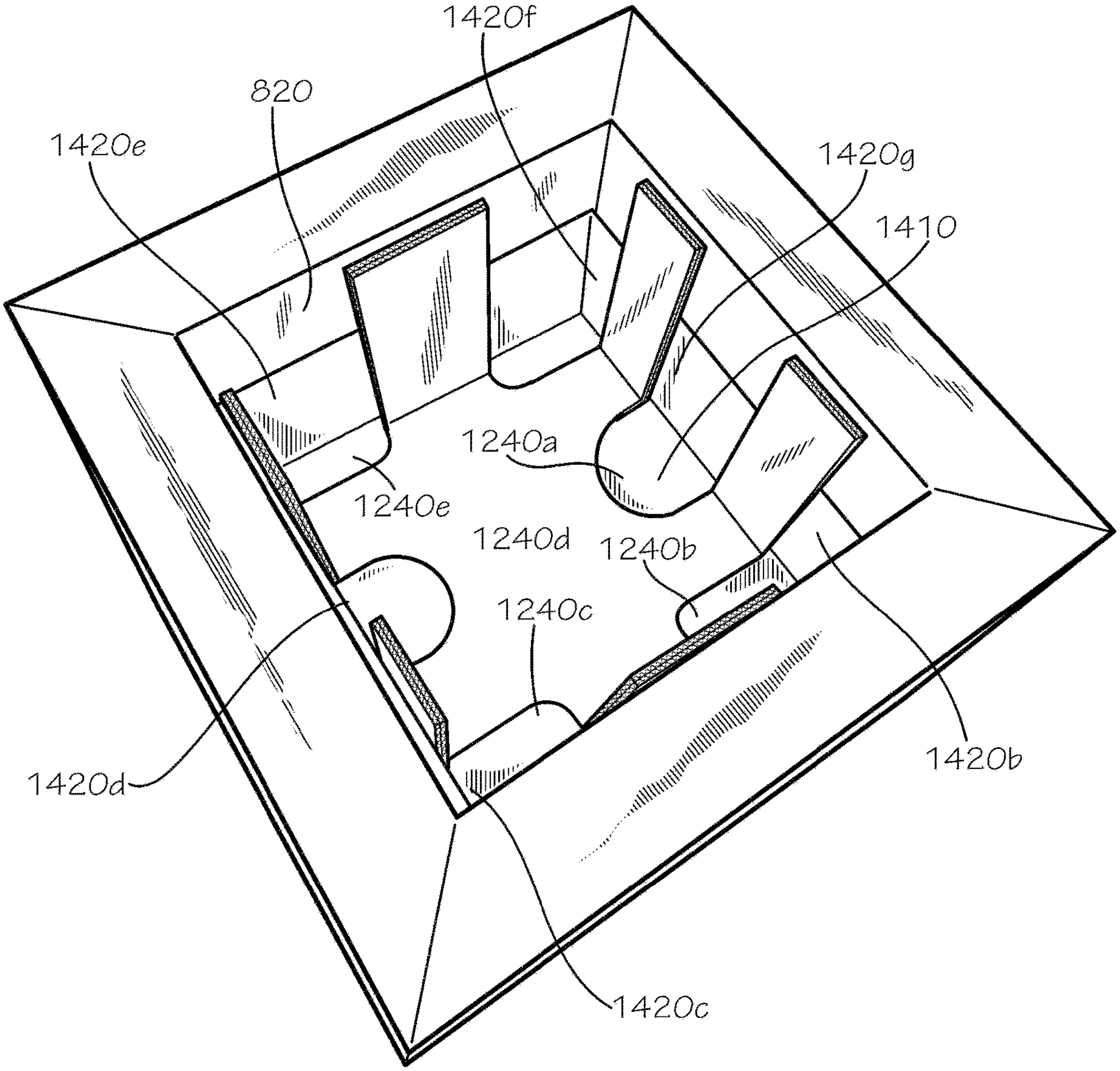
FIG. 14 is a perspective view of the insert with vertical rails inside the insulated box.

FIG. 14 is a perspective view of the box insert 1200 inside the insulated box 2400. The cutouts 1240*a,b,c,d,e,f* can be configured to expose regions of a bottom 1410 of the cavity 710. The box insert 1200 can be configured to allow air to flow to and from the cutouts 1240*a,b,c,d,e,f* and spaces 1420*a,b,c,d,e,f* between the vertical rails. The vertical rails 1220*a,b,c,d,e,f* can be configured to extend to the top interior portion 820.

Figure 15:
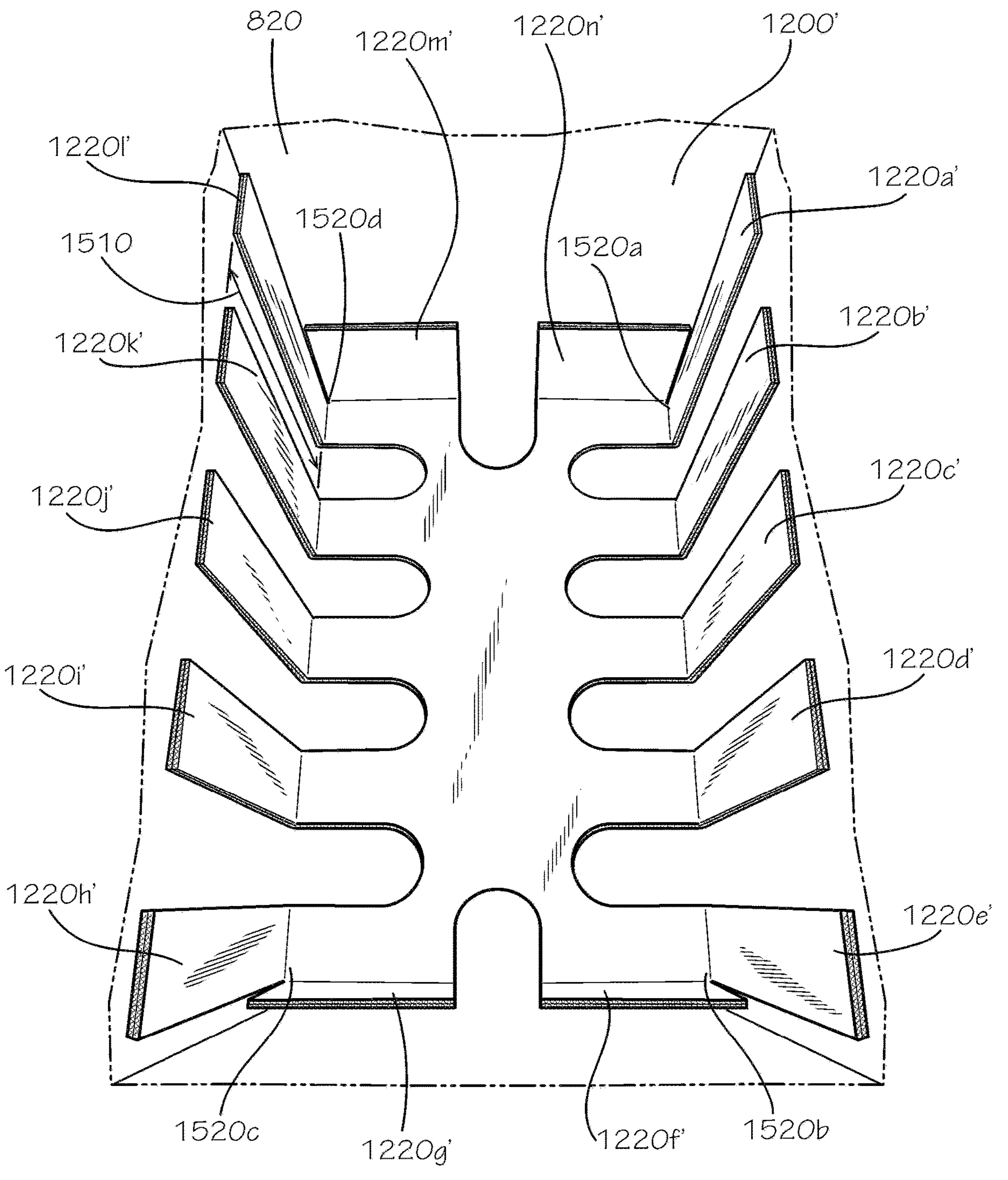
FIG. 15 is a perspective view of the insert with vertical rails in accordance with another aspect of the present disclosure.

FIG. 15 is a perspective view of the box insert 1200' in another exemplary aspect. In the current aspect, the vertical rails 1220*a',b',c',d',e',f',g',h',i',j',k',l',m',n'* can be configured to rise to a height 1510 below the top interior portion 820. The vertical rails 1220*a',e',f',g',h',l',m',n'* can also be configured to adjoin each other at bottom corners 1520*a,b,c, d*—without a space 1420 between them.

Figure 16:
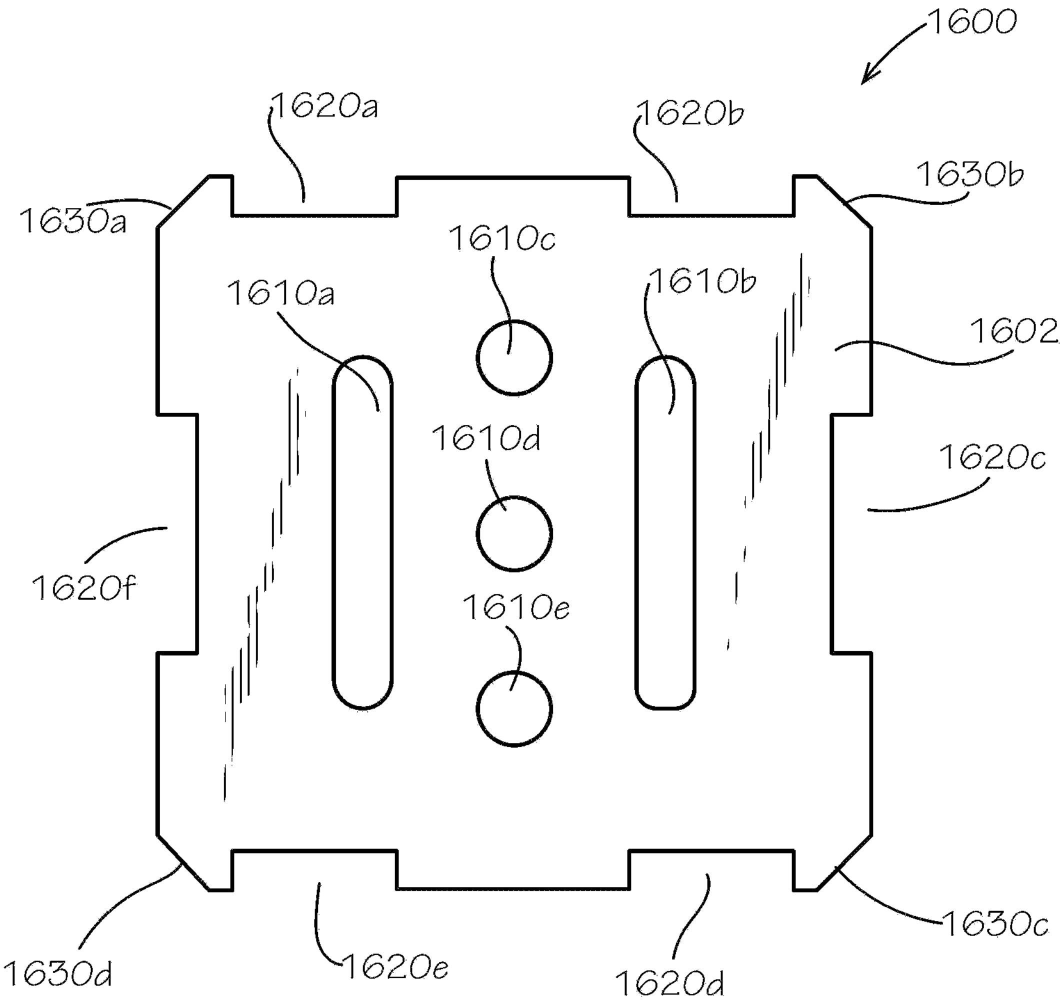
FIG. 16 is a top view of a register configured to slide up and down along the vertical rails of the insert of FIG. 12.

FIG. 16 is a top view of a register 1600. The register 1600 can comprise a face segment 1602. The face segment 1602 can comprise holes 1610*a,b,c,d*; side cutouts 1620*a,b,c,d,e, f*; and corner cutouts 1630*a,b,c,d*. The register can be cut from a single flat piece.

Figure 17:
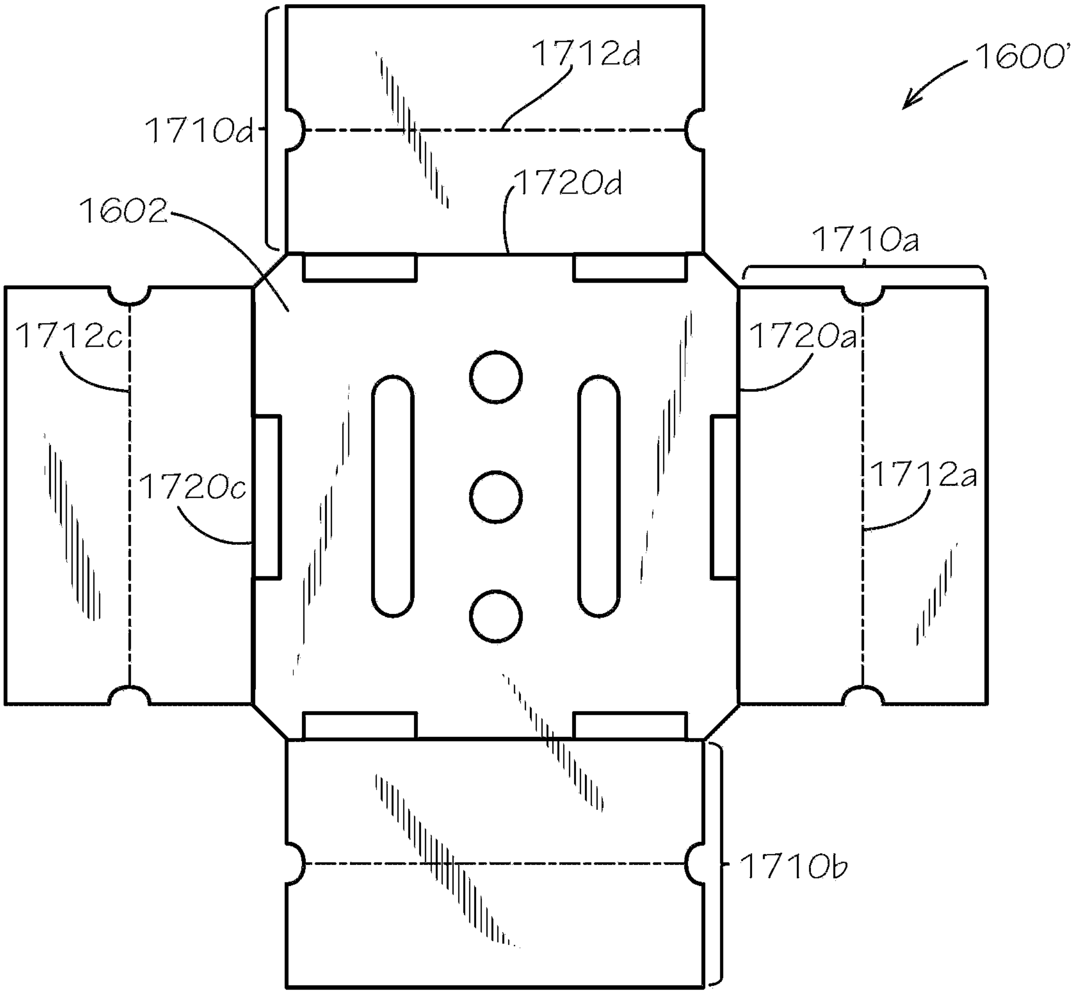
FIG. 17 is a top view of a register configured to slide up and down along the vertical rails of the insert of FIG. 12 in accordance with another aspect of the present disclosure.

FIG. 17 is a top view of a register 1700' in another exemplary aspect. The register 1600' can further comprise side segments 1700*a,b,c,d* joined to the face segment 1602 by fold lines 1720*a,b,c,d*. The side segments 1700*a,b,c,d* can comprise fold lines 1712*a,b,c,d* configured to be parallel to the corresponding fold lines 1720*a,b,c,d*.

Figure 18:
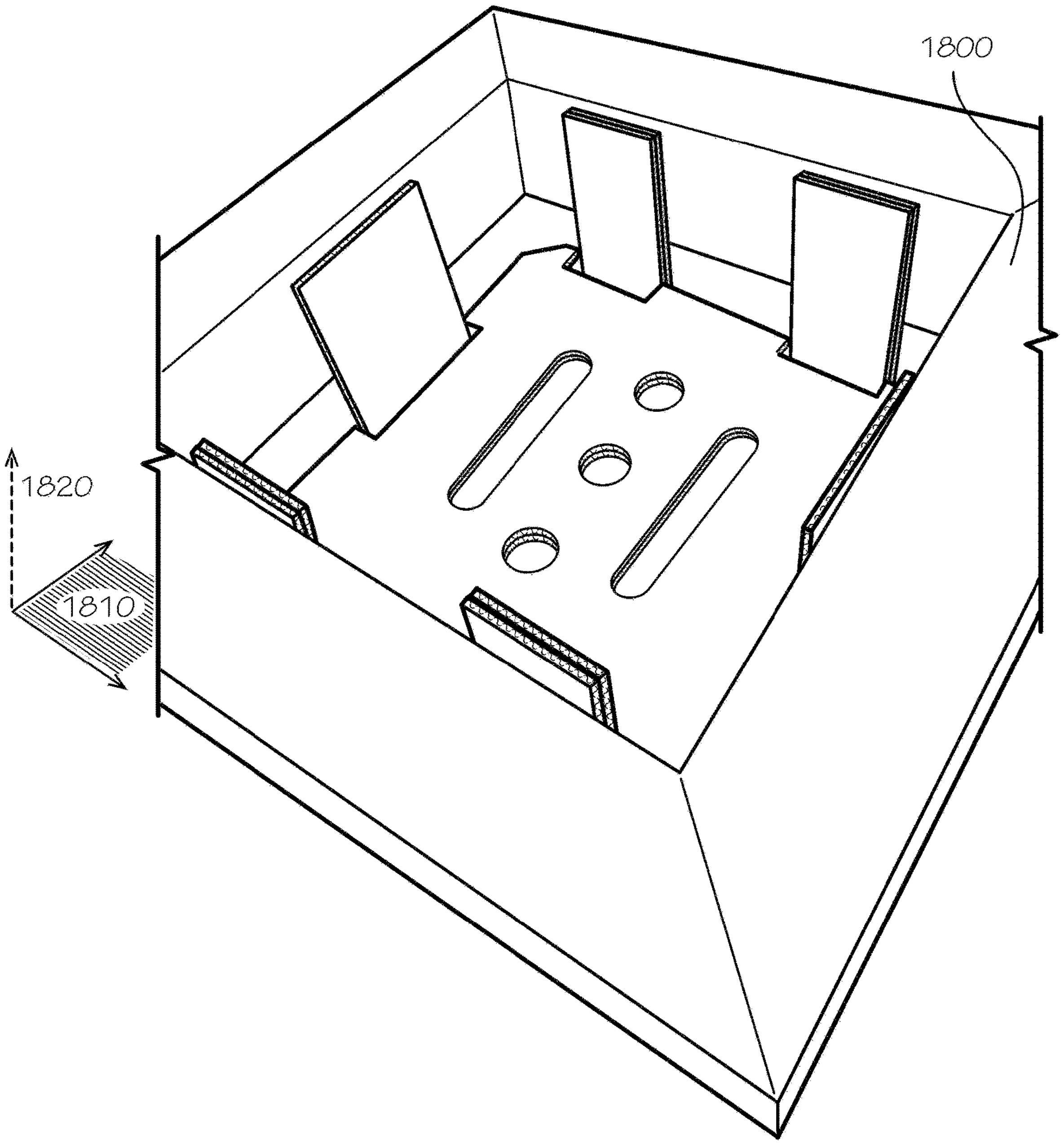
FIG. 18 is a perspective view of the register positioned in the insulated box as configured in FIG. 14.

FIG. 18 is a perspective view of the box insert 1200 receiving the register 1600. The register 1600 and the box insert 1200 can together form a registration system 1800. The registration system 1800 can be configured to allow the register 1600 to slide up and down the vertical rails 1220*a, b,c,d,e,f* along a vertical axis 1820 while the face segment 1602 is maintained in a horizontal plane 1810. The center segment 1210 can be configured to cover a bottom interior of the box 2400, and one or more of the vertical rails 1220*a,b,c,d,e,f* can be configured to cover a side interior of the box 2400. The register 1600 can be configured to slidably move along one or more of the vertical rails 1220*a,b,c,d,e,f* while maintaining a horizontal position, and the cutout 1620*a,b,c,d,e,f* of the register 1600 can be configured to surround one or more of the vertical rails 1220*a, b,c,d,e,f* of the box insert 1200.

Figure 19:
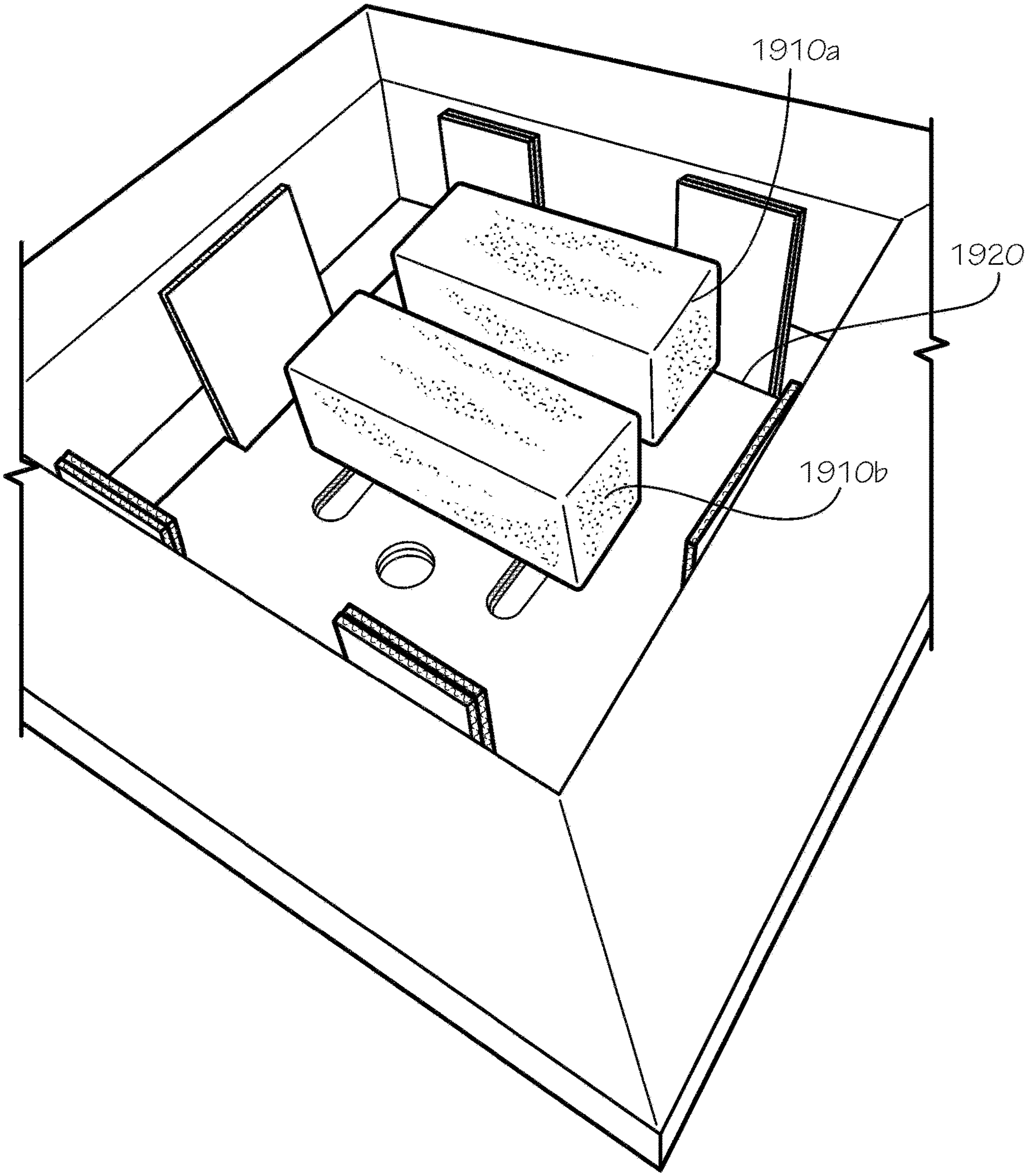
FIG. 19 is a perspective view of the insulated box of FIG. 18 comprising the register and with a representation of ice packs placed over the register.

FIG. 19 is a perspective view of the registration system 1800. The side cutouts 1620*a,b,c,d,e,f* can be configured to receive the vertical rails 1220*a,b,c,d,e,f* such that the register 1600 does not tip over when an overhead weight 1910*a,b* is placed near an edge 1920 of the face segment 1602 or when the register 1600 is not supported under a center of mass (not shown) of the register 1600 with the overhead weight 1910*a,b*.

Figure 20:
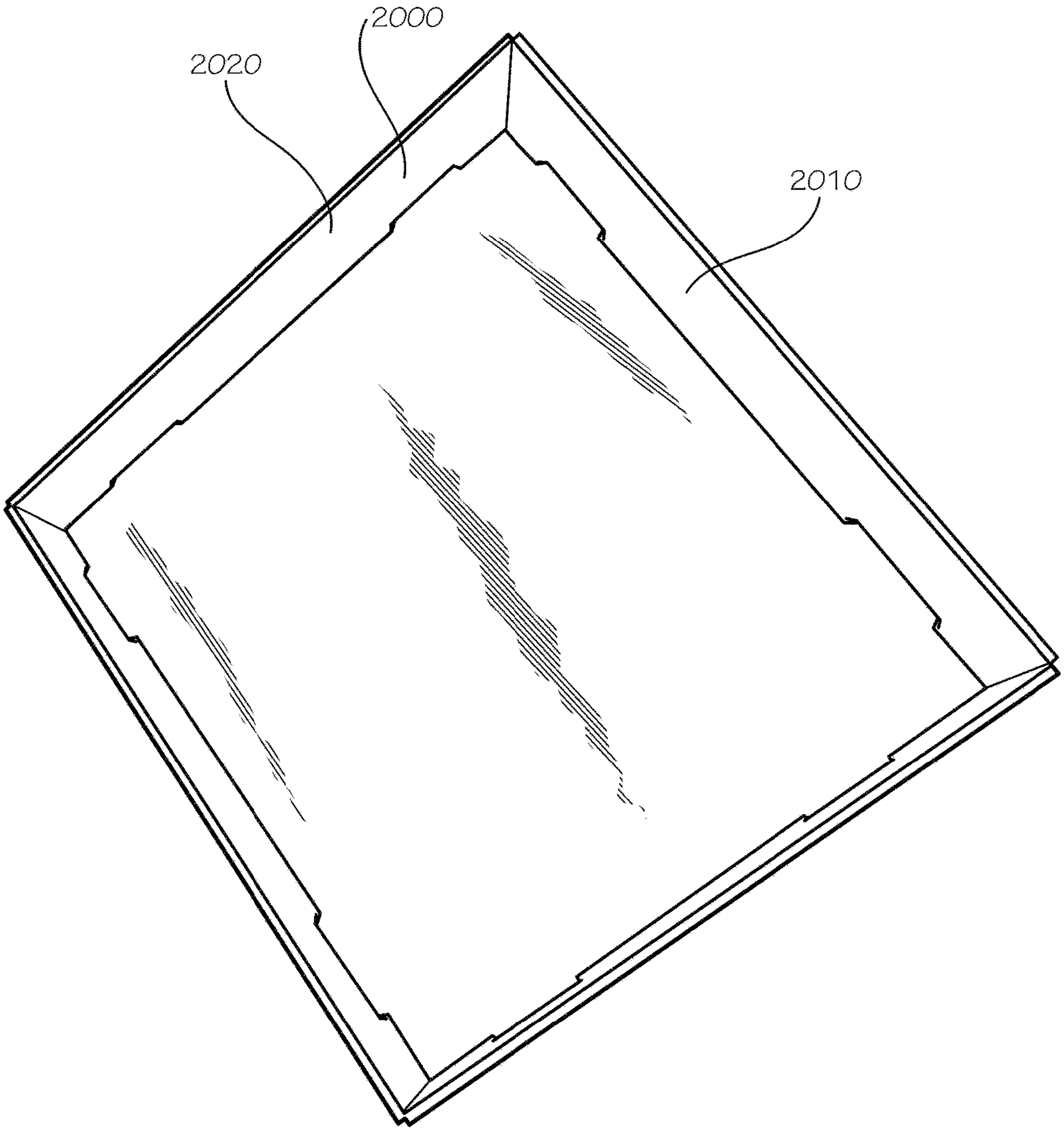
FIG. 20 is a perspective view of an assembled lid in accordance with another aspect of the present disclosure.

FIG. 20 is a perspective view of a lid 2000 for the insulated box 2400. The lid 2000 can comprise an inner piece 2010 and an outer piece 2020.

Figure 21:
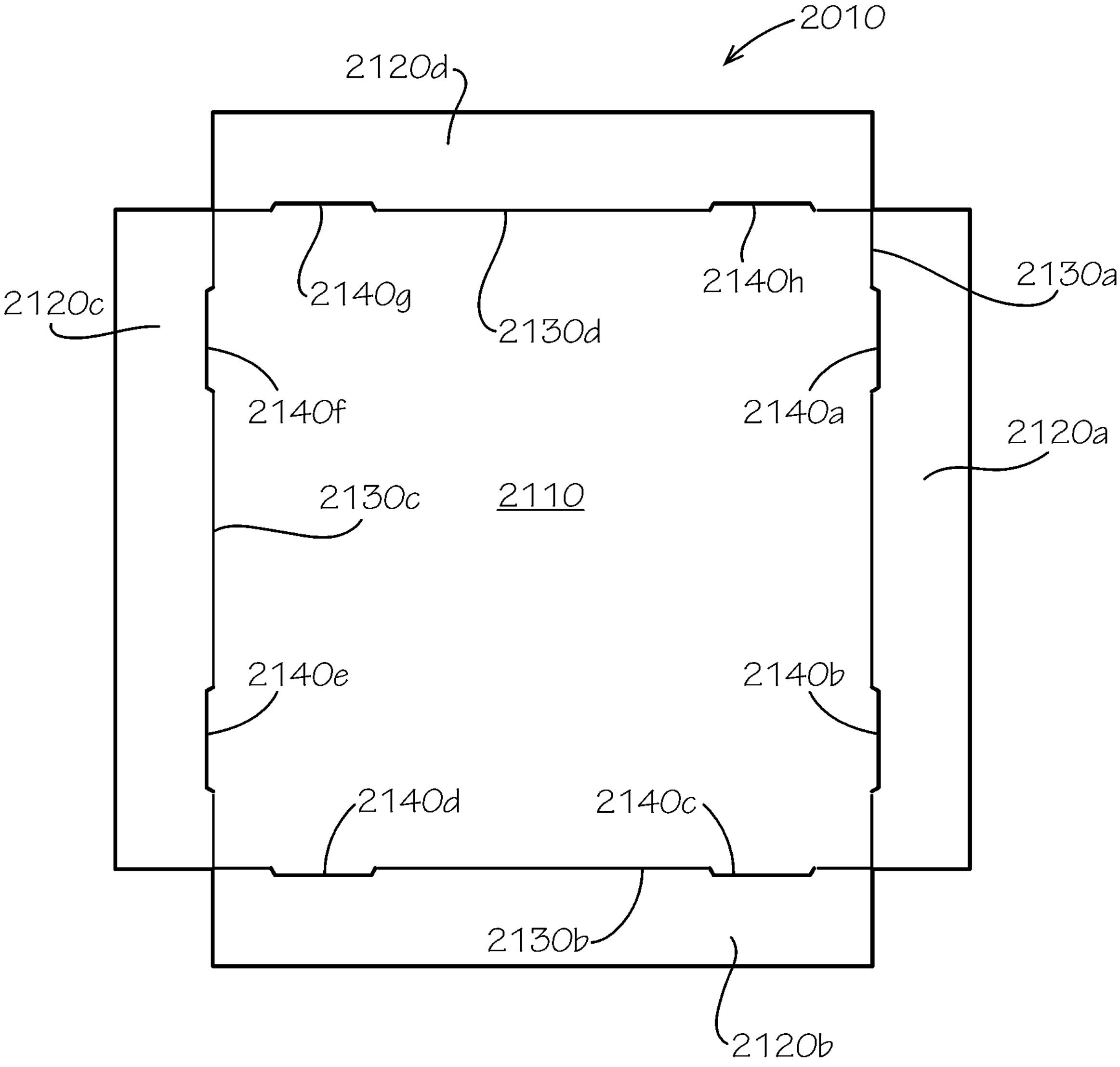
FIG. 21 shows a blank configured to be assembled into an inner piece of the lid of FIG. 19.

FIG. 21 is a top view of the inner piece 2010 of the lid 2000 in a flat, unassembled configuration. The inner piece 2010 can comprise a center segment 2110 and side segments 2120*a,b,c,d* joined to the center segment 2110 by fold lines 2130*a,b,c,d*. The fold lines 2130*a,b,c,d* can comprise tab cuts 2140*a,b,c,d,e,f,g,h*.

Figure 22:
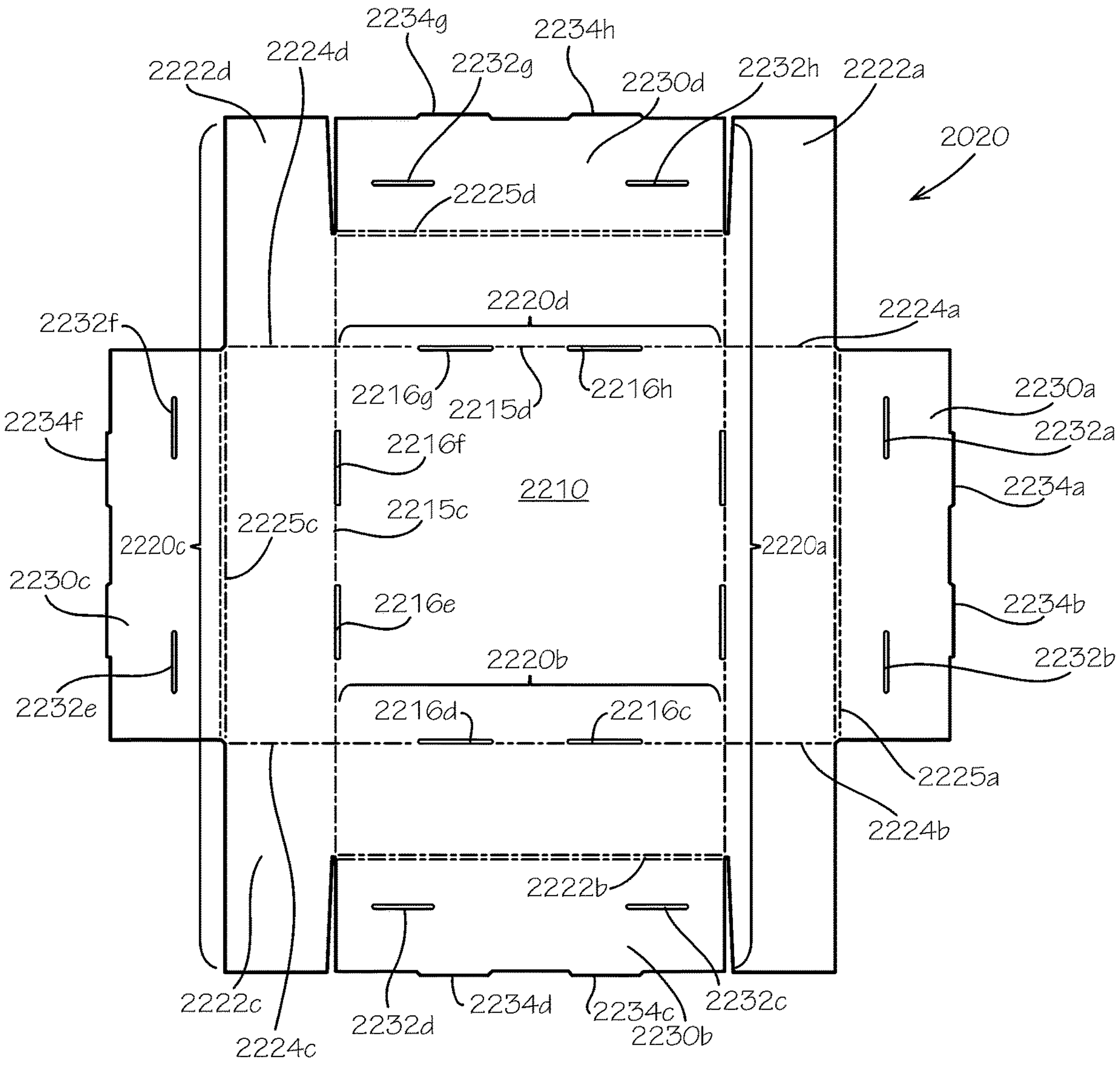
FIG. 22 shows a blank configured to be assembled into an outer piece of the lid of FIG. 19.

FIG. 22 is a top view of the outer piece 2020 of the lid 2000 in a flat, unassembled configuration. The outer piece 2020 can comprise a center segment 2210, connecting segments 2220*a,b,c,d* joined to the center segment 2210 by fold lines 2215*a,b,c,d*, and end segments 2230*a,b,c,d* joined to the connecting segments 2220*a,b,c,d* by fold lines 2225*a, b,c,d*. The fold lines 2225*a,b,c,d* can be double fold lines. Alternating segments, such as a first and a third connecting segment 2220*a,c*, can comprise side tabs 2222*a,b,c,d* joined to the connecting segments 2220*a,c* by fold lines 2224*a,b, c,d*. The fold lines 2215*a,b,c,d* joining the center segment 2210 to the connecting segments 2220*a,b,c,d* can comprise or define slots 2216*a,b,c,d,e,f,g,h*. The end segments 2230*a, b,c,d* can comprise tab slots 2232*a,b,c,d,e,f,g,h* and tabs 2234*a,b,c,d,e,f,g,h*. Any one or more of the fold lines disclosed herein can be defined by the parts joined by or at the corresponding fold line(s).

Figure 23:
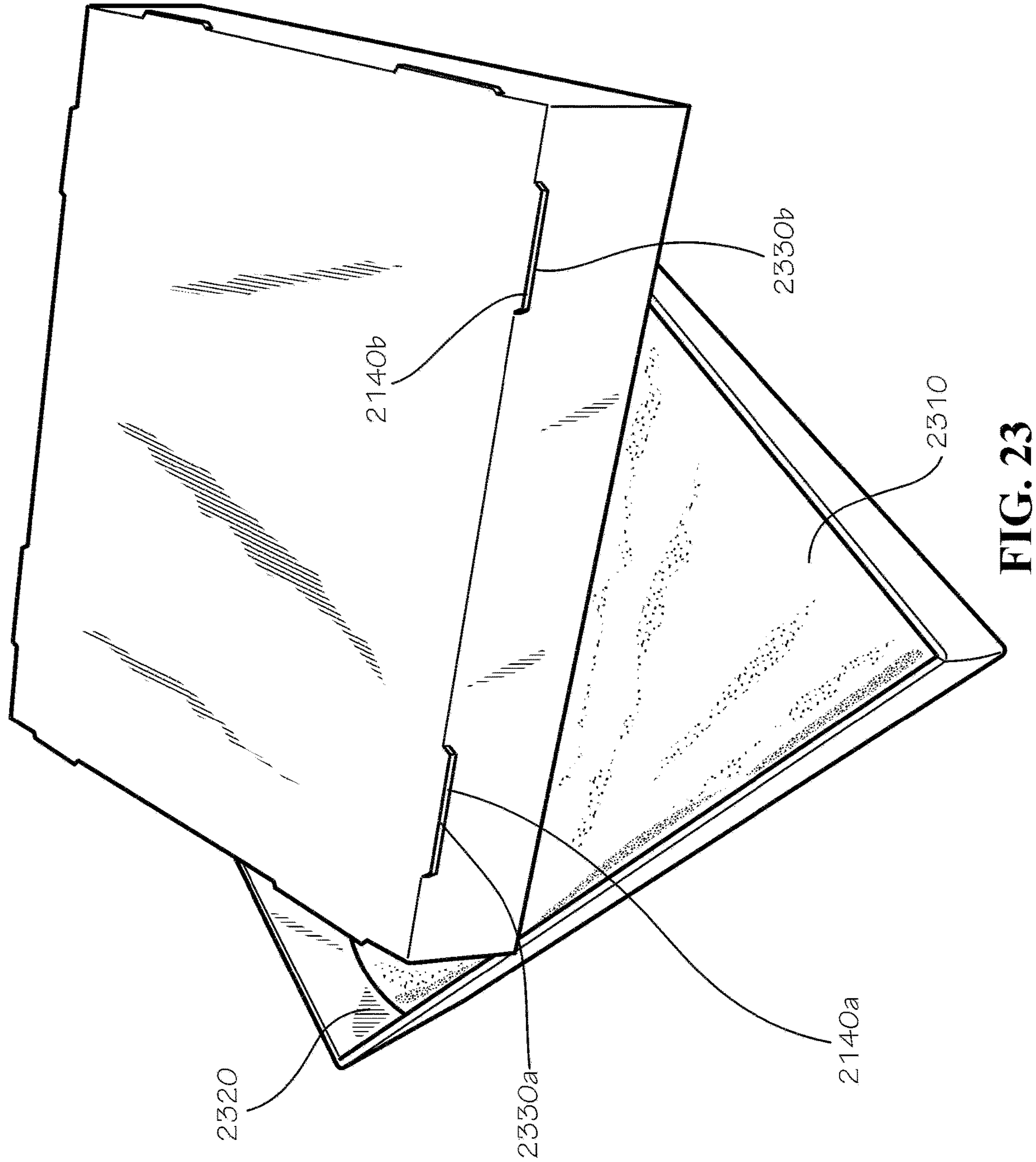
FIG. 23 is a perspective view of the lid of FIG. 19 in a partially assembled configuration.

FIG. 23 is a perspective view of a partially-assembled lid 2000. The lid 2000 can further comprise an insulator such as an insulating pad 2310 between the outer piece 2020 and the inner piece 2010. The side segments 2120*a,b,c,d* of the inner piece 2010 can fold toward a cavity 2320 of the outer piece 2020 in an assembled configuration. Folding the side segments 2120*a,b,c,d* in this way can expose the tabs 2330*a,b* (and others not shown) formed by the tab cuts 2140*a,b,c,d, e,f,g,h*. The tabs 2330*a,b* can be received by the tab slots 2232*a,b,c,d,e,f,g,h* such that the insulating pad 2310 and the inner piece 2010 are secured. The outer piece 2020 can be assembled by sandwiching the side tabs 2222*a,b,c,d* between neighboring connecting segments 2220*b,d* and end segments 2230*b,d*.

Figure 24:
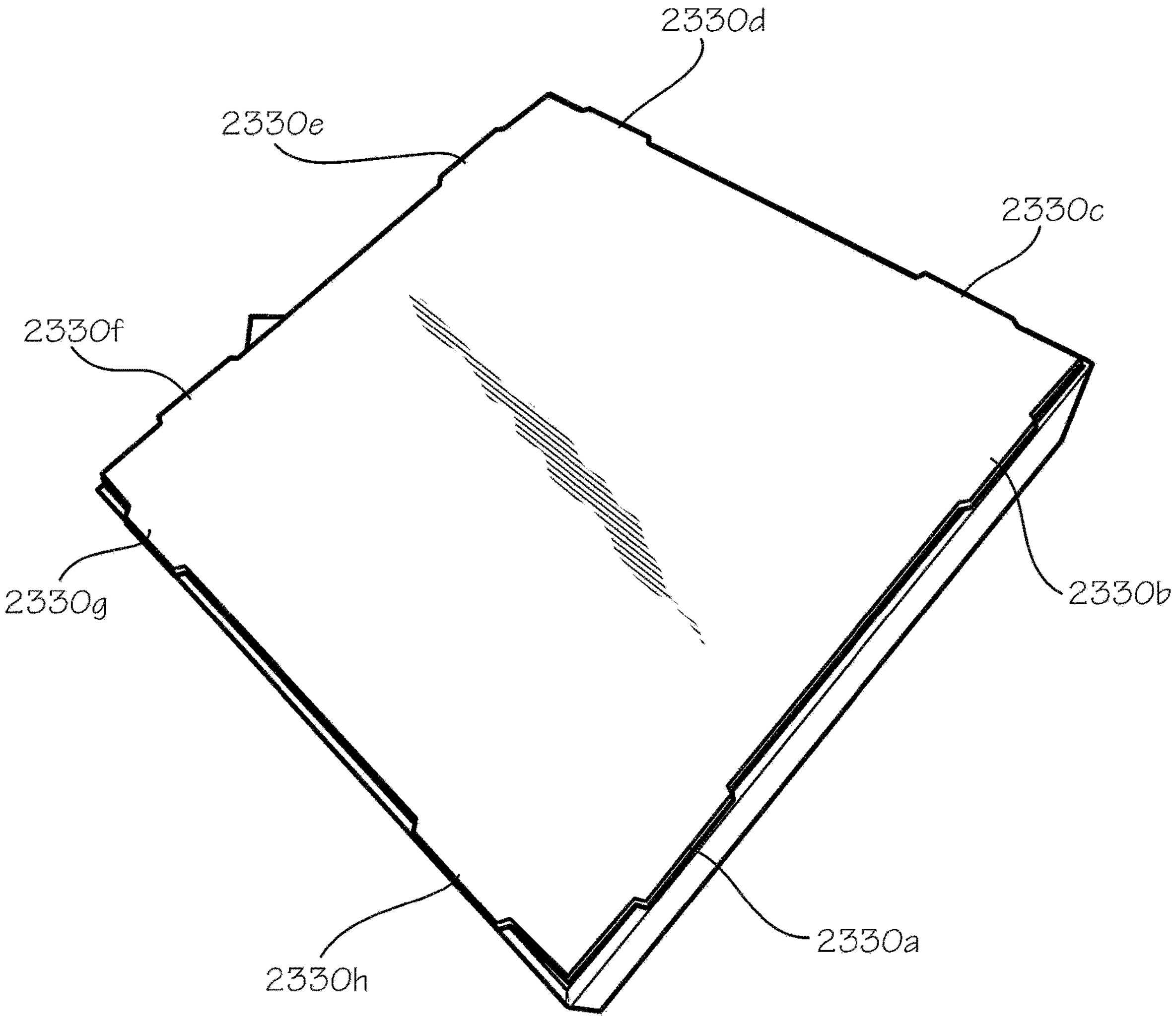
FIG. 24 is a perspective view of the lid of FIG. 19 in another partially assembled configuration prior to one remaining step of pushing the inner piece of the lid into the outer piece of the lid such that tabs of the inner piece are secured by slots of the outer piece.

FIG. 24 shows another perspective view of the inner piece 2010 with its side segments 2120*a,b,c,d* folded into the outer piece 2020, the inner piece 2010 ready to be pushed in, locking the tabs 2330*a,b,c,d,e,f* of the inner piece 2010 into the tab slots 2232*a,b,c,d,e,f,g,h* of the outer piece 2020 (shown in FIG. 22).

Figure 25:
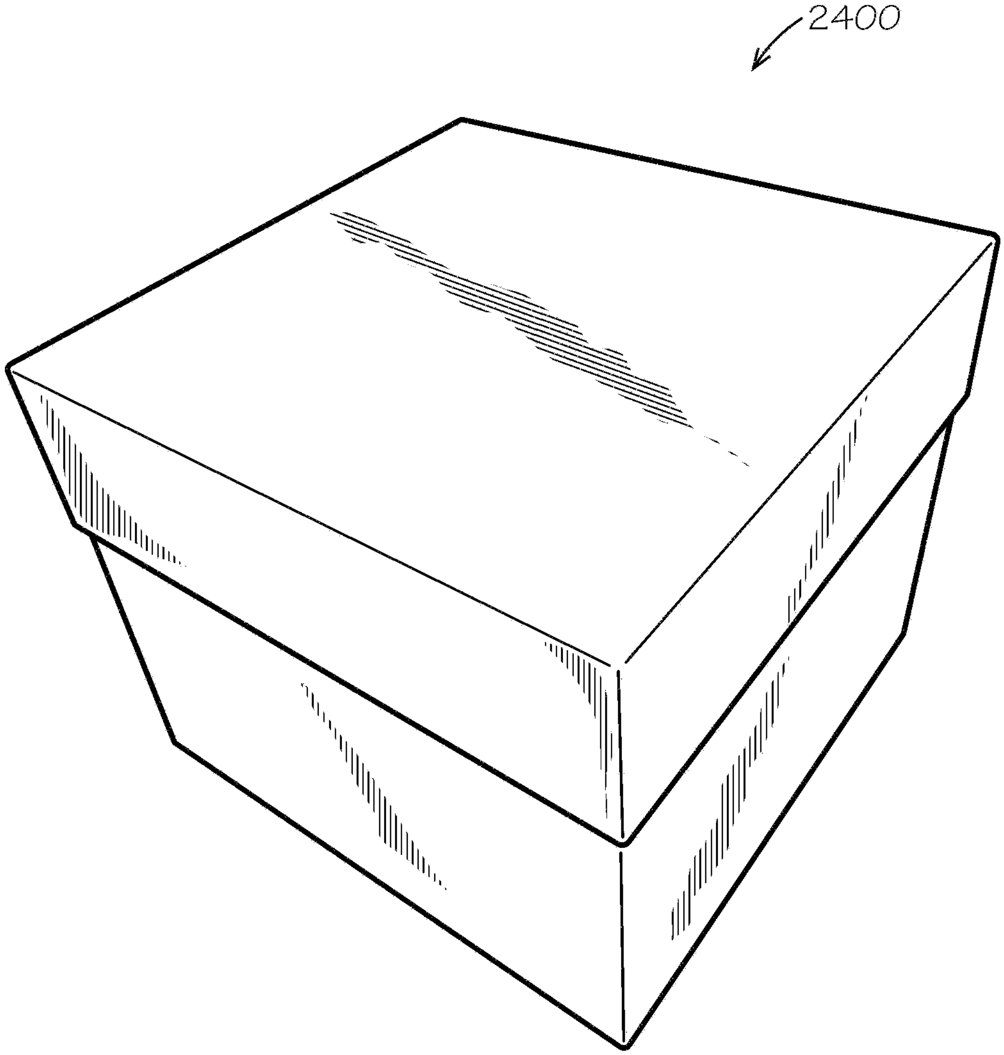
FIG. 25 is a perspective view of the insulated box covered by the lid.

FIG. 25 shows the assembled insulated box 2400 covered by the lid 2000.

The interior piece 500 and the exterior piece 100 of the insulated box 2400, the register 1600, the box insert 1200 with vertical rails 1220, and the inner piece 2010 and the outer piece 2020 of the lid 2000 can each be formed from a single piece of flat material, such as solid cardboard, corrugated cardboard, corrugated plastic, and other materials known in the art. The box insert 1200 with vertical rails 1220 can also be used with or without the register 1600 to maintain a uniform temperature and humidity level within the insulated box 2400. The spaces 1420 between the vertical rails 1220, the cutouts 1620 exposing the bottom 1410 of the cavity 710, and the holes 1610 in the register 1600 can all facilitate air flow and by diffusion and convection.

The registration system 1800 can be configured to place perishable items such as food (not shown) on one side of the register 1600 and a heat transfer element such as an ice pack (not shown) on the other. The ice pack can be place above the food to allow cooling by cold air flowing downward. Multiple registers 1600 can be used.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A lid, comprising:

an outer piece comprising an end segment comprising an outer tab received in a tab slot of the outer piece;

an inner piece separate from the outer piece and defining an inner tab positioned inside the outer piece, the inner piece and the outer piece defining a space therebetween; and a repulpable insulator pad within the space.

2. The lid of claim 1, wherein the outer piece further comprises an outer center segment and the inner piece further comprises an inner center segment.

3. The lid of claim 1, wherein the inner piece comprises an inner center segment and an inner rim comprising a plurality of side segments joined to the inner center segment by a plurality of fold lines.

4. The lid of claim 3, wherein each fold line in the plurality of fold lines comprises a tab cut and the inner tab.

5. The lid of claim 1, wherein the outer piece further comprises an outer center segment and an outer rim comprising a plurality of connecting segments joined to the outer center segment by fold lines defining slots.

6. The lid of claim 5, wherein the outer rim comprises alternating side tabs joined to the plurality of connecting segments by fold lines, wherein a first connecting segment and a third connecting segment of the outer rim comprise side tabs.

7. The lid of claim 5, wherein the outer piece further comprises end segments joined to the plurality of connecting segments by fold lines, each end segment comprising the outer tab and the tab slot.

8. The lid of claim 7, wherein the fold lines are double fold lines.

9. The lid of claim 7, wherein the inner tab of the inner piece is locked into the tab slot of the outer piece.

10. The lid of claim 1, wherein the repulpable insulator pad and the inner piece are secured within the space defined between the inner piece and the outer piece when the outer tab is received in the tab slot of the outer piece.

11. The lid of claim 10, wherein the outer tab is sandwiched between a connecting segment and the end segment.

12. A method of assembling a lid, comprising:

arranging an outer piece comprising an outer center segment and an outer rim comprising an outer tab received in an outer tab slot and defining a space of the outer center segment within the outer rim;

placing a repulpable insulator pad within the space of the outer center segment of the outer piece; and covering the space comprising the repulpable insulator pad with an inner piece that is separate, and an inner tab of the inner piece that defines the space from the outer piece, the inner piece comprising an inner center segment, and an inner rim.

13. The method of claim 12, further comprising assembling the outer piece by sandwiching a plurality of side tabs between a plurality of neighboring connecting segments and end segments.

14. The method of claim 12, further comprising folding side segments of the inner piece fold toward a cavity of the outer piece to expose the inner tab formed by a tab cut.

15. The method of claim 14, further comprising receiving the inner tab of the inner piece into the outer tab slot of the outer piece to secure the inner piece to the outer piece.

16. The method of claim 12, further comprising securing the repulpable insulator pad and the inner piece within the space defined between the inner piece and the outer piece when the outer tab is received in the outer tab slot of the outer piece.

* * * * *